(12) United States Patent  
Douglas et al.

(10) Patent No.: US 11,366,319 B1  
(45) Date of Patent: Jun. 21, 2022

(54) IMMERSIVE VIEWING EXPERIENCE

(71) Applicants: Robert Edwin Douglas, Winter Park, FL (US); Kathleen Mary Douglas, Winter Park, FL (US); David Byron Douglas, Winter Park, FL (US)

(72) Inventors: Robert Edwin Douglas, Winter Park, FL (US); Kathleen Mary Douglas, Winter Park, FL (US); David Byron Douglas, Winter Park, FL (US)

(73) Assignee: DOUGLAS LABS, INC., Winter Park, FL (US)

( * ) Notice: Subject to any disclaimer, the term of this patent is extended or adjusted under 35 U.S.C. 154(b) by 0 days.

(21) Appl. No.: 17/225,610

(22) Filed: Apr. 8, 2021

Related U.S. Application Data

(63) Continuation-in-part of application No. 17/187,828, filed on Feb. 28, 2021, now abandoned.

(51) Int. Cl.  
G02B 27/01 (2006.01)  
G02B 27/00 (2006.01)  
G06T 19/00 (2011.01)

(52) U.S. Cl.  
CPC ....... *G02B 27/017* (2013.01); *G02B 27/0093* (2013.01); *G02B 27/0101* (2013.01); *G02B 27/0179* (2013.01); *G06T 19/006* (2013.01); G02B 2027/0134 (2013.01); G02B 2027/0138 (2013.01); G02B 2027/0187 (2013.01)

(58) Field of Classification Search  
USPC .......................................................... 345/8  
See application file for complete search history.

(56) References Cited

U.S. PATENT DOCUMENTS

| | | | |
|---|---|---|---|
| 2005/0117215 A1* | 6/2005 | Lange | G06T 15/04 348/42 |
| 2008/0198920 A1* | 8/2008 | Yang | H04N 19/172 375/E7.157 |
| 2012/0084652 A1* | 4/2012 | Martinez Bauza | H04N 13/128 348/E13.001 |
| 2012/0108328 A1* | 5/2012 | Konno | H04N 13/398 463/31 |
| 2012/0154277 A1* | 6/2012 | Bar-Zeev | G06F 3/013 345/158 |
| 2017/0076503 A1* | 3/2017 | Tamaoki | G06F 3/017 |
| 2018/0114353 A1* | 4/2018 | Champion | G06T 19/006 |
| 2018/0114566 A1* | 4/2018 | Aoyama | G06F 3/147 |
| 2018/0138977 A1* | 5/2018 | Aoyama | H04L 12/4625 |
| 2018/0318704 A1* | 11/2018 | Ikenoue | G02B 27/00 |
| 2019/0199993 A1* | 6/2019 | Babu J D | H04N 13/128 |
| 2020/0084432 A1* | 3/2020 | Ravirala | H04N 13/271 |

* cited by examiner

*Primary Examiner* — Chineyere D Wills-Burns

(57) ABSTRACT

This patent provides a novel set of stereoscopic imaging techniques. Such techniques allow extremely large field of view datasets capable of stereoscopic display, such as greater than 270° horizontal field of view and 180° vertical field of view. Thus it is possible to record data in a way that is larger than a user could visualize. A user can thus select which subset of the dataset he/she wants to view. Then, allow the user to view naturally via head tracking and eye tracking to allow one to see and inspect a scene as if one were naturally there viewing it in real time.

20 Claims, 50 Drawing Sheets

SYSTEM HARDWARE

- Stereoscopic camera system
  - Visual camera system options:
    - Stereoscopic cameras mounted on different smart devices
    - Stereoscopic cameras mounted on a convex grid
    - Stereoscopic cluster of cameras
  - Processing techniques:
    - Composite dataset for highest quality resolution of all objects within the scene
  - Camera options:
    - Cameras have variable interocular distance (e.g., stereo equivalent to standard eye interocular distance or shorter/longer range stereo)
    - Cameras have variable zoom settings (e.g., full frame with 24-70 mm lens)
- Display system:
  - Visual display options:
    - Stereoscopic HDU (AR/VR/MR) with head tracking and eye tracking
    - Large home theater TV display (e.g., 180-270° with variable resolution)
    - Large home theater screen (e.g., 180-270° curved white surface plus multiple projector system)
    - Combinations of the above.
  - System interfaces:
    - Audio system (microphone and/or speaker)
    - Communication links
- Support accessories:
  - GPS
  - IMU
  - GUI (e.g., keyboard, joystick, mouse, controller)
  - LIDAR
  - Computer system
  - Speakers
  - Power supply
  - Microphone
  - Recorder for image playback
  - Tripod
  - Cables as required

SYSTEM HARDWARE

- Stereoscopic camera system
    - Visual camera system options:
        - Stereoscopic cameras mounted on different smart devices
        - Stereoscopic cameras mounted on a convex grid
        - Stereoscopic cluster of cameras
    - Processing techniques:
        - Composite dataset for highest quality resolution of all objects within the scene
    - Camera options:
        - Cameras have variable interocular distance (e.g., stereo equivalent to standard eye interocular distance or shorter/longer range stereo)
        - Cameras have variable zoom settings (e.g., full frame with 24-70 mm lens)
- Display system:
    - Visual display options:
        - Stereoscopic HDU (AR/VR/MR) with head tracking and eye tracking
        - Large home theater TV display (e.g., 180-270° with variable resolution)
        - Large home theater screen (e.g., 180-270° curved white surface plus multiple projector system)
        - Combinations of the above.
    - System interfaces:
        - Audio system (microphone and/or speaker)
        - Communication links
- Support accessories:
    - GPS
    - IMU
    - GUI (e.g., keyboard, joystick, mouse, controller)
    - LIDAR
    - Computer system
    - Speakers
    - Power supply
    - Microphone
    - Recorder for image playback
    - Tripod
    - Cables as required

Figure 2

SYSTEM SOFTWARE

- System initialization software
- System control software
- Configured to communicate with a HDU, image recorder, computer system
- Dataset processing software: Collected dataset could be of a first size (e.g., 150 MP per frame) and presented dataset to a user at significantly smaller size (e.g., 6 MP per frame)
- Communications software (e.g., with internet)
- Camera selection software
- Software for control inputs for camera system via: GUI (e.g., roller ball mouse); voice commands; HDU parameters
- Image stabilization
- Target tracking
- Scene recognition software (e.g., wildlife conservationist looks for animals, hazardous areas)
- Integration of target tracking with camera movements on the grid
- Image optimization software (auto-focus, convergence, incorporation of range data for image optimization)
- Image stitching software
- Software for integration of multiple camera systems (e.g., dual camera on convex surface grid system with HDU)
- Power supply monitoring and management software

Figure 3

MAPPING CAMERA COORDINATE SYSTEM INTO A GPS COORDINATE SYSTEM

Determine a precise initial camera location (e.g., at t=0, determine GPS coordinate of camera). Note a calibration with objects with known GPS locations, such as a flag pole could be performed. 400

↓

Initialize a precise camera orientation (e.g., initialize inertial measurement unit in conjunction with GPS to determine camera orientation and level with respect to true North and horizontal, which are part of the overall camera system). For example, with respect to the coordinate system outlined in Figure 5A, at a first time point, the overall camera apparatus α angle could be 90° and the camera β angle could be 0° to correspond to true north and horizontal. An option for a low-cost system would be a compass in conjunction with a carpenter's level. At this point, the camera system would be geo-registered. 401

↓

Initialize the eye tracking system with respect to which pairs of cameras 402

For time points, record location of the camera, orientation of the camera (which will account for head position changes), and eye movements (e.g., for camera pair selection) over time. Note: that the coordinate system described in Figure 5A is fixed with respect to the camera. 403

For time points, record images from cameras. Note: image stabilization could be invoked. Note: some of the cameras would not be performing continuous recording 404

Assign objects within the scene GPS locations based on a combination and integration of LiDAR ranges, camera location, camera orientation (e.g. could change based on head tracking). For example, this could be done automatically by scene mapping or by a user placing cross-hairs on an object. An intersection/resection approach could be used by two geographically separated observers equipped with the camera systems to fine tune the location of the objects. Note: eye tracking could also be used to determine what locations the user saw over time. Audio recording could also complement the imagery. 405

Figure 4

3D COORDINATE SYSTEM FOR CAMERA LOCATION
WITH RESPECT TO SCENE

VARIABLE VIEWING ANGLE AND RANGE FOR EACH VIEWER

| Time point | Viewer #1 | Viewer #2 | Viewer #3 |
|---|---|---|---|
| 1 | (α = 0°, β = 0°, ∞) | (α = 10°, β = 0°, ∞) | (α = 90°, β = 0°, 1) |
| 2 | (α = 0°, β = 0°, ∞) | (α = 10°, β = 0°, ∞) | (α = 90°, β = 0°, 1) |
| 3 | (α = 0°, β = 0°, ∞) | (α = 10°, β = 0°, 20) | (α = 90°, β = 0°, 1) |
| 4 | (α = 0°, β = 0°, ∞) | (α = 10°, β = 0°, 10) | (α = 90°, β = 30°, 2) |
| 5 | (α = 0°, β = 0°, ∞) | (α = 10°, β = 0°, 5) | (α = 90°, β = 30°, 2) |
| 6 | (α = 0°, β = 0°, ∞) | (α = 10°, β = 0°, 5) | (α = 90°, β = 50°, 5) |
| 7 | (α = 0°, β = 0°, ∞) | (α = 10°, β = 0°, 5) | (α = 90°, β = 60°, 5) |

MULTIPLE PEOPLE VIEWING A SCENE OVER TIME
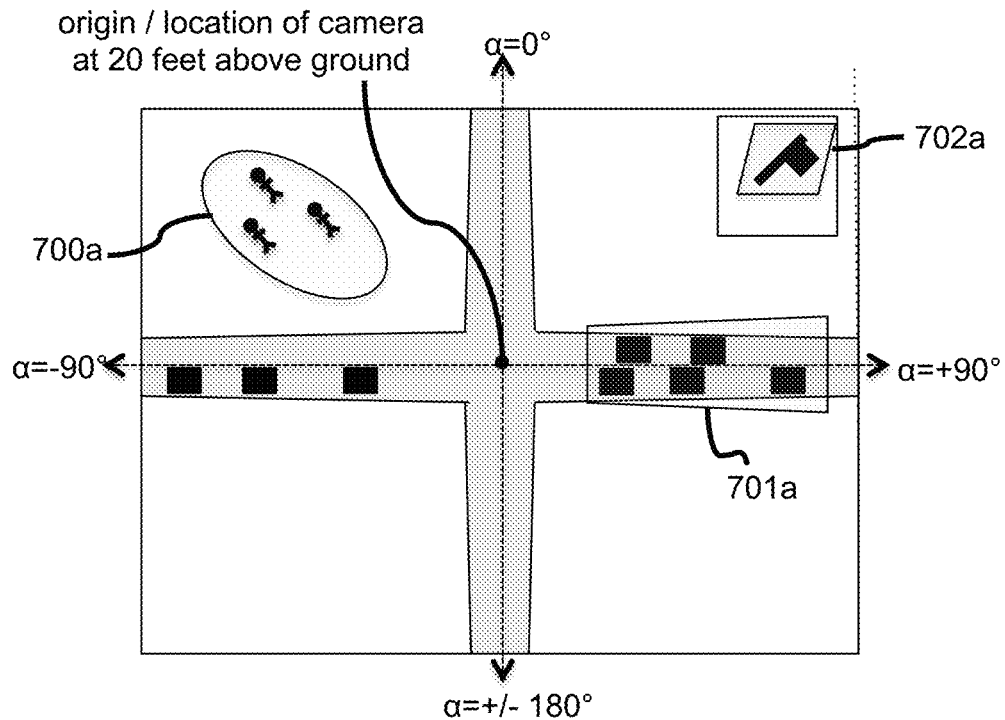
Fig. 7A t=1
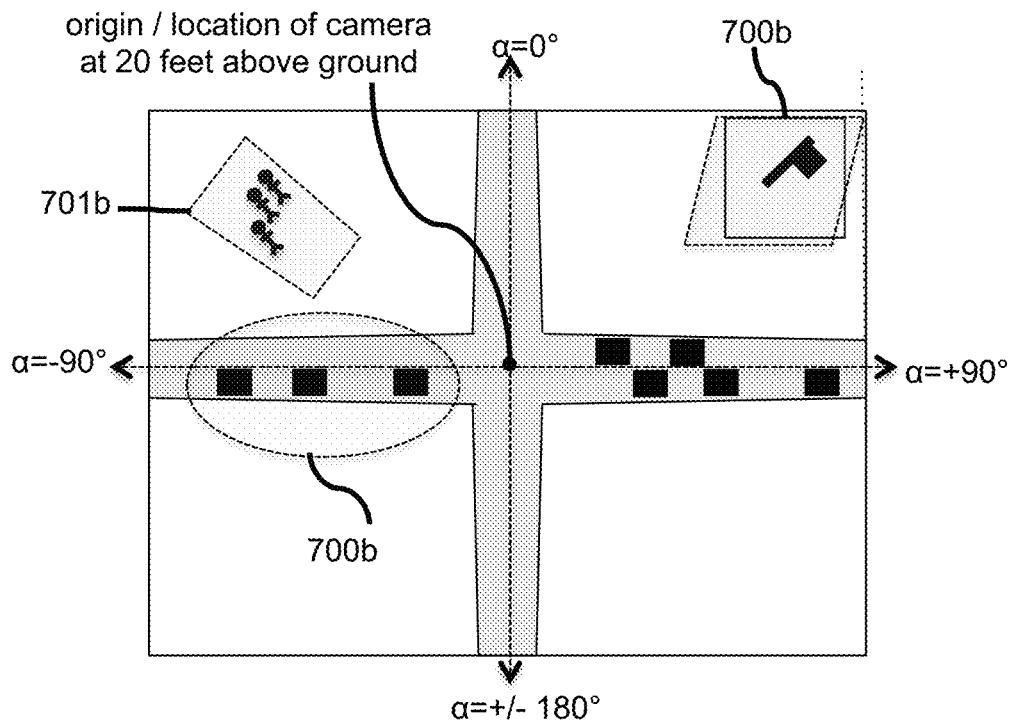
Fig. 7B t=2

NEAR-REAL TIME MULTI-USER VIEWING IMAGERY FROM A NEAR SPHERICAL STEREOSCOPIC CAMERA SYSTEM

NEAR REAL TIME SYSTEM TO BRING INTO THE BEST POSSIBLE
PICTURE BASED ON EYE TRACKING OF A USER

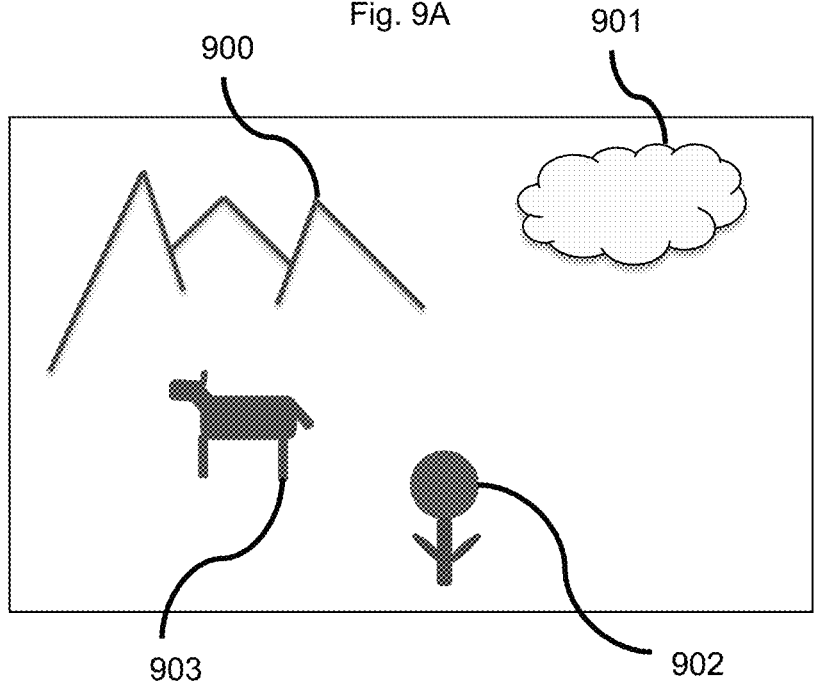

| Object | Range | Camera α (left / right) | Camera β (left / right) | Cameras used | Notes |
|---|---|---|---|---|---|
| Flower | 3-5 ft | +10° / -10° | -20° / -20° | Close convergence via camera pair | Filmer could move forward closer to the flower during the dialog. |
| Deer | 20 ft | +5° / -5° | 0° / 0° | Medium convergence via camera pair | Filmer turns head to focus on the deer & coordinate system reorients to new camera orientation |
| Mountain | 1000+ ft | 0° (single camera) | 15° (single camera) | Infinite convergence via single camera | Filmer turns head to focus on the deer & coordinate system reorients to new camera orientation |

FIGURE ILLUSTRATES IMPROVEMENTS VIA CANTING CAMERAS INWARD
Fig. 10A Straight view from left camera with can at medium distance
Fig. 10B Canted (20°) view from left camera with can at medium distance
Fig. 10C Straight view from left camera with can at close distance
Fig. 10D Canted (20°) view from left eye with can at close distance

PLACEMENT OF STERESCOPIC CAMERAS ON MULTIPLE DEVICES

EXAMPLE STERESCOPIC CAMERA CONFIGURATION
FOR A SMART STEREO CAMERA

EXAMPLE STERESCOPIC CAMERA CONFIGURATION
FOR A SMART PHONE

CANT ANGLE CHANGES WITH CONVERGENCE POINT
Fig. 15A Distant convergence point
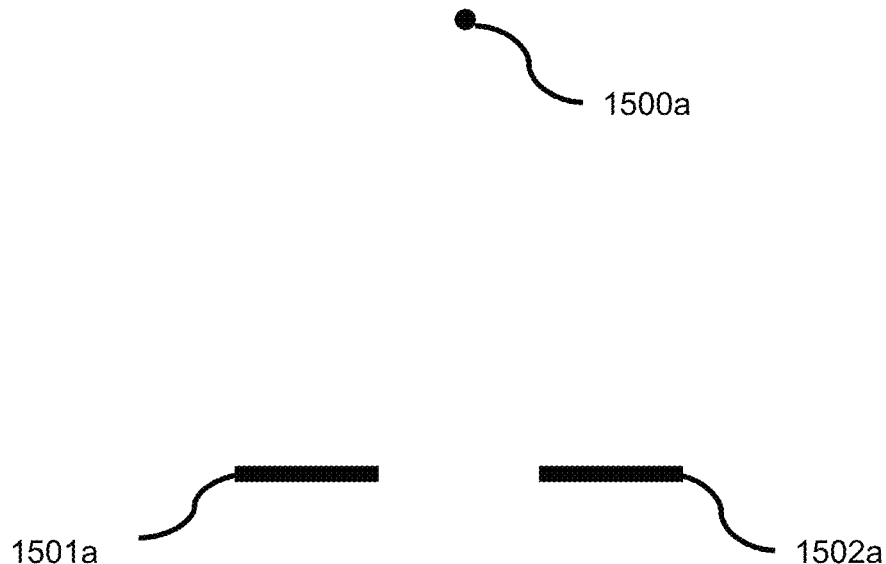
Fig. 15B Closer convergence point
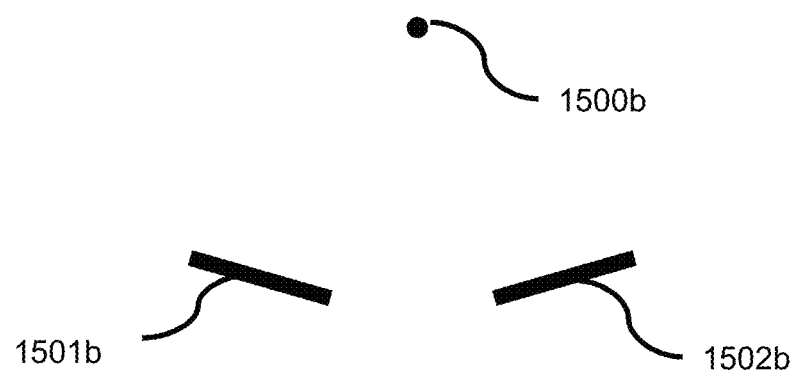

STEREO SEPARATION CHANGES WITH CONVERGENCE POINT
Fig. 16A Distant convergence point
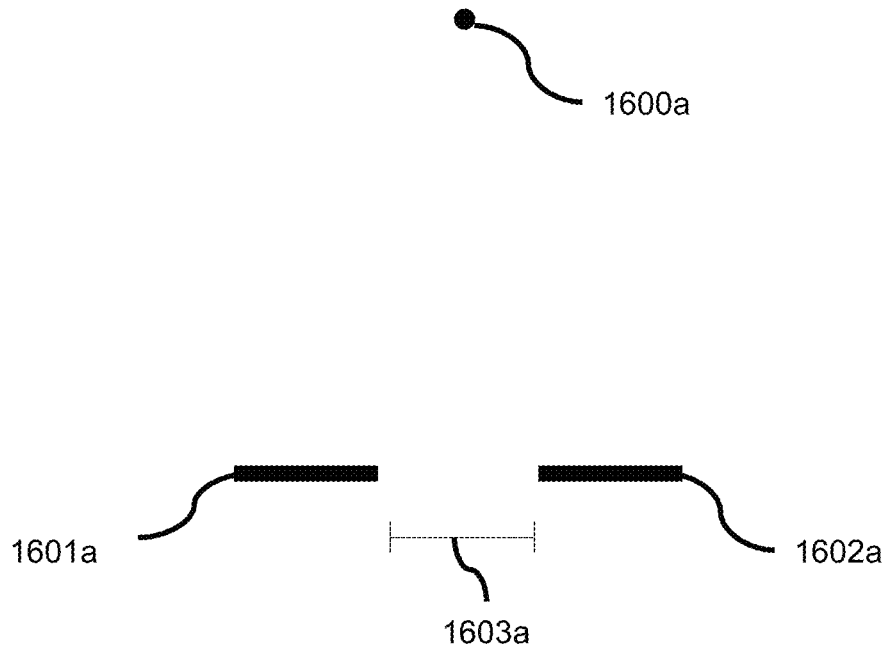
Fig. 16B Closer convergence point
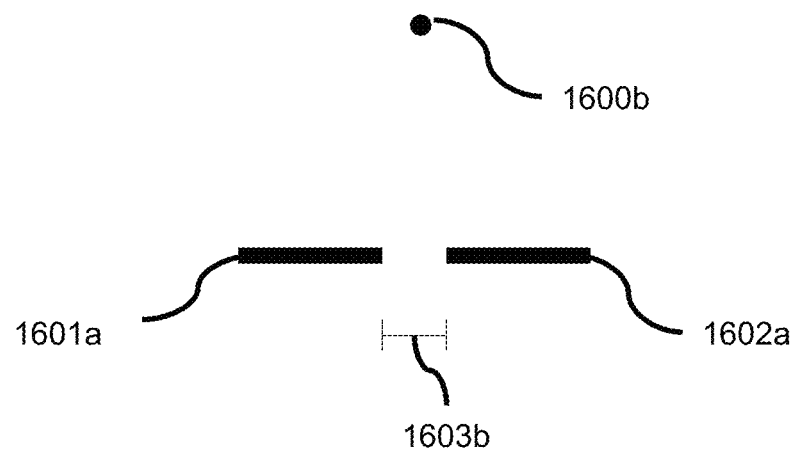

CANT ANGLE AND STEREO SEPARATION CHANGES WITH
CONVERGENCE POINT
Fig. 17A Distant convergence point
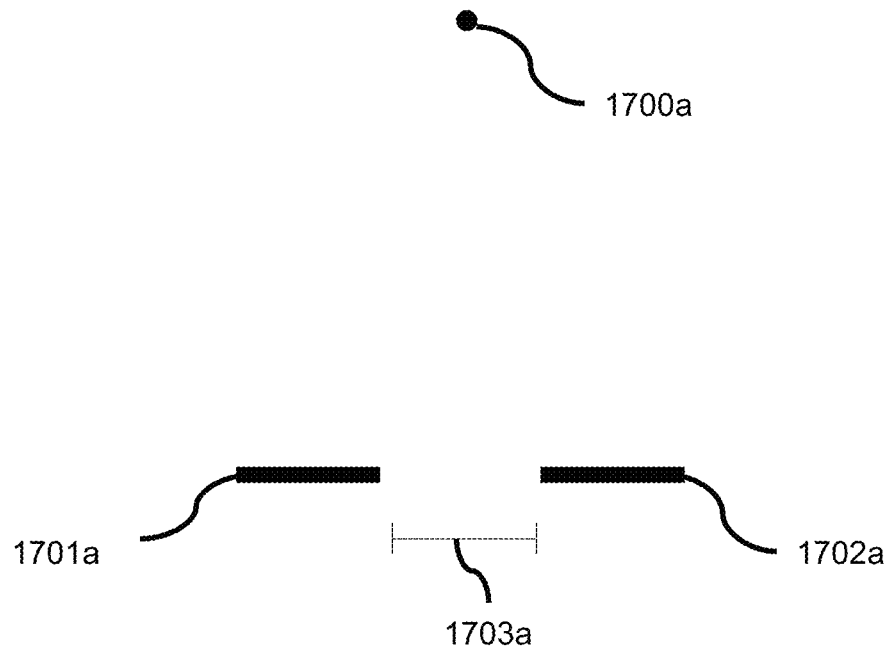
Fig. 17B Closer convergence point
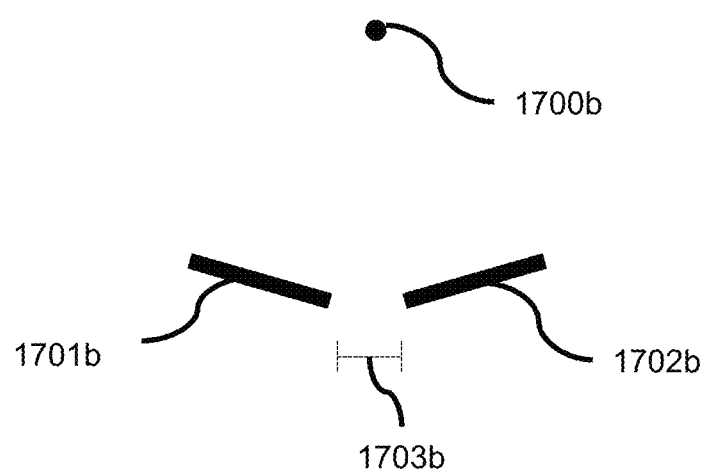

USING A DUAL CAMERA CLUSTER

Left mid-cameras (H)  Right mid-cameras (H)

Left mid-cameras (V)  Right mid-cameras (V)

INCORPORATING MULTIPLE CAMERA CLUSTERS ON A HDU

HEMISPHER-SHAPED HIGH RESOLUTION CAMERA CLUSTER
Fig. 20A Side view
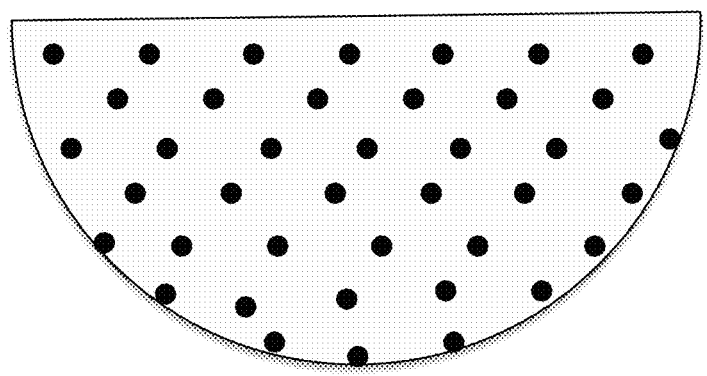
Fig. 20B Bottom view looking up
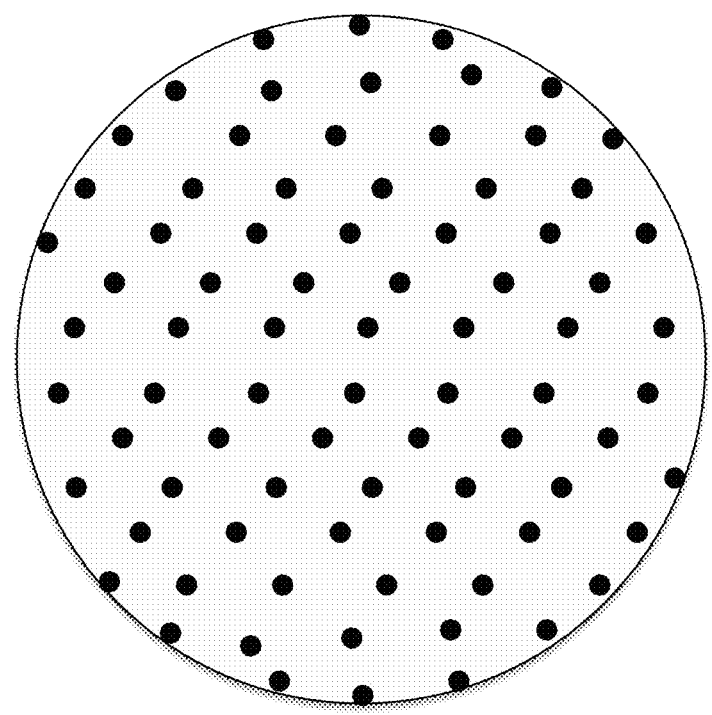

HEMISPHER-SHAPED HIGH RESOLUTION CAMERA SYSTEM
Fig. 21A Bottom view looking up – cameras in first position
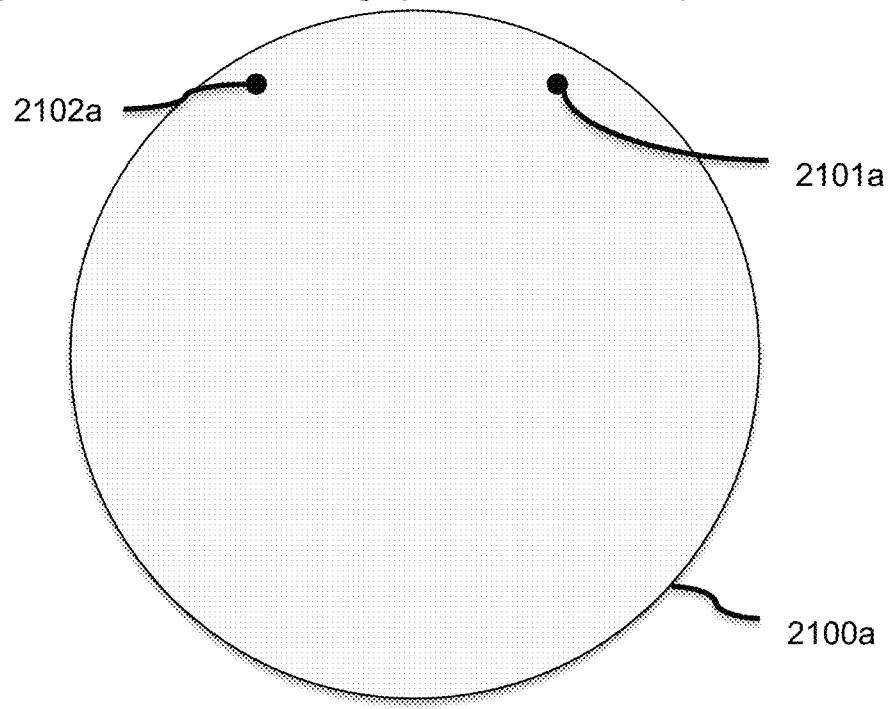
Fig. 21B Bottom view looking up – cameras in second position
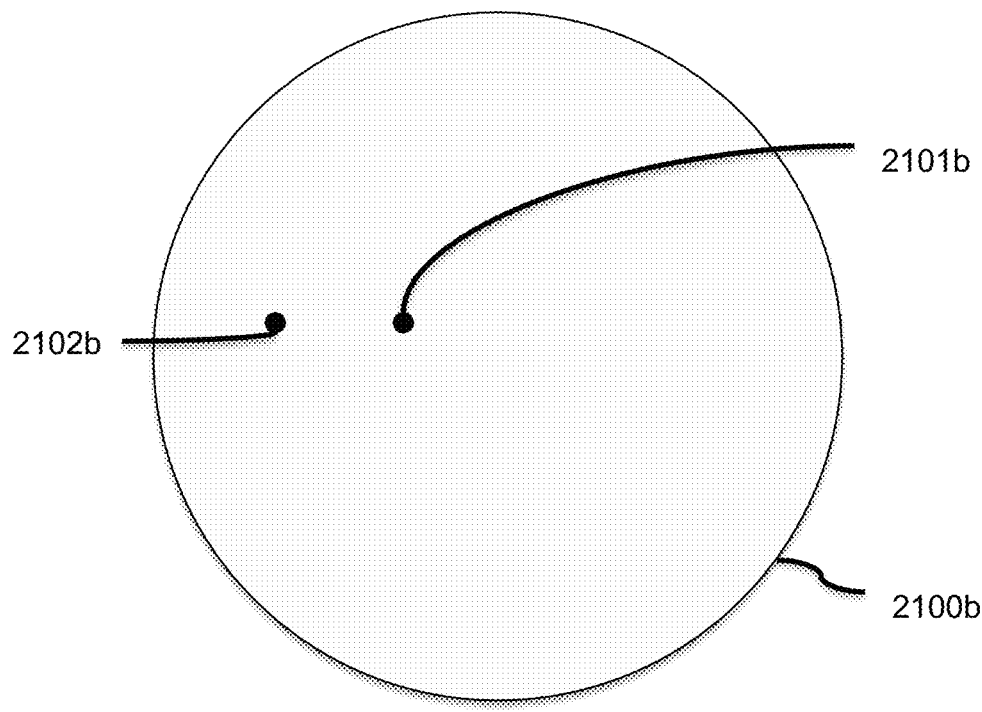

ALTERING THE LOOK ANGLE OF THE STEREOSCOPIC CAMERA SYSTEM
Fig. 22A – Top down view shows user's eyes in a straight forward position
Fig. 22B – Top down view cameras are in a straight forward position
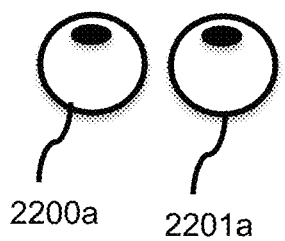
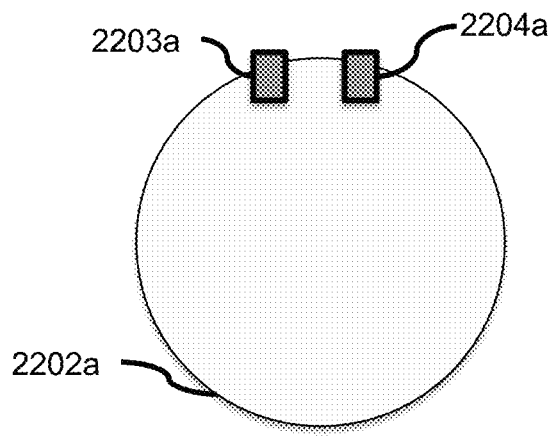
Fig. 22C – Top down view shows user's eyes are looking to the right
Fig. 22D – Top down view cameras are looking to the right
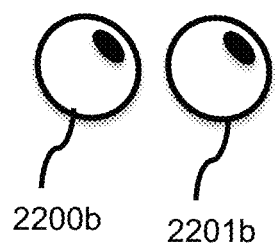
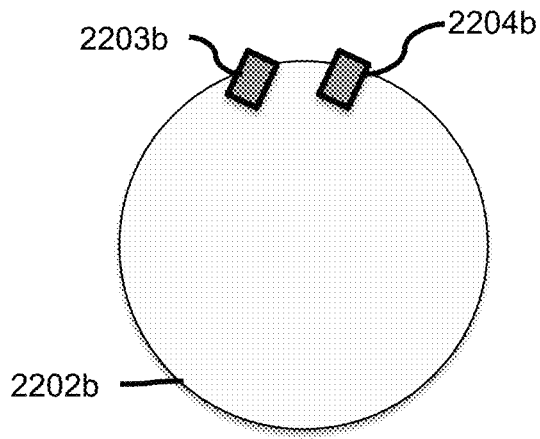

ILLUSTRATION OF MULTIPLE MOBILE CAMERA STEREOSCOPIC PAIRS

ROTATABLE STEREOSCOPIC TELEPHOTO LENS

LINKING STEREOSCOPIC CAMERAS POSITION ON A CONVEX
SURFACE TO A HDU ORIENTATION
Fig. 26A – User viewing imagery collected by camera in Fig. 26B
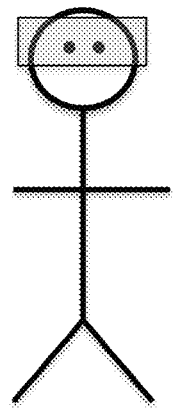
Fig. 26B – Front view of convex surface with two mobile cameras
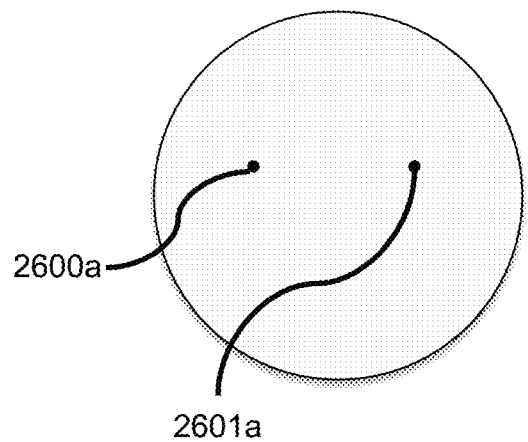
2600a
2601a
Fig. 26C – User viewing imagery collected by camera in Fig. 26D
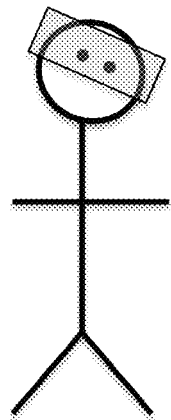
Fig. 26D – Front view of convex surface with two mobile cameras
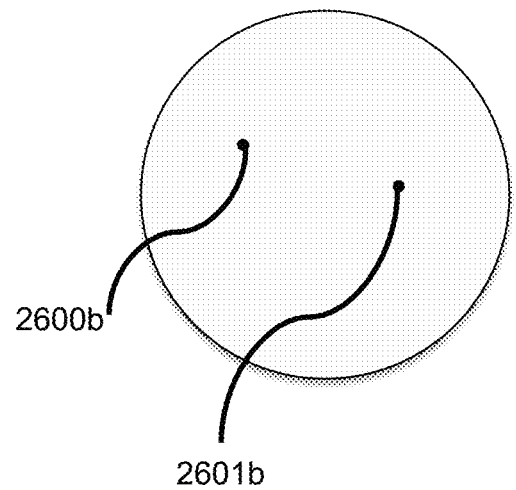
2600b
2601b

LINKING STEREOSCOPIC CAMERAS POSITION ON A CONVEX SURFACE TO A HDU ORIENTATION
Fig. 27A – User viewing imagery collected by camera in Fig. 27B
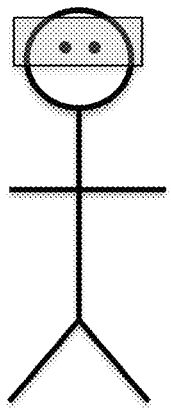
Fig. 27B – Front view of convex surface with multiple cameras
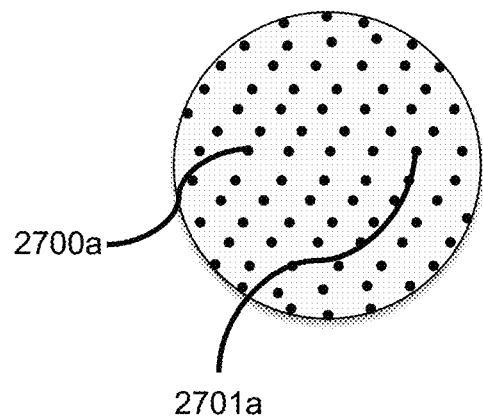
2700a
2701a
Fig. 27C – User viewing imagery collected by camera in Fig. 27D
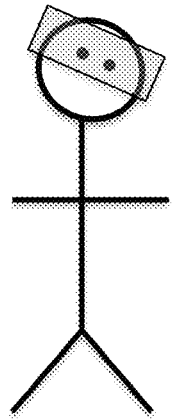
Fig. 27D – Front view of convex surface with multiple cameras
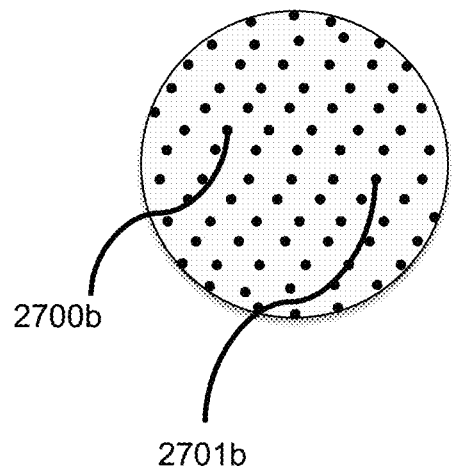
2700b
2701b EYE TRACKING GRID
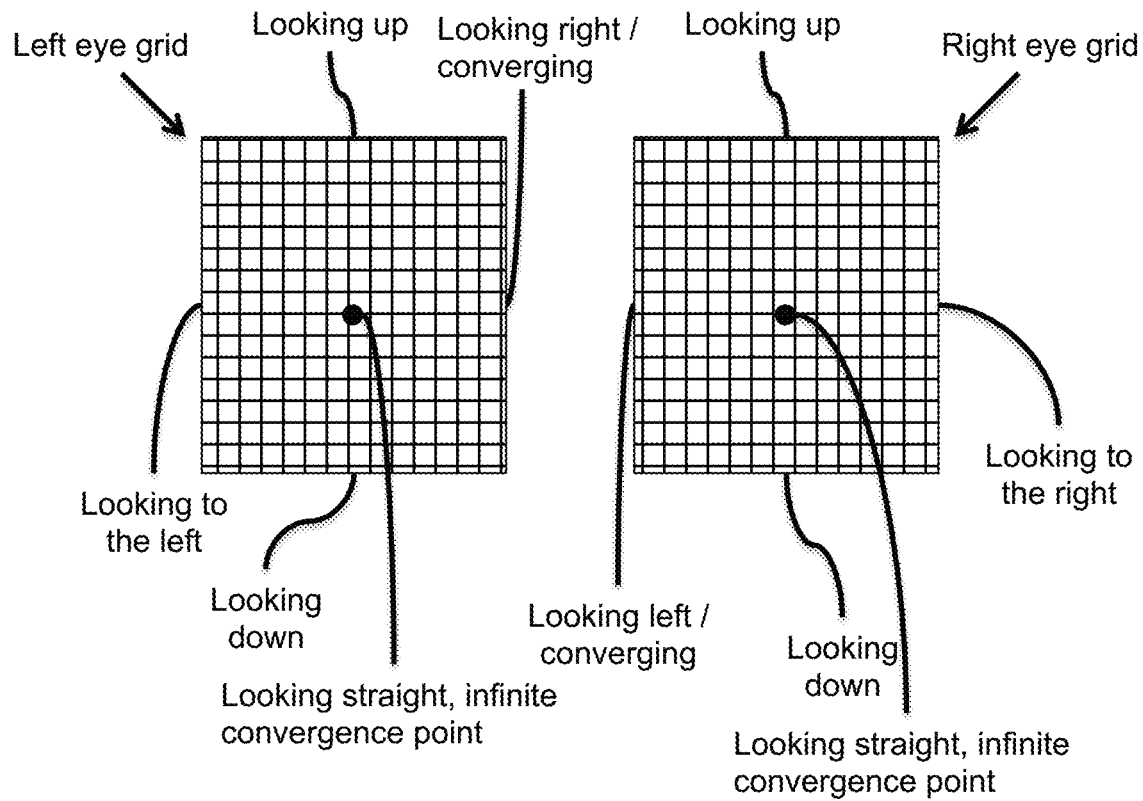
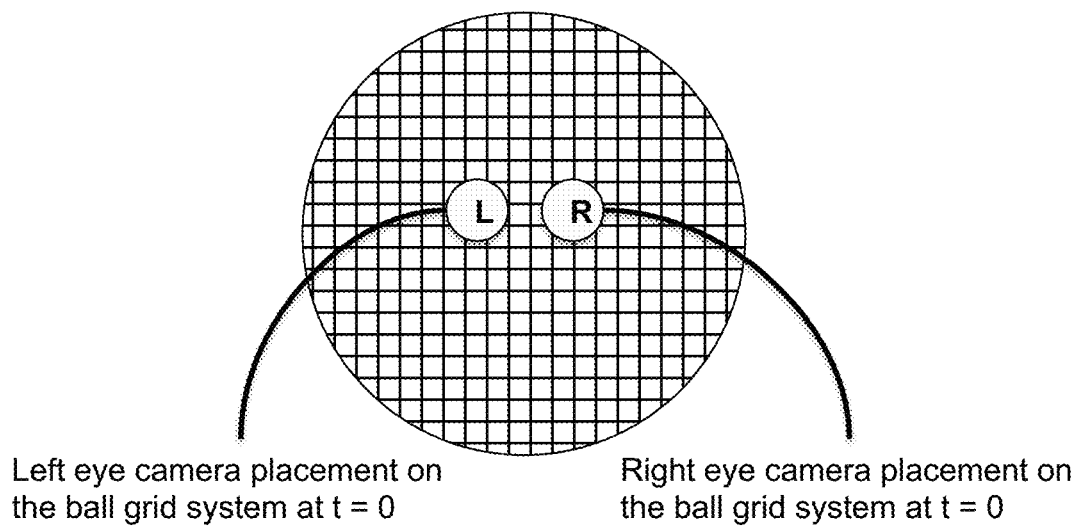
Figure 28

A HEAD DISPLAY UNIT WITH STEREOSCOPIC CAMERAS

A HEAD DISPLAY UNIT WITH STEREOSCOPIC CAMERA CLUSTERS

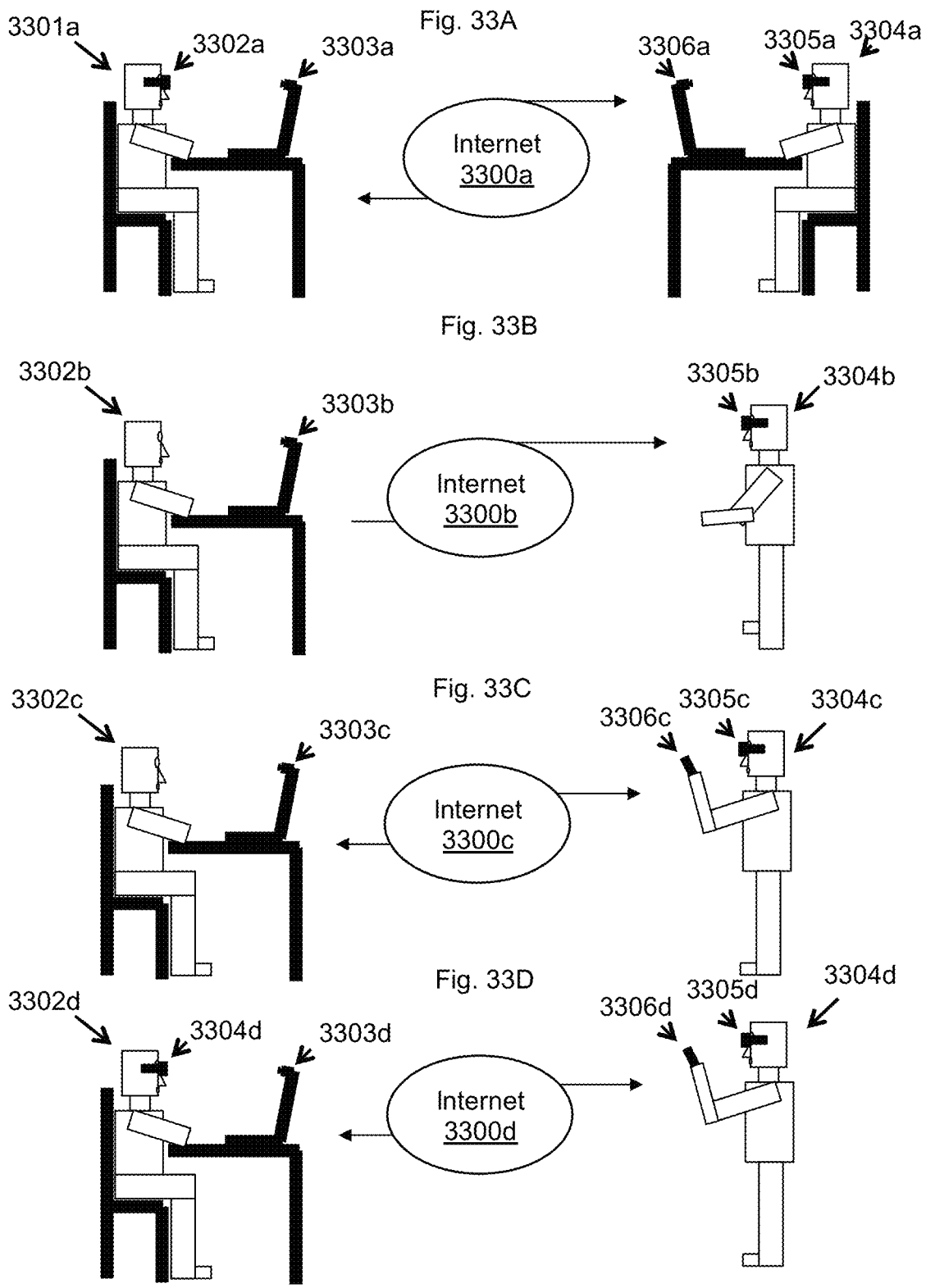

REALTIME STEREO VIEWING OF ONESELF USING A STEREO
CAMERA AND A STEREO DISPLAY

AN ADVANCED CAMERA SYSTEM FOR A CAMERA MAN / WOMAN

AN ADVANCED FOOTBALL FIELD CAMERA SYSTEM AND LAYOUT
Fig. 36A Top view
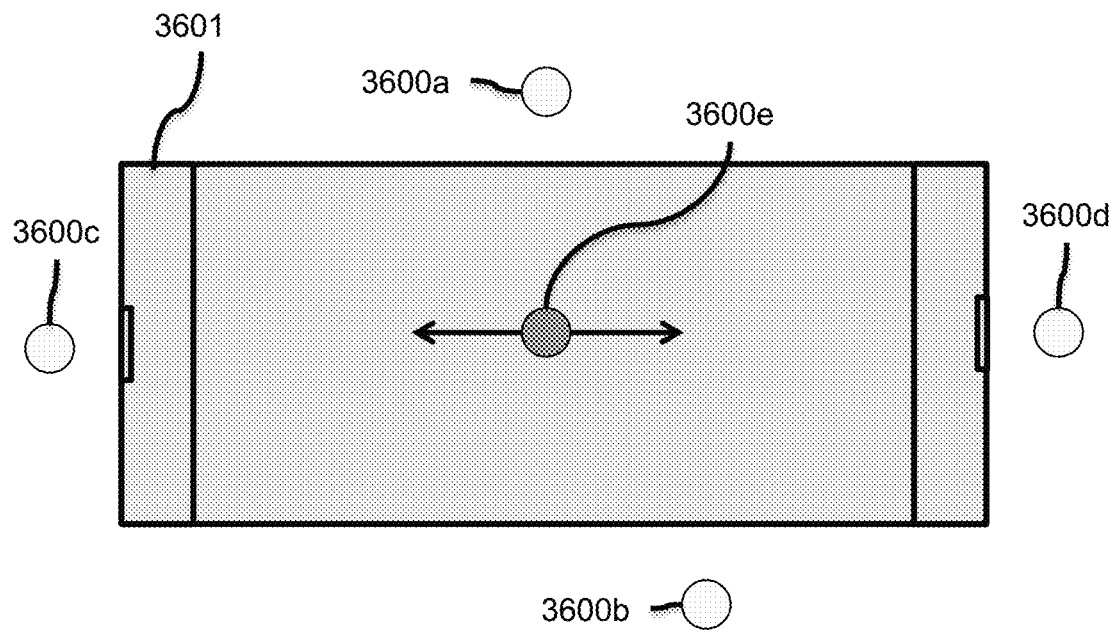
Fig. 36B Side view
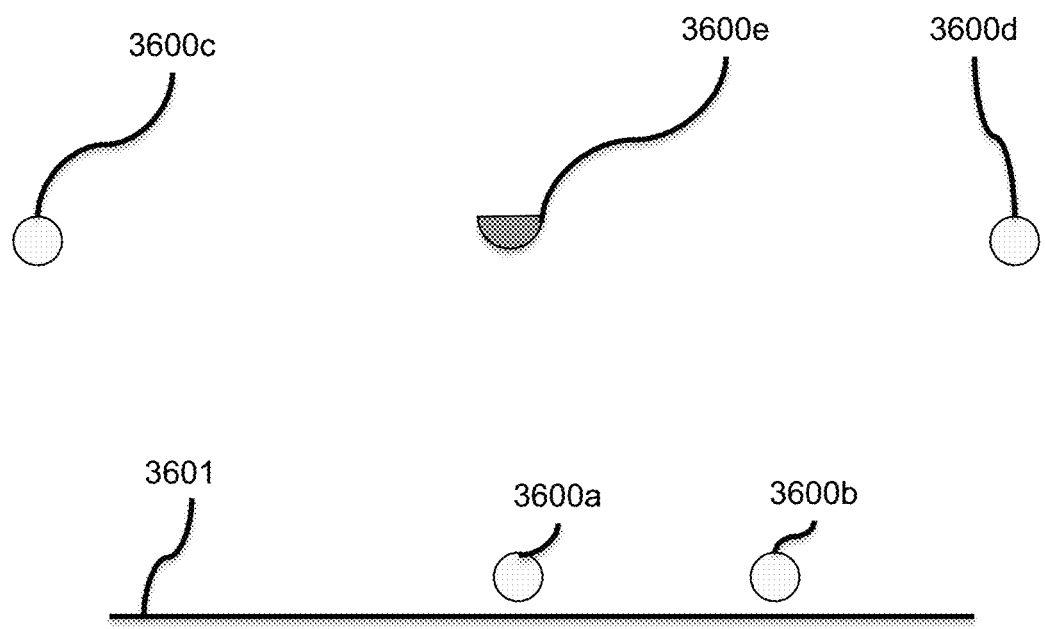

Fig. 37A Looking at camera cluster
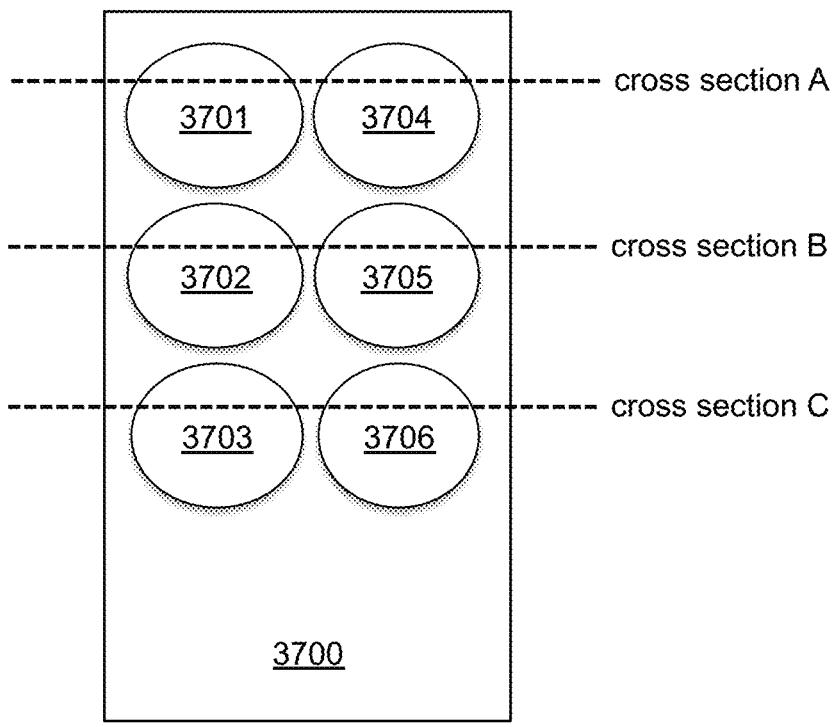
Fig. 37B Top down view of cross section A
Fig. 37C Top down view of cross section B
Fig. 37D Top down view of cross section B
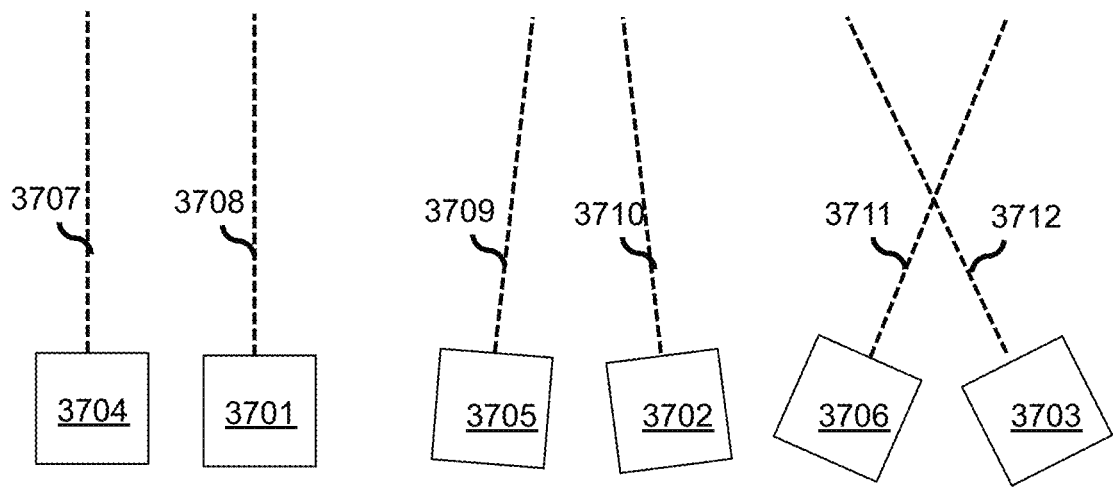

DUAL CAMERA CLUSTERS PROVIDING STEREOSCOPIC IMAGERY
Fig. 39A Top down view
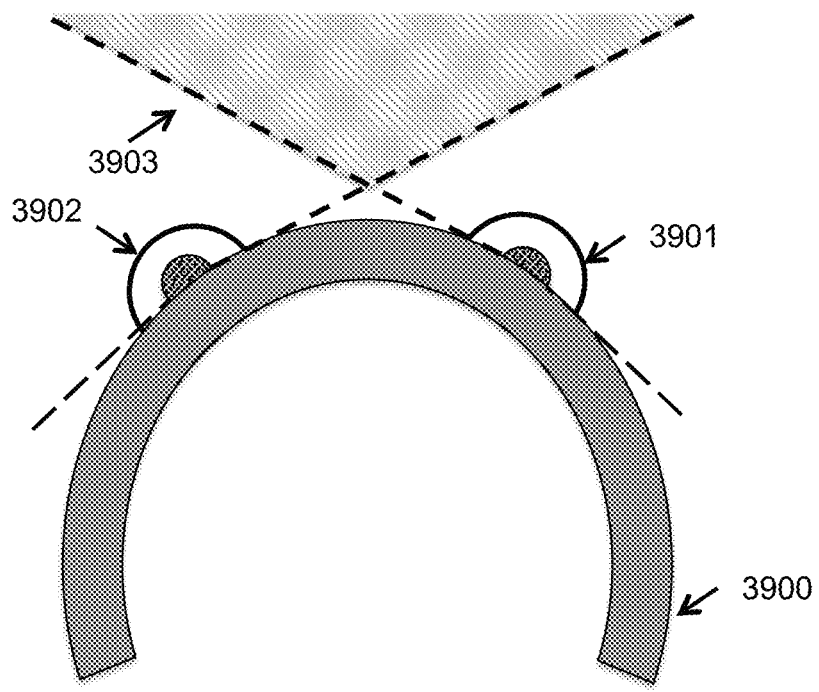
Fig. 39B Side view
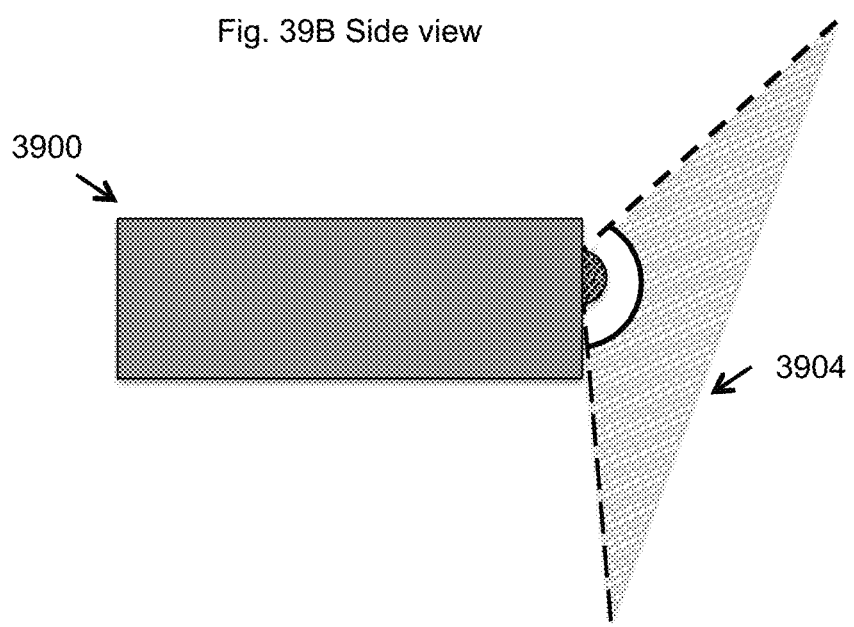

FIELD OF VIEW OF THE CAMERA SYSTEM FOR FILMING
Fig. 40A Top down view of instantaneous FOV
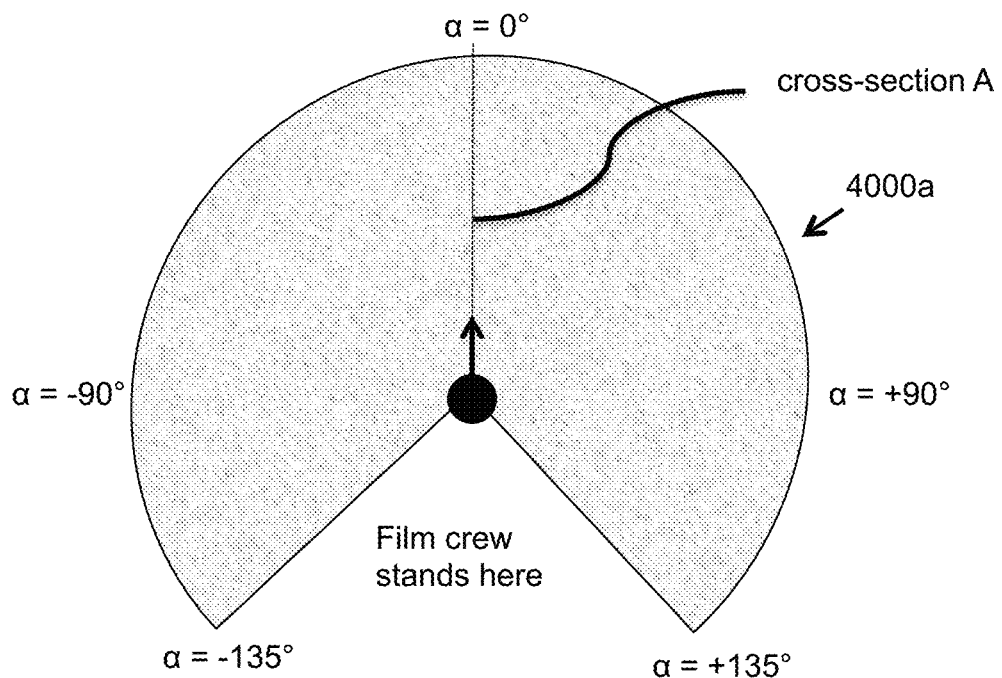
Fig. 40B Side view of instantaneous FOV (from cross-section A)
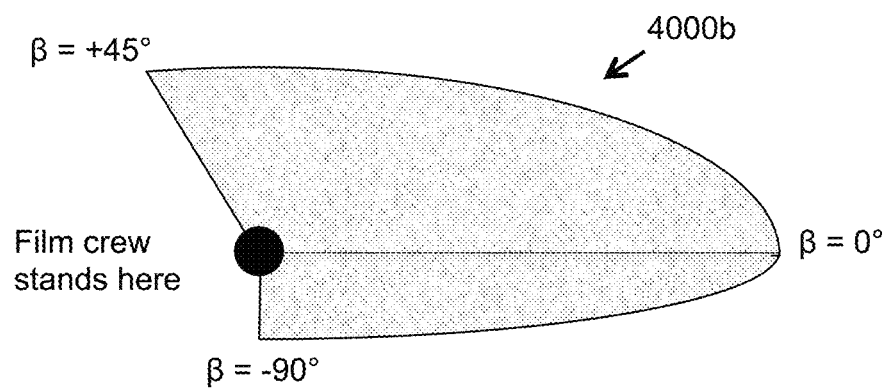

GENERATING A SIMULATED STEREOSCOPIC BACKGROUND
Fig. 41A Natural Background Scene
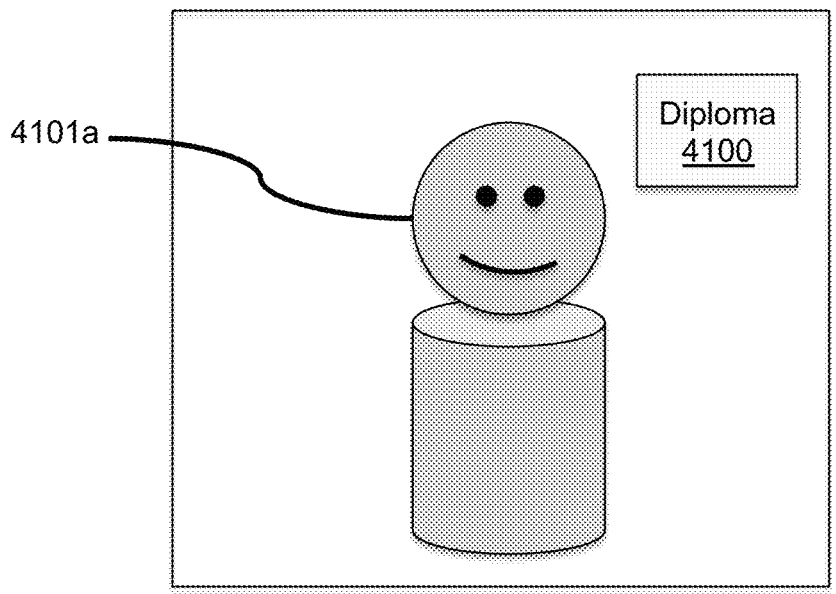
Fig. 41B Simulated Background Scene
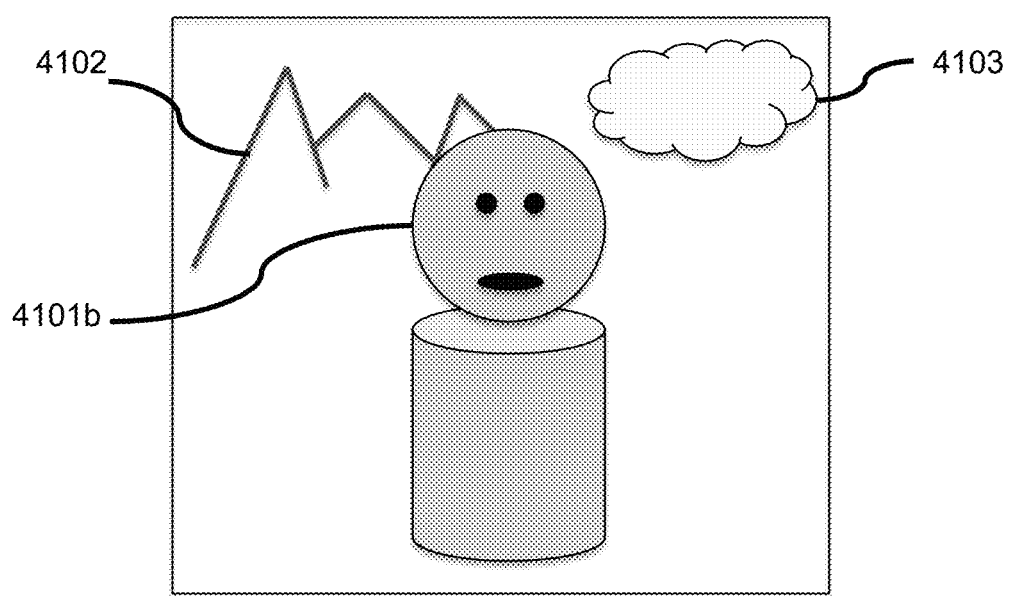

GENERATING A DYNAMIC, SIMULATED STEREOSCOPIC BACKGROUND
Fig. 42A Dynamic Simulated Background Scene at t = 1
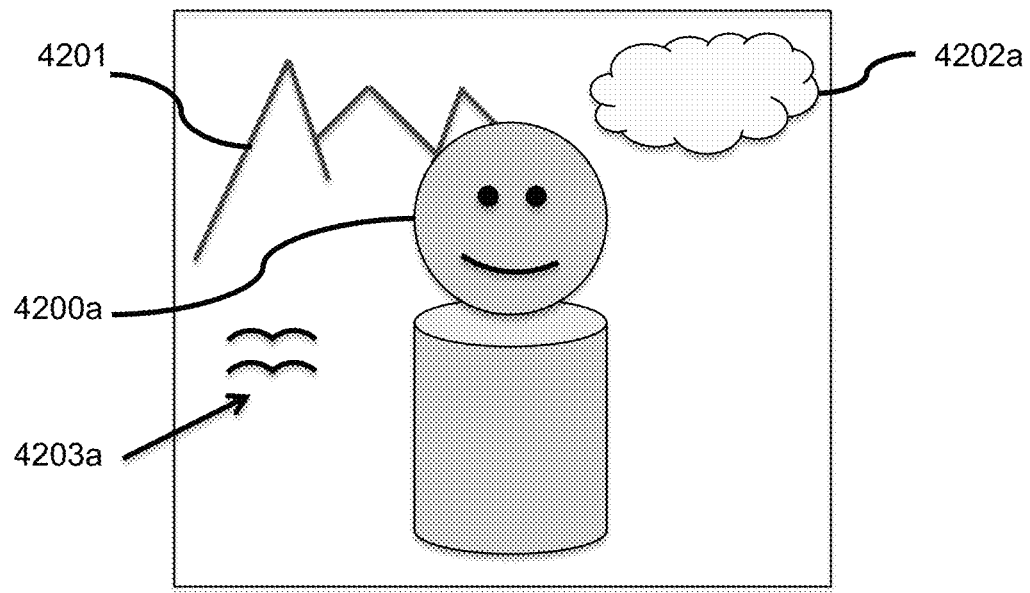
Fig. 42B Dynamic Simulated Background Scene at t = 2
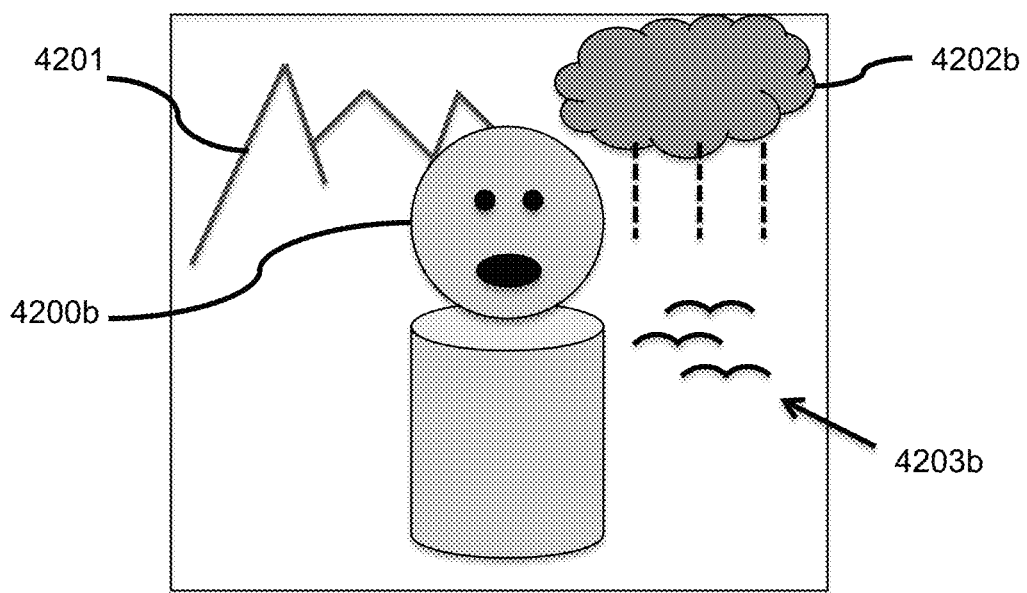

GENERATING A SIMULATED STEREOSCOPIC IMAGE OF A USER'S BODY
Fig. 43A Stereoscopic View of User
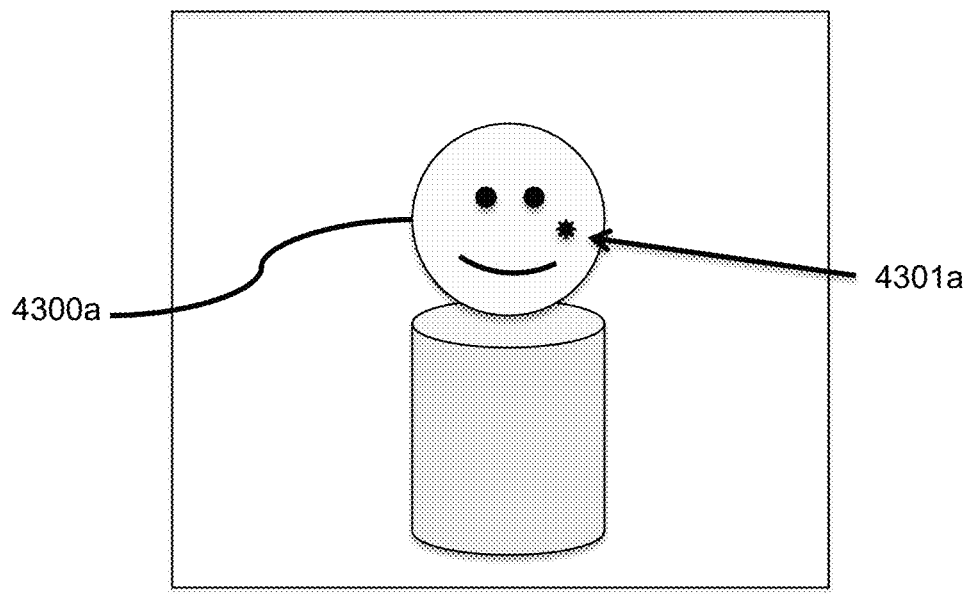
Fig. 43B Stereoscopic View of User
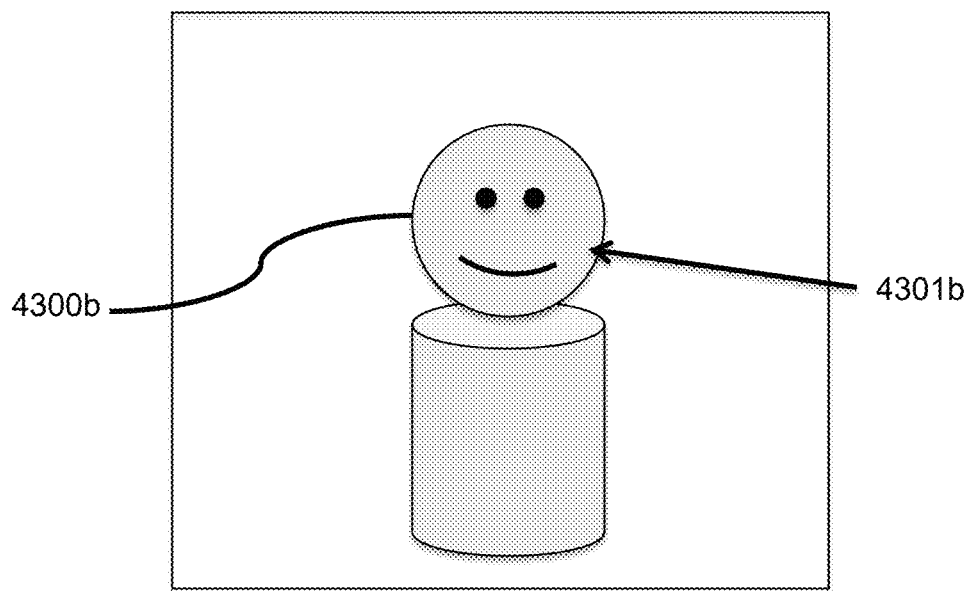

GENERATING A SIMULATED STEREOSCOPIC IMAGE OF A
USER'S DRESS APPEARANCE
Fig. 44A Stereoscopic View of User with actual dress appearance
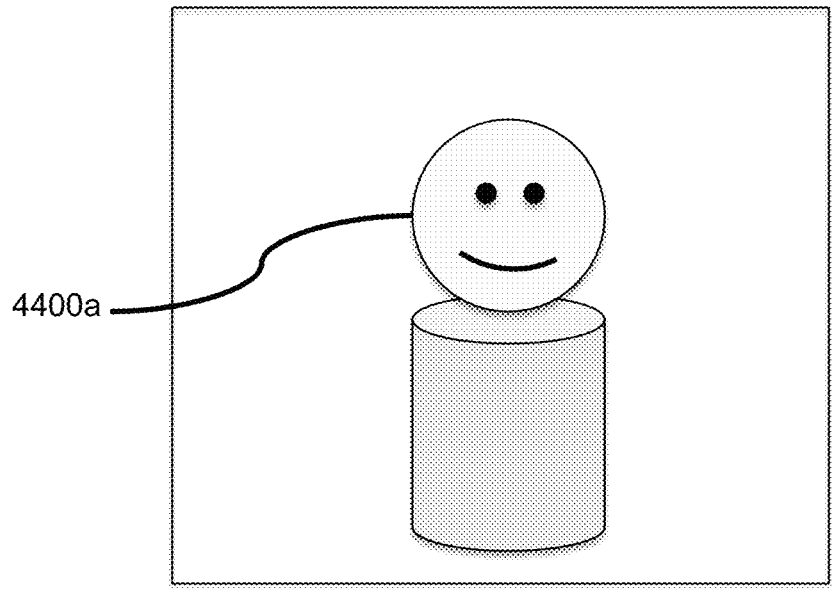
Fig. 44B Stereoscopic View of User
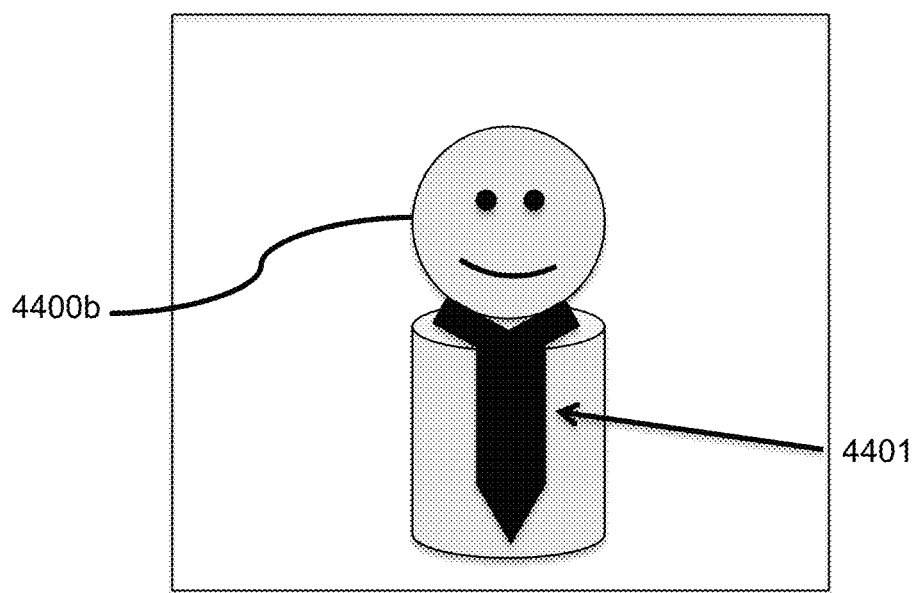

A STEREOSCOPIC NEWS CHANNEL
Fig 45A illustrates collection of stereoscopic imagery at a scene
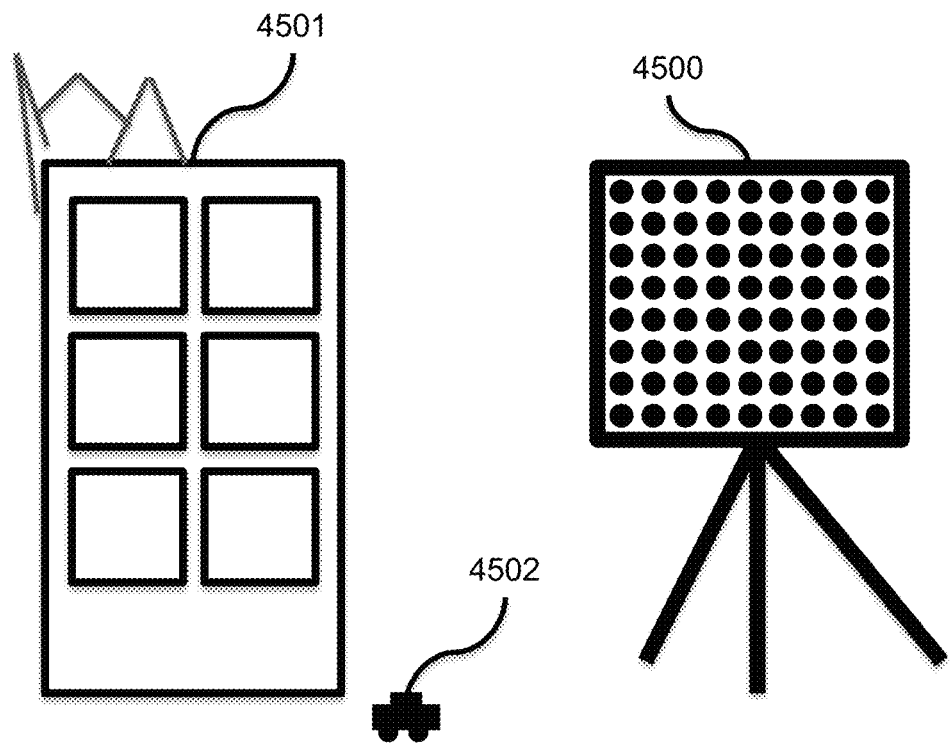
Fig 45B: First user's HDU
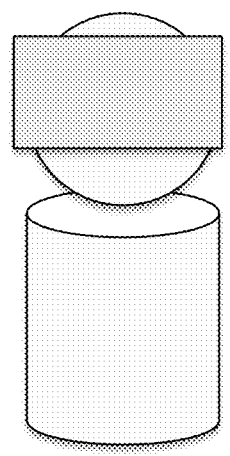
Fig 45C: Second user's HDU
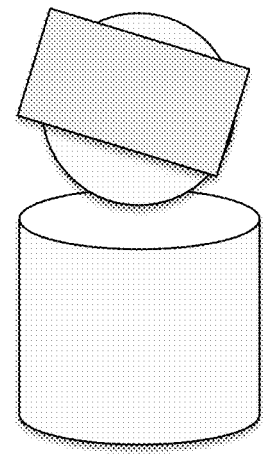

GESTURES / ACTIONS OF A USER TO MODIFY THE
PRESENTED STEREOSCOPIC IMAGERY

Example Control Features:
- Zoom
- Converge
- Change orientation
- Change brightness / color scheme

Example gestures of a user
- Squint (via facial recognition analysis)
- Move forward / lean forward (via head tracking)
- Turn head (via head tracking)
- Look to a different spot (via eye tracking)
- Finger / Hand / arm gestures determined by camera system (e.g., finger / hand / arm positions, e.g., hand motion such as a clap)
- Voice determined by a microphone (e.g., stating the word "zoom")

Example control devices of a user
- Standard TV controller
- Joystick
- Keyboard
- Mouse (e.g., roller)

Figure 46

USER RECORDS PRECISE MEASUREMENTS ALONG
WITH STEREOSCOPIC IMAGERY

USE COMMON APERTURE FOR MULTIPLE LENSES

IMMERSIVE VIEWING EXPERIENCE

TECHNICAL FIELD

Aspects of this disclosure are generally related to stereoscopic imagery on head display units.

CROSS REFERENCE TO RELATED APPLICATIONS

This application claims priority to U.S. patent application Ser. No. 17/187,828 filed on Feb. 28, 2021.

INTRODUCTION

Virtual reality displays provide 3D images to a user.

SUMMARY

All examples, aspects and features mentioned in this document can be combined in any technically conceivable way.

This patent teaches a method, software and apparatus for an immersive viewing experience by implementing a series of stereoscopic imaging systems.

A preferred embodiment of this patent is the acquisition of imagery from a smart device. A smart device may include a laptop, a phone, a tablet, a HDU, a TV or a monitor. The smart device is equipped with a left camera and a right camera. The left camera and said right camera are separated by a stereo distance. The preferred embodiment has the stereo distance separation equal to that of an average adult. The left camera acquires let viewing perspective imagery of an area at a first time point. The right camera also acquires right viewing perspective imagery of the area at said first time point. The left viewing perspective imagery and said right viewing perspective imagery comprise stereoscopic imagery. Next, is sending said stereoscopic imagery from said smart device via a wireless connection to a head display unit (HDU). Typically, this will be done via Bluetooth or via the Internet. Next, is displaying the stereoscopic imagery onto a head display unit (HDU), which may include a virtual reality display, an augmented reality display or a mixed reality display. The HDU has a left eye display and a right eye display. The left eye display fits over the left eye of a user. The right eye display fits over the right eye of a user. The HDU is worn by a first user. The HDU displays the stereoscopic imagery to said first user at a second time point, which is in near real time (e.g., within five seconds of said first time point). The left viewing perspective imagery is displayed on said left eye display, and the right eye viewing perspective is displayed on said right eye display.

Some implementations comprise a 2-way communication and display of near real time stereoscopic imagery. (Note: as this develops, it is assumed that bandwidth with increase with the advent of 5G communications. If, for some reason 5G were not available, then camera resolution could be adjusted to the locally available bandwidth.) User number 1 will be viewed in real time by stereoscopic cameras and these stereoscopic images will be transmitted through the internet (or other transmission means) to user number 2 who will receive the imagery and display these images in near real time on a stereo display unit (e.g., virtual reality, mixed reality headset). Simultaneously, user number 2 will be viewed in real time by stereoscopic cameras and these stereoscopic images will be transmitted through the Internet (or other transmission means) to user number 1 who will receive the imagery and display these images in near real time on a stereo display unit (e.g., virtual reality, mixed reality headset).

In some implementations, multiple users will be simultaneously viewed in real time by stereoscopic cameras and these stereoscopic images will be transmitted through the Internet (or other transmission means) to other users who will receive the imagery and display these images in near real time on their respective stereo display units (e.g., virtual reality, mixed reality headset).

In some implementations, a user may choose to point the stereoscopic cameras at a landscape scene or object of interest rather than being viewed by their stereoscopic cameras.

In some implementations, there will not be simultaneity of the transmit and display but more like the current email system wherein user number 1 writes an email and sends it and, at some time later, user number 2 would retrieves the email and subsequently responds to it. In this case, user number 1 would record a series of stereoscopic images; send these stereoscopic images to user number 2 who, at some subsequent time, retrieve and display the stereoscopic images on a stereo display unit. At this juncture, user number 2 could respond by creating and sending his/her set of stereoscopic images. During these implementations, it is envisioned that users would provide audio to accompany the stereoscopic images.

Some implementations comprise a 1-way communication of near real time stereoscopic imagery and display by separate user(s). User number 1 will be viewed in real time by stereoscopic cameras and these stereoscopic images will be transmitted through the Internet (or other transmission means) to user number 2 who will receive the imagery and display these images in near real time on a stereo display unit (e.g., virtual reality, mixed reality headset). Under this implementation, user number 2 would not be equipped with stereoscopic cameras and user number 1 may or may not be equipped with a stereo display unit but, in either case, user number 1 would not receive stereoscopic images of user number 2. Under this implementation, there would not be a limitation on the number of receive only users. As an example, a professor could be delivering a lecture employing stereoscopic cameras and personnel in the class would receive the stereoscopic images. In other implementations, user number 1 would record a series of stereoscopic images; send these stereoscopic images to user number 2 stereoscopic images to user number 2 who, at some subsequent time, retrieve and display the stereoscopic images on a stereo display unit. During these implementations, it is envisioned that users would provide audio to accompany the stereoscopic images.

Some implementations comprise real-time recording and display/playback of stereoscopic imagery with near real time. A user could use a mixed reality head display unit with stereoscopic cameras (described in a later portion of the specification) and a recording medium connected to the stereoscopic cameras. The user could: choose to point the stereoscopic cameras at a landscape scene or object of interest; film these areas/objects of interest using the stereoscopic cameras; record and store the stereoscopic imagery in the recording medium; and may choose to display what is being recorded on the mixed reality head display unit. After the filming session, the user may choose to forward the recorded stereoscopic imagery to others equipped with stereoscopic display units.

Some implementations comprise real-time recording of stereoscopic imagery and associated ranges obtained by laser range finder (LRF) also called LIDAR. In some implementations, a user could: use a mixed reality head display unit with stereoscopic cameras and a laser range finder (described in a later portion of the specification); and a recording medium connected to the head display unit to receive, record, and store data from the stereoscopic cameras and laser range finder. In some implementations, the user could accurately map an area (e.g., a room, house, or building) during which a combination of rapid laser scanning with turning of the stereoscopic cameras and laser range finder (e.g., the stereoscopic cameras could be mounted on the head display unit tripod and/or gimble, etc.) The user could also choose to point the stereoscopic cameras and laser range finder to determine range to an object. In some implementations, the area being filmed stereoscopically and measured could be reconstructed in virtual space.

There are several key components to this system. A dual set of cameras can be incorporated. These cameras can be appended to laptop computers in a manner similar to the current single camera. The dual cameras will be spaced an inter-ocular distance apart such the person(s) viewing the stereoscopic images collected by these cameras will provide the 3D effect for the recipient(s). In some implementations a variable/adjustable inter-ocular distance could be provided: closely spaced for children; moderately spaced for average sized persons; and wider than normal for large persons. Custom-made inter-ocular distance could be provided. In some implementations, the cameras will be positioned on the inside of the laptop overlooking the keyboard and focused on the user's face. In other implementations, the cameras could be positioned on the outside of the laptop such that the recipient(s) could view the surrounding environment/scenery of the user's position. Alternatively, two sets of cameras could be appended to the laptop—one on the inside and one on the outside. Control of the cameras could be made through keyboard inputs, pull down menus and associated cursor input, and audio input, etc.

In some implementations, two stereoscopic cameras could be appended to smart phones. Inter-ocular distance could be handled in much the same way as with laptop computers. The cameras could be on front (i.e., side with interactive icons) or the rear (i.e., opposite side from the front) or both sides.

In some implementations, the two stereoscopic cameras could be appended to a head display unit (HDU). Inter-ocular distance could be handled in much the same way as with laptop computers. In this implementation, the HDU could be connected to: a recording device via wireless or by connecting cable; the internet for interactive communication as described above; or viewed via the HDU display; or combinations of these interactions. Note that the HDU could operate in the mixed reality mode.

In some implementations, the two stereoscopic cameras could be appended to smart glasses (e.g., sunglasses). Inter-ocular distance could be handled in much the same way as with laptop computers. In this implementation, the smart sunglasses could be connected to: a recording device via wireless or by connecting cable; the internet for interactive communication as described above; or viewed via the smart sun glasses display; or combinations of these interactions. Note that the smart sunglasses could operate in the mixed reality mode.

In some implementations, the two stereoscopic cameras could be appended to a smart tablet. Inter-ocular distance could be handled in much the same way as with laptop computers. In this implementation, the smart tablet could be connected to: a recording device via wireless or by connecting cable; the internet for interactive communication as described above; or viewed via HDU or combinations of these interactions.

In some implementations, the two stereoscopic cameras of a commercial 3D camera could be utilized. Inter-ocular distance would be handled in accordance with the specifications of the commercial 3D camera. In this implementation, the commercial 3D camera could be connected to: a recording device via wireless or by connecting cable; the internet for interactive communication as described above; or viewed via HDU or combinations of these interactions.

In some implementations, two miniature camera clusters will be installed in each of the above camera configurations. Different look angles will be specified for each of the cameras in order to provide a very wide simultaneous field of view with very high resolution. Inter-ocular distance could be handled in much the same way as with laptop computers. In this implementation, the miniature camera cluster could be connected to: a recording device via wireless or by connecting cable; the internet for interactive communication as described above; or viewed via HDU or combinations of these interactions. Note, in this implementation, the very wide field of view would nominally exceed that of a display unit and, importantly, the user (or viewer(s) could select a sub-set of the field of view to watch at any particular time and change that selection of field of view as their interests directed.

In some implementations, a single ball of miniature camera pairs will be specified. Different look angles will be specified for each of the camera pairs in order to provide a very wide simultaneous field of view with very high resolution. Based on the position on the ball, the different camera pairs will contribute to the very wide simultaneous field of view. The surface of the ball could spherical and smooth or faceted to provide a flat surface for each of camera pairs. Inter-ocular distance could be handled as a standard separation of members of the pair of cameras or custom separation for special purposes. Note that adjacent cameras with appropriate spacing could contribute at any point in time for stereoscopic image pairs at varying time points. In this implementation, the miniature camera pairs could be connected to: a recording device via wireless or by connecting cable; the Internet for interactive communication as described above; or to a HDU. Note, in this implementation, the very wide field of view would nominally exceed that of a display unit and, importantly, the user (or viewer(s)) could select a sub-set of the field of view to watch at any particular time and change that selection of field of view as their interests directed.

In some implementations, a new functionality would be incorporated into the HDU in order to operate with the miniature camera clusters or the single ball or miniature camera pairs. The HDU would need to incorporate an inclinometer to monitor the orientation and inclination of head position in real time. The HDU would need to provide an eye tracking capability. The initialization process would synchronize the initial look angle and inclination of the HDU with the center of the field of view of the stereoscopic imagery. The user could then, using a control unit select a sub-field of view to be displayed on the HDU. (Note: this could be done by a variety of options which include but are not limited to: numbered regions available on pull down menu; circling a region of interest; voice command, etc.) Then, after this sub-region was displayed and, in conjunction with the eye trackers, focus the eyes foveal region on the particular region of the region of interest, which was captured by particular cameras within the two camera clusters or cameras within the ball. Note that the eye trackers could map each eye projected line of sight to a spot or grid on the display, which could, in turn, be associated with particular cameras.

In some implementations, image processing will be applied to provide a virtual background for the user, which could be appended to the display of user, which would be in 3D. The background could be of two dimensions but preferably be in 3D. The background could be selected from a wide variety of library of 3D scenes, such as beach scene, mountain scene or office scene. In some embodiments, the library of 3D scenes could be dynamic, such waterfall or waves in the ocean.

In some implementations, image processing will be applied to provide image enhancements to the user's body (e.g., pimple removal, improved hair bulk or style).

In some implementations, image processing will be applied to provide an artificial appendage to the user, which could be appended to the display of user, which would be in 3D. An example would be a suit and tie appended to the user when in a business meeting which would cover up a T-shirt. The appendage would be registered to features of the user such as face and body structure.

Some embodiments comprise using a microphone in proximity to said smart device. Sound can be recorded at the smart device. The sound can be played on a speaker in proximity to said HDU wherein said playing said sound occurs in synchrony with said stereoscopic imagery.

Some embodiments comprise moving the smart device farther from an object within said area. This would make the object appear to be moved away from a user viewing the stereoscopic imagery on the HDU.

Some embodiments comprise moving the smart device closer to an object within said area. This would make the object appear to be moved closer to a user viewing the stereoscopic imagery on the HDU.

Some objects comprise canting in a sensor on a left camera and a right camera over time. Specifically, at an initial time point, the direction a sensor corresponding to said left camera is facing and the direction a sensor corresponding to said right camera is facing are parallel. Subsequently, the direction said sensor corresponding to said left camera is facing and direction said sensor corresponding to said right camera is facing are converging.

Some embodiments comprise a range of acquisitions. For example, stereoscopic imagery could allow a user to view the stereoscopic imagery of oneself.

Some embodiments include using stereoscopic camera clusters and stereoscopic LIDAR acquisition. Some embodiments include integrating inertial measurement unit (IMU) for head tracking and eye tracking systems to direct field of view of the stereoscopic imagery displayed on said HDU.

Some embodiments include placing stereoscopic imaging devices on a convex surface (with or without a grid) or a set of robotic arms.

Some of the techniques in this patent are performed by utilizing techniques described in: U.S. patent application Ser. No. 15/878,463, Interactive 3D cursor for use in medical imaging; U.S. patent application Ser. No. 16/010,925, Interactive placement of a 3D digital representation of a surgical device or anatomic feature into a 3D radiologic image for pre-operative planning; U.S. patent application Ser. No. 15/904,092, Processing 3D medical images to enhance visualization; U.S. patent application Ser. No. 15/949,202, Smart operating room equipped with smart surgical devices; U.S. Pat. No. 9,473,766, Method and apparatus for three dimensional viewing of images; U.S. Pat. No. 9,615,806, Method and apparatus for creation and display of artifact corrected three dimensional (3D) volumetric data from biplane fluoroscopic image acquisition; U.S. patent Ser. No. 14/644,489, Method and apparatus for creation and display of artifact corrected three dimensional (3D) volumetric data from biplane fluoroscopic image acquisition; U.S. Pat. No. 9,980,691, Method and apparatus for three dimensional viewing of images; U.S. Pat. No. 9,349,183, Method and apparatus for three dimensional viewing of images; U.S. patent application Ser. No. 16/195,251, Interactive voxel manipulation in volumetric medical imaging for virtual motion, deformable tissue, and virtual radiological dissection; U.S. patent application Ser. No. 16/509,592, Implantable markers to aid surgical operations; U.S. patent application Ser. No. 16/524,275, Using geo-registered tools to manipulate three-dimensional medical images; PCT/US19/478, A virtual tool kit for radiologists; U.S. patent application Ser. No. 16/563,985, A method and apparatus for the interaction of virtual tools and geo-registered tools; U.S. patent application Ser. No. 16/594,139, Method and apparatus for performing 3D imaging examinations of a structure under different configurations and analyzing morphologic changes; U.S. patent application Ser. No. 16/683,256, Method and apparatus for performing 3D imaging examinations of a structure under different configurations and analyzing morphologic changes; U.S. patent application Ser. No. 16/703,629, Radiologist-assisted machine learning with volume-subtending 3D cursor; PCT/US19/239, Radiologist-assisted machine learning with interactive, volume-subtending 3D cursor; U.S. provisional application No. 62/843,612, A method of creating a computer-generated patient specific image; U.S. provisional application No. 62/846,770, A method of prioritized volume rendering to improve visualization of prioritized items within a 3D volume; U.S. provisional application No. 62/850,002, A method of creating an artificial intelligence generated differential diagnosis and management recommendation tool boxes during medical personnel analysis and reporting; U.S. patent application Ser. No. 16/654,047, A method to modify imaging protocols in real time through implementation of artificial intelligence; US provisional application No. 62/856/185, A method of image manipulation based on eye tracking; U.S. patent application Ser. No. 16/506,073, A method for illustrating direction of blood flow via pointers; U.S. patent application No. 62/906,125, A method and apparatus for stereoscopic rendering of mobile fluids; and, U.S. patent application No. 62/939,685, Method and apparatus for development of an organ-specific coordinate system.

BRIEF DESCRIPTION OF THE FIGURES

FIG. 2 illustrates system hardware for this invention. A text box is shown.
FIG. 3 illustrates system software.
FIG. 4 illustrates mapping the camera coordinate system into a GPS coordinate system.

FIG. 7A illustrates at time point #1 where three observers are overlooking a city scene.

FIG. 7B illustrates at time point #2 where the three observers in FIG. 7A are still overlooking a city scene, but different parts of the scene.

FIG. 9A illustrates a nature scene, which illustrates multiple objects at different distances from the user.

FIG. 9B illustrates a table, which shows the objects, ranges, camera angles, cameras used and notes.

FIG. 10A illustrates a straight view (looking straight at end of table) from left camera pointed at two objects (a can and a honey jar) on a table.

FIG. 10B illustrates a second image from left camera, which is in the same position but canted inward 20° (towards the can and the honey jar).

FIG. 10C illustrates a straight view (looking straight at end of table) from a left camera pointed at two objects (a can and a honey jar) on a table.

FIG. 10D illustrates a second image from left camera, which is in the same position but canted inward 20° (towards the can and the honey jar).

FIG. 15A illustrates a first cant angle with a first convergence point.

FIG. 15B illustrates a second cant angle with a second convergence point.

FIG. 16A illustrates a first stereo separation with a first convergence point.

FIG. 16B illustrates a second stereo separation with a second convergence point.

FIG. 17A illustrates a first cant angle and a first stereo separation with a first convergence point.

FIG. 17B illustrates a second cant angle and a second stereo separation with a second convergence point.

FIG. 20A illustrates a side view of a hemispherical high resolution camera cluster.

FIG. 20B illustrates a bottom view of a hemispherical high resolution camera cluster.

FIG. 21A illustrates a bottom view of a convex surface containing two high resolution camera clusters at first positions.

FIG. 21B illustrates a bottom view of a convex surface containing two high resolution camera clusters at second positions.

FIG. 22A illustrates a top down view of a user's eyes, which shows that a user's eyes are in a straight forward position.

FIG. 22B illustrates a top down view of two cameras on a convex surface, which shows that the cameras are in a straight forward position.

FIG. 22C illustrates a top down view of a user's eyes, which shows that a user's eye are in a looking right position.

FIG. 22D illustrates a top down view of two cameras on a convex surface, which shows that the cameras are in a straight forward position.

FIG. 26A illustrates a user viewing imagery collected by a camera in FIG. 26B.

FIG. 26B illustrates the position of two mobile cameras on a convex surface, which corresponds to the HDU orientation in FIG. 26A.

FIG. 26C illustrates a user viewing imagery collected by a camera in FIG. 26D.

FIG. 26D illustrates the position of two mobile cameras on a convex surface, which corresponds to the HDU orientation in FIG. 26C.

FIG. 27A illustrates a user viewing imagery collected by a camera in FIG. 27B.

FIG. 27B illustrates two cameras on a convex surface which are selected corresponds to the HDU orientation in FIG. 27A.

FIG. 27C illustrates a user viewing imagery collected by a camera in FIG. 27D.

FIG. 27D illustrates the position cameras on a convex surface, which corresponds to the HDU orientation in FIG. 27C.

FIG. 28 illustrates a grid system used to generate the corresponding left eye view with the left eye camera and used to generate the right eye view with the right eye camera.

FIG. 33A illustrates stereoscopic communications between a first user wearing a HDU with stereoscopic display working on a laptop with stereo cameras and a second user wearing a HDU with stereoscopic display and working on a laptop with stereo cameras.

FIG. 33B illustrates stereoscopic communications between a first user with a laptop with stereo cameras and a second user wearing a HDU with stereoscopic display.

FIG. 33C illustrates stereoscopic communications between a first user with a laptop and a second user wearing a HDU and holding a phone with stereo cameras.

FIG. 33D illustrates stereoscopic communications between a first user wearing a HDU with stereoscopic display working on a laptop with stereo cameras and a second user wearing a HDU with stereoscopic display working on a phone with stereo cameras.

FIG. 36A illustrates a top down view of a football field showing placement of multiple camera clusters.

FIG. 36B illustrates a side view of a football field showing placement of multiple camera clusters.

FIG. 37A illustrates a stereoscopic camera cluster with different sets of lenses.

FIG. 37B illustrates a top down view of cross section A from FIG. 37A.

FIG. 37C illustrates a top down view of cross section B from FIG. 37A.

FIG. 37D illustrates a top down view of cross section C from FIG. 37A.

FIG. 39A illustrates a top down view of a stereoscopic camera cluster on a head display unit.

FIG. 39B illustrates a side view of a stereoscopic camera cluster on a head display unit.

FIG. 40A illustrates a top down view of the instantaneous field of view (FOV) of the stereoscopic camera system.

FIG. 40B illustrates a top down view of the instantaneous field of view (FOV) of the stereoscopic camera system.

FIG. 41A illustrates a left view of an image of a user and the user's natural background scene.

FIG. 41B illustrates a left view of an image of a user and implementation of a simulated, stereoscopic background scene of a user.

FIG. 42A illustrates a left view of an image of a user and implementation of a dynamic simulated, stereoscopic background scene of a user.

FIG. 42B illustrates a left view of an image of a user and implementation of a dynamic simulated, stereoscopic background scene of a user.

FIG. 43A illustrates a left view of a stereoscopic image of a first user.

FIG. 43B illustrates a left view of a stereoscopic image of a first user. 4300b illustrates the first user, whose face is now tan.

FIG. 44A illustrates a left viewing perspective of a stereoscopic image set of a user of with the actual dress appearance.

FIG. 44B illustrates a left viewing perspective of a stereoscopic image set of a user with the simulated dress appearance.

FIG. 45A illustrates placing a stereoscopic camera system with a wide field of view at a scene with an ongoing event.

FIG. 45B illustrates placing a first user viewing a first field of view within the scene on a stereoscopic HDU.

FIG. 45C illustrates placing a second user viewing a second field of view within the scene on a stereoscopic HDU.

FIG. 46 illustrates a text box showing gestures or actions that a user can do to modify the stereoscopic imagery.

DETAILED DESCRIPTIONS

The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

FIG. 1 illustrates

Figure 1A:
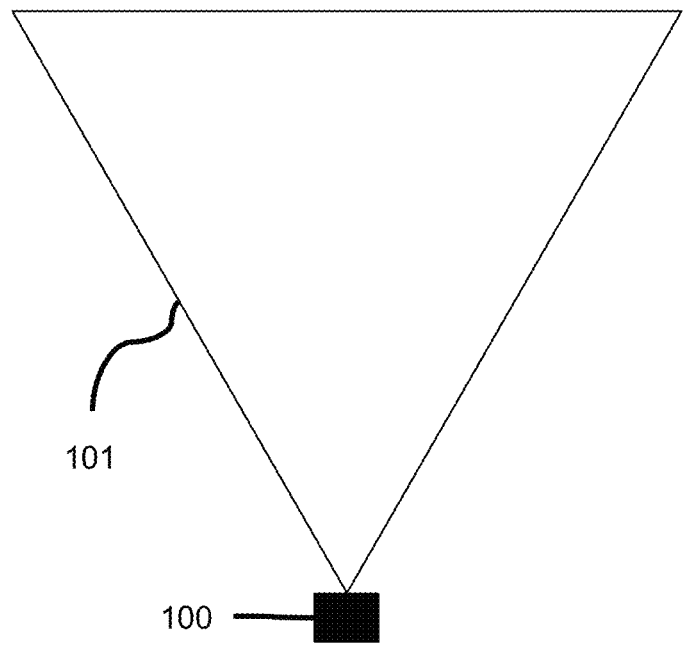
FIG. 1A illustrates a top down view of a video recording.

FIG. 1A illustrates a top down view of a video recording. 100 illustrates a video camera. 101 illustrates the field of view of a video camera.

Figure 1B:
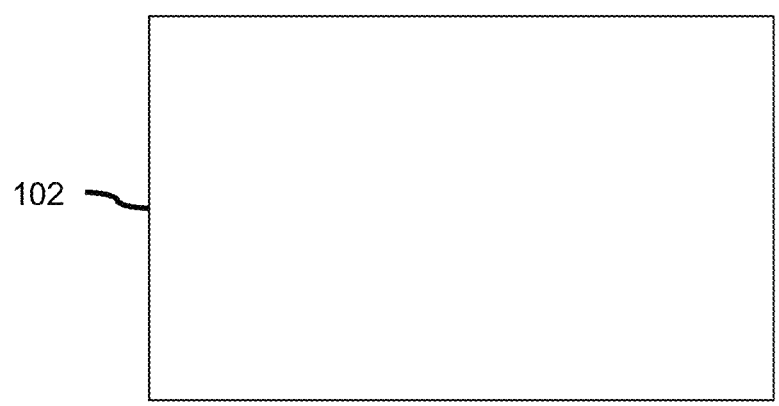
FIG. 1B illustrates a displayed 2D image frame of the video recording.

FIG. 1B illustrates a displayed 2D image frame of the video recording. 102 illustrates a 2D image frame of the video recording. This 2D image frame could be presented on a large movie theater screen or a home TV.

FIG. 2 illustrates system hardware for this invention. A text box is shown.

A key system hardware of this patent is the use of a stereoscopic camera system. A stereoscopic camera mounted on different smart devices is envisioned, which include, but are not limited to the following: smart phone; tablet; desktop computer monitor; and, laptop. Another embodiment is the mounting of mobile stereoscopic cameras on a convex grid.

Another embodiment is the use of a stereoscopic cluster of cameras. The stereoscopic camera system will be to generate a composite stereoscopic dataset of extremely high resolution of all objects within a scene. The cameras would have variable inter-ocular distance in accordance with their intended application. For example, a laptop would have stereoscopic cameras spaced out at approximately the standard human inter-ocular distance, which is approximately 2.5 in. Other stereoscopic ball camera setups (discussed later in this patent) would have stereo separations of much larger than the human interocular distance, which would be advantageous for providing stereoscopic viewing at long ranges. The lenses could be prime lenses of zoom lenses. For example, zoom lens could be used with a 24-70 mm lens with full frame setup.

Another key system hardware of this patent is the use of visual display options. A stereoscopic head display unit (HDU), such as augmented reality, mixed reality or virtual reality displays could be used. Examples include, but are not limited to HoloLens, Magic Leap, Oculus, HTC Vive. Ideally, the stereoscopic HDU would have both head tracking and eye tracking. Next, the option is a large home theater TV display (e.g., 180-270° horizontal field of view for the user) where the user could use a variety of stereoscopic displays in conjunction with this to yield large FOV stereoscopic display. Next is the large home theater screen (e.g., 180-270° horizontal field of view for the user) in conjunction with a multiple projector system. System interfaces including audio system (e.g., microphone and/or speaker) and communication links can also be incorporated.

Finally, system hardware includes support accessories. First, a global positioning system (GPS) can be incorporated onto the camera system. Next, an inertial measurement unit (IMU) system can be incorporated into the camera system. Next, a graphical user interface (GUI), such as a keyboard, joystick, mouse or controller can be incorporated. Additionally, a lidar system can be incorporated into the camera system or the head display unit, as described in U.S. patent application Ser. No. 16/828,352, which is incorporated by reference in its entirety. Next, a computer system is needed. Next, speakers would be used to provide sound to the user. A power supply is needed. A microphone is needed for control via voice commands. A recorder is needed in conjunction with the camera system for image playback. A tripod is needed. Cables are also used, as required.

FIG. 3 illustrates system software. First, system initialization software and system control software are needed. Software is needed to provide communication between the key components of the system, which include the camera system, the HDU, the image recorder and the computer system. Software for dataset processing is also required. For example, the camera system could generate datasets of a first size (e.g., 150 megapixel (MP) per frame), but present the data to a user at a significantly smaller size (e.g., 6 MP per frame). In some embodiments, the large dataset would be stored in the cloud and streamed during viewing (e.g., via 5G rates). Thus, communications software (e.g., with the internet) would be needed. In some embodiment, the portions of the dataset downloaded can be in performed based on the look angle of a user. For example, if a user is looking forward, the forward part of the scene would be streamed. And, if the user looks to the left, then the left portion of the scene would be streamed. Next, camera selection software (in multiple camera systems discussed later in this patent) would be needed. Next, software for control inputs for the camera system would be needed. For example, inputs could be from a roller ball mouse GUI or from voice commands via the recorder or from HDU sensors (e.g., head tracking and eye tracking). Next, image stabilization software is needed. Next target tracking software is needed. For example, if a target could be a defensive back on the football team. Next, scene recognition software is needed. For example, a wildlife conservationist looks for animals and hazardous areas. Next, software performing integration of target tracking with camera movements on a grid is needed. Next, image optimization software is needed, which includes optimizing image acquisition from the camera system or optimizing images after acquisition. For example, the camera system could perform tasks, which include, but are not limited to the following: auto-focus; convergence angle adjustment; and, incorporation of range data for image optimization. Next, image stitching software could be performed. For example, in a multiple camera cluster system with wherein a first camera within the camera cluster has an overlapping field of view with a second camera within the camera cluster, the two images could be stitched together to remove the overlap and generate one larger composite image. Software for integration of multiple camera systems (e.g., dual camera on convex surface grid system with HDU) is implemented. Finally, software for power supply monitoring and management is implemented.

Figure 5A:
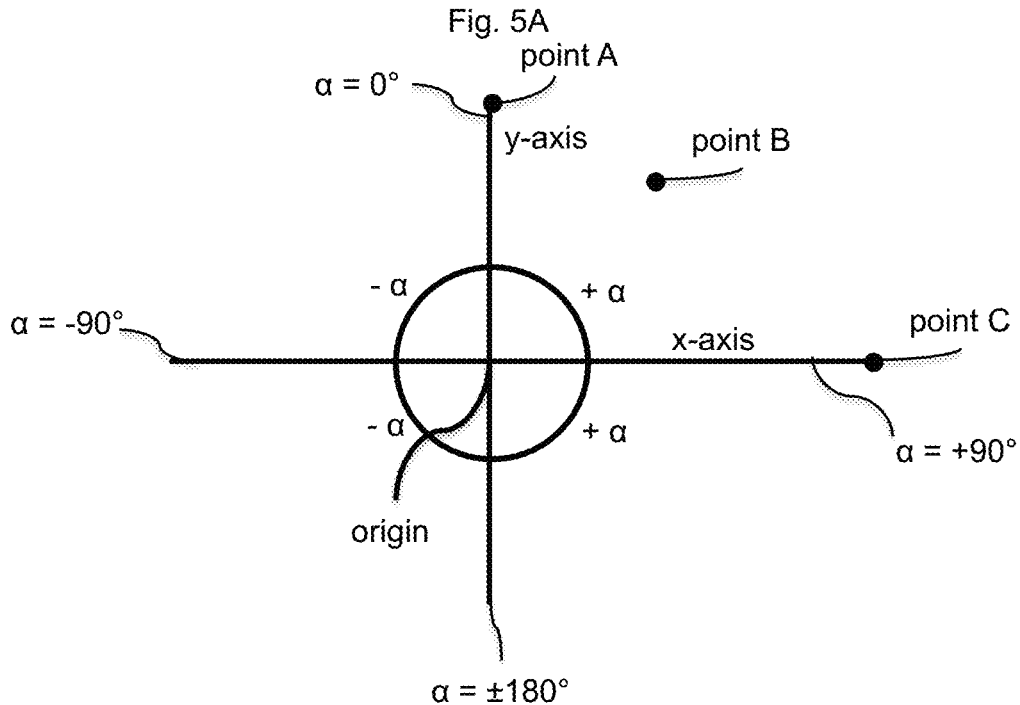
FIG. 5A illustrates the preferred coordinate system with a view looking from point D looking down towards the x-y plane.

FIG. 4 illustrates mapping the camera coordinate system into a GPS coordinate system. 400 illustrates a processing block of determining a precise initial camera location (e.g., at t=0, determine GPS coordinate of camera). Note a calibration with objects with known GPS locations, such as a flag pole could be performed. 401 illustrates a processing block of initializing a precise camera orientation (e.g., initialize inertial measurement unit in conjunction with GPS to determine camera orientation and level with respect to true North and horizontal, which are part of the overall camera system). For example, with respect to the coordinate system outlined in FIG. 5A, at a first time point, the overall camera apparatus $\alpha$ angle could be 90° and the camera $\beta$ angle could be 0° to correspond to true north and horizontal. An option for a low-cost system would be a compass in conjunction with a carpenter's level. At this point, the camera system would be geo-registered. Note that a head tracking system could be incorporated. 402 illustrates a processing block of initializing the eye tracking system with respect to which pairs of cameras. 403 illustrates a processing block wherein for time points, record location of the camera, orientation of the camera (which will account for head position changes if camera is on a HDU), and eye movements (e.g., for camera pair selection) over time. Note: that the coordinate system described in FIG. 5A is fixed with respect to the camera. Note that the camera system's orientation could be remapped to the GPS and North oriented system based on the data from the IMU. For example, at a first time point, the camera's pointing direction (defined as $\alpha$ angle 90°) could align with true North of 0°; thus, $\alpha$ angle of 90° would correspond to true North of 0°. The IMU could, at time point #2, determine that the camera changed orientation to NorthEast (45°); thus, $\alpha$ angle of 90° would correspond to true NorthEast of 45°. 404 illustrates a processing block wherein for time points, record images from cameras. Note: image stabilization could be invoked. Note: some of the cameras may not be performing continuous recording. 405 illustrates a processing block of assigning objects within the scene GPS locations based on a combination and integration of LiDAR ranges, camera location, camera orientation (e.g. could change based on head tracking). For example, this could be done automatically by scene mapping or by a user placing cross-hairs on an object. An intersection/resection approach could be used by two geographically separated observers equipped with the camera systems to fine tune the location of the objects. Note: eye tracking could also be used to determine what locations the user saw over time. Audio recording could also complement the imagery.

FIG. 5A a view looking from point D looking down towards the x-y plane. This shows the x-y plane. A camera is located at the origin. A reference for the origin could be a GPS location. The y-axis is defined as the direction where the video camera is facing. For a stereoscopic pair of cameras, the y-axis is defined as the direction from the midpoint of the two cameras in a forward direction where the cameras are looking. In the event, that a multiple camera situation is utilized, an arbitrary camera can be defined as the y-axis. An angle, +α or −α is used to describe the first coordinate of points within the scene. Using this coordinate system, point A has an a of 0°, point B has an a of approximately +45°, point C has an a of +90°.

Figure 5B:
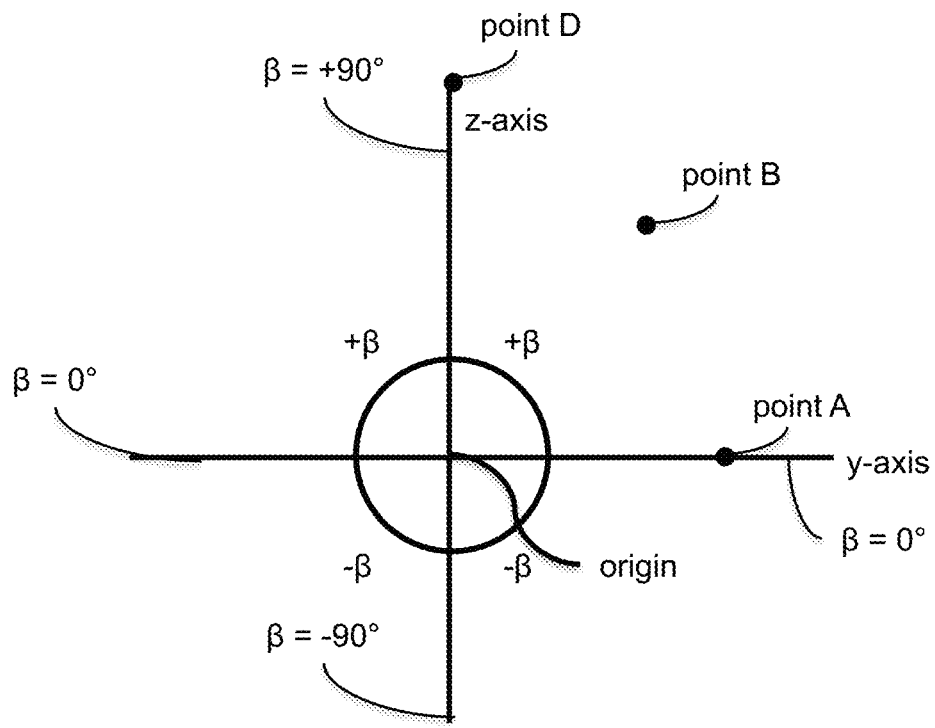
FIG. 5B illustrates the preferred coordinate system with a view from point C looking towards the y-z plane.

FIG. 5B illustrates a view from point C looking towards the y-z plane. The video camera is located at the origin. The z-axis is perpendicular (normal) to the x-y plane. An angle, +β or −β is used to describe the second coordinate of points within the scene. Using this coordinate system, point A has a β of 0°, point B has a β of +45°, point D has a β of +90°. Each point will also have a third coordinate, which is the distance from the origin. Thus, each point will have a coordinate of (α, β, r) where r is the distance from the point to the origin. Thus, point A will have a coordinate of (0°, 0°, 16 m). Point B will have a coordinate of (+45°, +45°, 13 m). Point C will have a coordinate of (+90°, 0°, 25 m). Point D will have a coordinate of (0°, +90°, 25 m). It should be noted that the origin of this camera system is located at a specific GPS location on a map. Thus, objects within the scene can be mapped on this preferred camera coordinate system. Since the camera coordinate system can be mapped (and remapped if the camera moves or changes orientation), the objects within the camera imagery can also be assigned GPS coordinates.

Figures 6A, 6B:
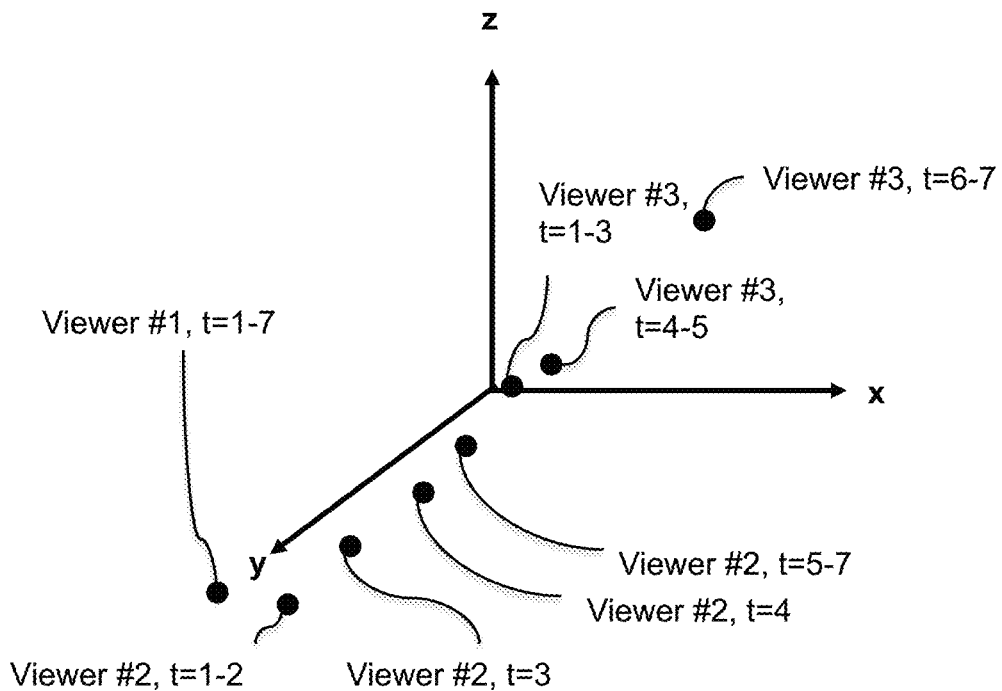
FIG. 6A illustrates the locations where multiple viewers are looking plotted on the coordinate system.
FIG. 6B illustrates the locations where multiple viewers are looking in FIG. 6A as displayed in a table.

FIG. 6A illustrates the locations where multiple viewers are looking plotted on the coordinate system.

FIG. 6B illustrates the locations where multiple viewers are looking in FIG. 6A as displayed in a table. Seven time points are shown for three viewers. Each viewer has a unique viewing pattern. In this patent, each viewer will be provided with an individualized stereoscopic image set.

FIG. 7A illustrates at time point #1 where three observers are overlooking a city scene. Observer #1's field of view at time point #1 700a is positioned so that observer #1 is observing a park where some people are out and moving about. Observer #1's field of view subtends a small, elliptical-type field of view at park level. Observer #2's field of view at time point #1 701a is positioned so that observer #2 is observing traffic along a city street. Observer #2's field of view is a rectangular field of view, which encompasses a significant portion of the street. Observer #2's field of view subtends a narrow trapezoid-type field of view at street level. Observer #3's field of view at time point #1 702a is positioned so that observer #3 is observing a flag pole on top of a building. Observer #3's field of view is a narrow field of view. Observer #3's field of view subtends a trapezoidal-type field of view above the camera level.

FIG. 7B illustrates at time point #2 where the three observers in FIG. 7A are still overlooking a city scene, but different parts of the scene. Observer #1's field of view at time point #2 700b is positioned so that observer #1 is now looking at traffic patterns along a city street. Observer #1's field of view at time point #2 illustrates an elliptical-type field of view at street level. Observer #2's field of view at time point #2 701b is positioned so that observer #2 is now observing a park where people are moving about. Observer #2's field of view at time point #2 illustrates a trapezoidal-type field of view at park level. Observer #3's field of view at time point #2 702b is positioned so that observer #3 is now looking at the entire building, which contains the flag pole on top. Observer #3's field of view is a narrow field of view. Observer #3's field of view subtends a trapezoidal-type field of view above and below the camera level.

Figure 8A:
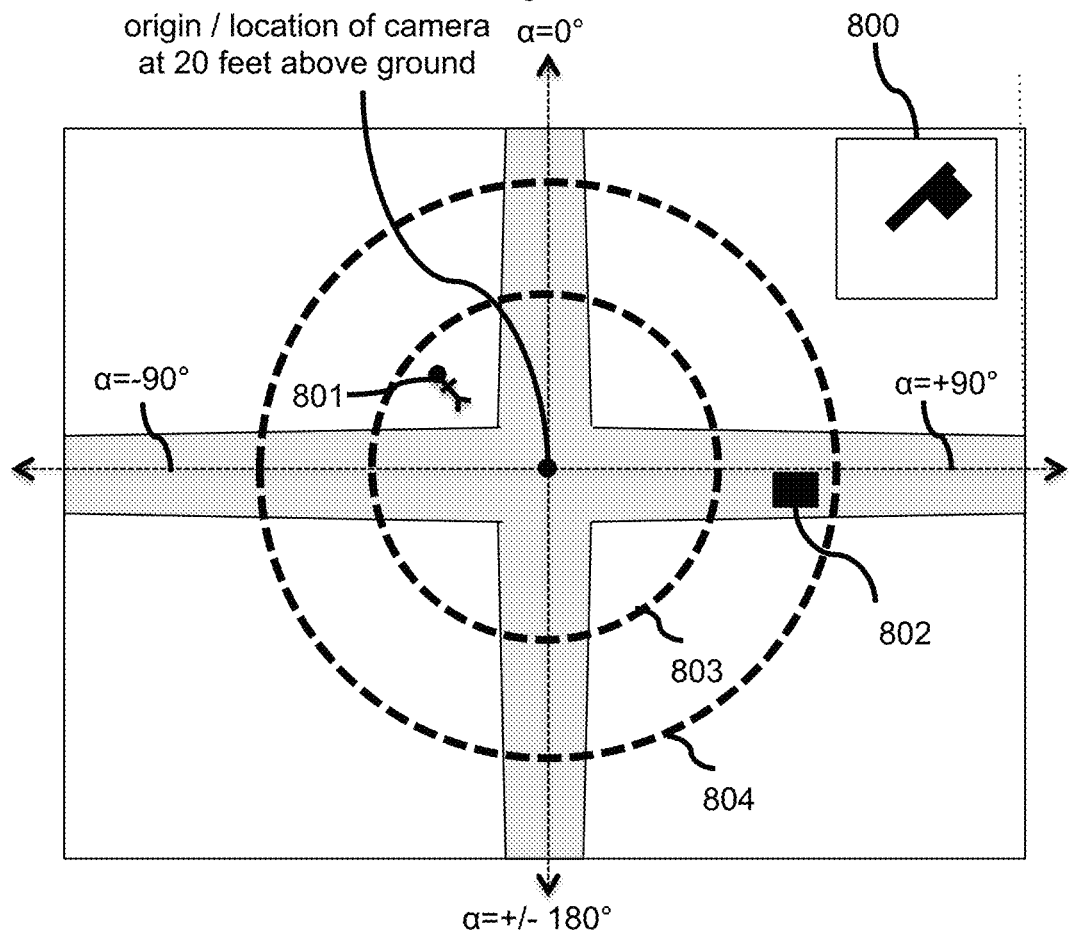
FIG. 8A illustrates a downward view from a near-spherical, stereoscopic camera system on a pole in the center of generic city.

FIG. 8A illustrates a downward view from a near-spherical, stereoscopic camera system on a pole in the center of generic city. The black circle at the center of the figure represents the location of a near-spherical, stereoscopic camera system, which is at the origin of this coordinate system. The camera is on a pole 20 feet above the ground. The x-y plane is parallel to ground level, but 20 feet above it. The near-spherical, stereoscopic camera system with capability of acquiring very high resolution imagery of anywhere where line of sight exists. The camera system is running continuously providing close, medium and far range convergence of any direction a viewer selects. Thus, a user located in Orlando has the ability to select a portion of the imagery flow from the near-spherical, stereoscopic camera system and view what is going on his or her selected region of interest. Suppose the user in Orlando wants to view the flag mounted on top of a building 800, which has a coordinate of (+45°, +20°, 2000 ft.). Similarly, a man located in London could select a portion of the imagery that is of interest to him. In this example, the London man is interested in a car 802, which has a coordinate of (+90°, −30°, 300 ft.). Similarly, a woman in Tokyo could select a portion of the imagery that is of interest to her. She is interested in looking at person 801 with a coordinate of (−45°, −60°, 100 ft.). Dashed circle 803 illustrates a region wherein two closely spaced (e.g., 10 inches apart) cameras in stereoscopic mode from the camera system can be used in conjunction to generate stereoscopic images where convergence is possible. Dashed circle 804 illustrates a region wherein two medium spaced (e.g., 20 inches apart) cameras in stereoscopic mode from the camera system can be used in conjunction to generate stereoscopic images where convergence is possible. Note that beyond dashed circle 804 illustrates a region wherein stereoscopic viewing is not available. Note that multiple cameras are used to create the composite image. Images from each camera will therefore be stitched together.

Figure 8B:
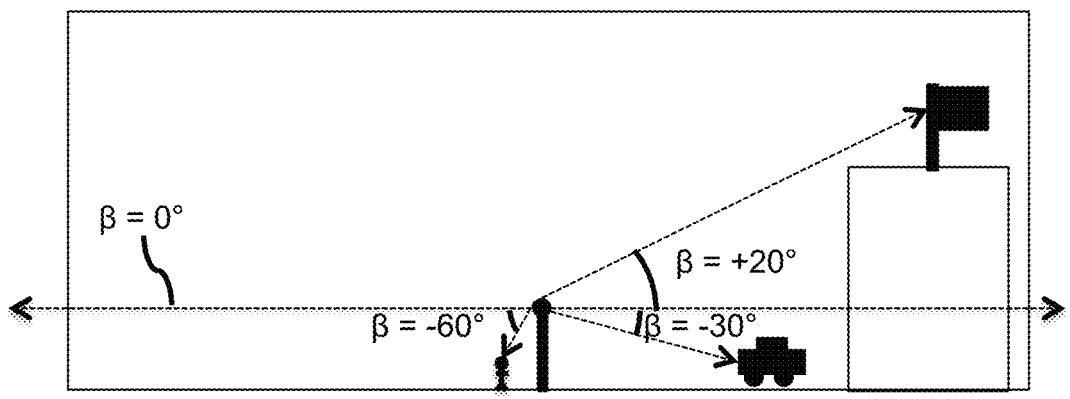
FIG. 8B illustrates β coordinates to correspond to the objects viewed in FIG. 8A.

FIG. 8B illustrates β coordinates to correspond to the objects viewed in FIG. 8A.

FIG. 9A illustrates a nature scene, which illustrates multiple objects at different distances from the user. This camera system has the capability of near real time system to bring into the best possible picture based on eye tracking of a user at different moments in time. The image displayed at this time point has several objects that might be of interest to a person observing the scene. An eye tracking system (e.g., on a head display unit) would be needed in this embodiment. For example, if a user is viewing the mountains 900 or cloud 901, the cameras (e.g., located on a tripod or a HDU) used would be optimized for long range viewing. If a user is viewing a deer 902, then the cameras used to deliver the image to the user would be optimized for medium range. Finally, if a user is viewing a nearby flower, then the cameras used to deliver the image to the user would be optimized for closer range. An example scenario: a user is walking around developing a travel log for a national park. The user has a headset with two pairs of stereoscopic cameras and one long range camera. Recording is done in real time. Cameras could use prime or zoom lenses. For example, a first pair of zoom lenses optimized for stereoscopic imagery for nearby objects (e.g., arm's length such as the flower 902) is utilized. A second pair of zoom lenses optimized for stereoscopic imagery for medium range objects (e.g., the deer 902) is utilized. A single camera is utilized for distance objects (e.g., the mountains 900 or clouds 901) is utilized. Headset and eye tracking, which switches camera pairs depending on where the user is looking and providing dialog. In some embodiments, filming is performed with either close convergence for nearby objects, medium convergence for medium range objects or infinite convergence for long range objects, so only one range of imagery is collected in a single time point. In other embodiments, cameras could be taking imagery simultaneously and the image stitched together into one single composite image.

FIG. 9B illustrates a table, which shows the objects, ranges, camera angles, cameras used and notes. Note that the stereo distance could be wider for the medium range objects as compared to the close range objects, if desired.

FIG. 10A illustrates a straight view (looking straight at end of table) from left camera pointed at two objects (a can and a honey jar) on a table. Note that the near object overlaps slightly with the far object.

FIG. 10B illustrates a second image from left camera, which is in the same position but canted inward 20° (towards the can and the honey jar). Note that the objects appear slightly more separated and a more of the honey jar label can be seen as compared to FIG. 10A. Also note that a chair and a door (which were not visualized in FIG. 10A) can be seen on this 20° canted image. Thus, canting the cameras inward improve over the prior art by creating more eye appealing images by implementing a physiologically correct effect of altering overlap of two structures (the honey jar and the can) on the canted inward image. Moreover, this technique is useful for utilizing the central component (rather than peripheral component) of the image, which can have superior quality.

FIG. 10C illustrates a straight view (looking straight at end of table) from a left camera pointed at two objects (a can and a honey jar) on a table. Note that the near object overlaps slightly with the far object.

FIG. 10D illustrates a second image from left camera, which is in the same position but canted inward 20° (towards the can and the honey jar). Note that the objects appear slightly more separated and a more of the honey jar label can be seen as compared to FIG. 10C. Also note that a chair and a door (which were not visualized in FIG. 10A) can be seen on this 20° canted image.

Figure 11:
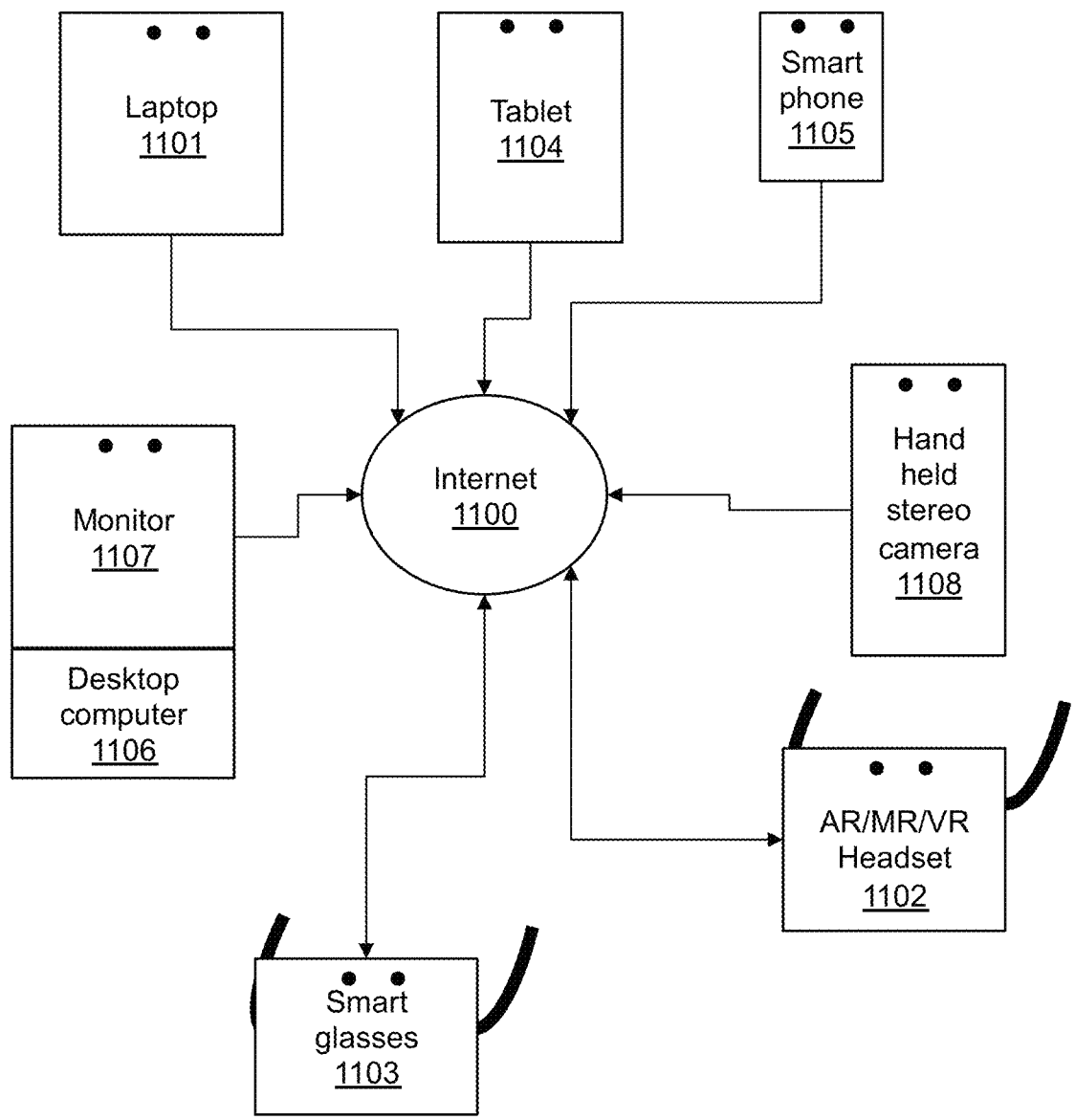
FIG. 11 illustrates integration of stereoscopic camera systems into smart devices.

FIG. 11 illustrates integration of stereoscopic camera systems into smart devices. This figure illustrates a variety of stereoscopic camera systems and stereoscopic display systems operating in conjunction with the internet 1100 to facilitate the stereoscopic camera interchanges between users. 1101 displays a laptop computer wherein stereoscopic cameras are depicted by 2 dark filled in circles. Given these stereoscopic cameras were on the inside of the laptop (e.g., above the laptop display screen) and the cant angle of the laptop display were such that these cameras focused on the face of the laptop user, then stereoscopic imagery could be sent through the internet to an intended recipient(s). These stereoscopic cameras would be separated as per inter-ocular distance which would include but not be limited to the following: standard for interactions with a generalized or average amongst the adult population; adjustable to match the facial structure of the recipient; close to match different year groups of youth population; wide for those with large facial structures, etc. The look angle of these stereoscopic cameras could be tilted in to provide convergence at a nominal distance from the laptop user's face. This convergence point could also be adjustable. This would generate the most physiologically accurate imagery. A variation of the stereoscopic cameras locations could be on the outside (i.e., side external to the display side looking away from the user of the laptop). Inter-ocular distance could be as described above. In this configuration, the stereoscopic cameras could be pointed straight forward to provide the recipient with stereoscopic imagery of the scenery that the laptop user is seeing. The connection of the stereoscopic cameras to the internet is shown as a one-way communication in that the laptop would not typically be considered a stereoscopic unit. If, however, the user of the laptop were wearing an AR/MR/VR Headset 1102 or Smart Glasses 1103, then the arrow connecting the laptop to the internet could be a two-way arrow. An additional configuration would be for the user to record on the laptop a discussion or lecture using the stereoscopic cameras. The discussion or lecture could, at some later time, be disseminated through the internet or some digital recording device. 1104 depicts stereoscopic cameras appended to a tablet. The discussion regarding inter-ocular distance, convergence, and connection to the internet are as with that provided for the laptop. 1105 depicts a smart phone. In this configuration, the stereoscopic cameras would be placed on both sided of the phone such the user could hold the phone at some distance (e.g., from the face) for interpersonal stereoscopic interchanges using the display side of the smart phone. Alternatively, using the back side of the smart phone, the stereoscopic cameras could be pointed to some object or the general scenery. The smart phones could be pre-manufactured with an inter-ocular distance. Convergence for the front and back stereoscopic cameras could be handled as with the laptop. The smart phone connection with the internet would typically be one-way with stereoscopic images being sent from the smart phone. If, however, the user of the smart phone were wearing an AR/MR/VR Headset 1102 or Smart Glasses 1103, then the arrow connecting the laptop to the internet could be a two-way arrow. 1102 depicts an AR/MR/VR Headset with two-way communication through the internet. The stereoscopic cameras could be embedded in the headset in proximity to the wearer's eyes. These stereoscopic cameras would collect stereoscopic imagery of the objects and scenery in front of the wearer and transmit stereoscopic imagery through the internet. Simultaneously, the wearer could be viewing stereoscopic imagery from another person equipped with stereoscopic cameras such as those shown in this figure. These stereoscopic cameras would nominally be pointed straight ahead but could be adjusted to provide convergence. A recording capability of stereoscopic imagery for the headset is described in later figures. 1103 depicts smart glasses. The stereoscopic cameras could be embedded in the smart glasses in proximity to the wearer's eyes. The smart glasses would have different modes of operation: collection and transmission of stereoscopic imagery while simultaneously providing a 'see through' capability; and a viewing of stereoscopic imagery while the see through capability is opaque. A recording capability of stereoscopic imagery for the smart glasses is described in later figures. A recording capability of stereoscopic imagery for the headset is described in later figures. 1106 depicts a typical desk top or desk side computer with a monitor 1107 for display. The stereoscopic cameras would be mounted on the monitor 1107 and inter-ocular distance, convergence, and communication with the internet would be similar to that of the laptop. However, the monitor 1107 would only have stereoscopic cameras mounted on the display side of the monitor. Other embodiments include hand-held stereoscopic cameras 1108. In some embodiments, the smart device can directly connect (e.g., Blue tooth) to the stereoscopic viewing device including the smart glasses 1103 and the AR/MR/VR headset 1102.

Figure 12A:
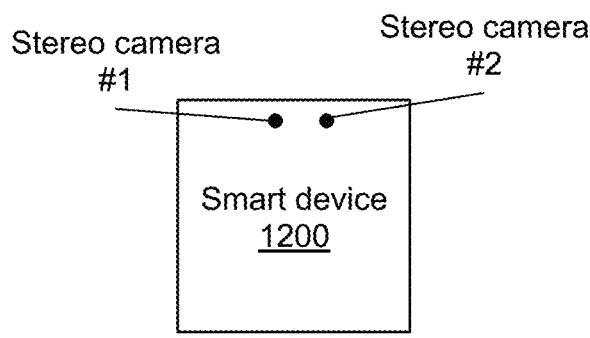
FIG. 12A illustrates an image of a smart device equipped with stereoscopic camera.

FIG. 12A illustrates an image of a smart device equipped with stereoscopic camera. In the preferred embodiment, the stereoscopic cameras are placed at a specified interocular distance on the smart device 1200. These cameras are placed such that there will be an overlapping region where stereoscopic imagery is produced.

Figure 12B:
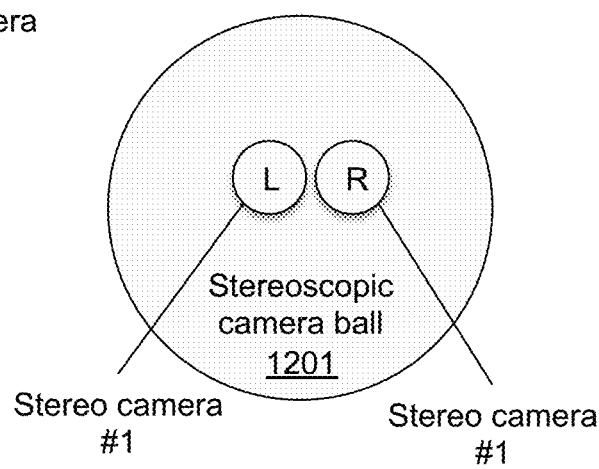
FIG. 12B illustrates a stereoscopic camera ball. In the preferred embodiment, the stereoscopic camera ball would move and focus to observe objects of interest.

FIG. 12B illustrates a stereoscopic camera ball. In the preferred embodiment, the stereoscopic camera ball would move and focus to observe objects of interest. The stereoscopic ball camera 1201 could be a sphere or other round or convex shape. The positions of the stereoscopic cameras would change over time in accordance with the desired viewing direction and stereo separation. The direction could be from a target tracking or from a user. Larger separations on the convex ball system could be used for stereoscopic viewing at longer ranges.

Figure 12C:
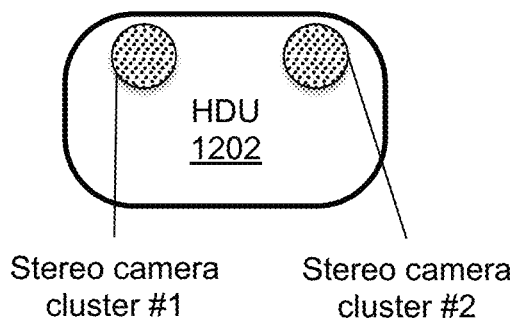
FIG. 12C illustrates a head display unit (HDU) with two stereoscopic camera clusters mounted in proximity to where the eyes of a wearer would be located on when wearing the HDU.

FIG. 12C illustrates a head display unit (HDU) with two stereoscopic camera clusters mounted in proximity to where the eyes of a wearer would be located on when wearing the HDU. The HDU 1202 equipped with the first stereoscopic camera cluster and the second stereoscopic camera cluster could be an augmented reality (AR), mixed reality (MR) or virtual reality (VR) unit.

Figure 12D:
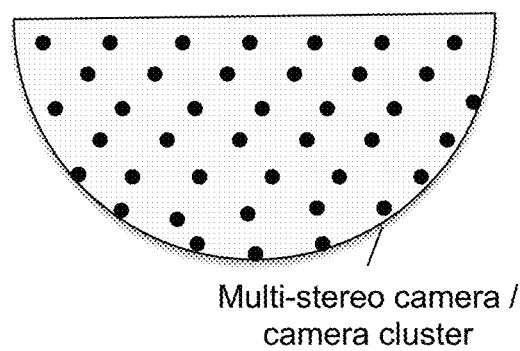
FIG. 12D illustrates the multi-stereo camera system/camera cluster.

FIG. 12D illustrates the multi-stereo camera system/camera cluster. Note that the cameras could be individual cameras or camera clusters. Note that based on where the action or objects of interest are a selection of cameras or camera clusters would be made in order to provide high resolution of the object of interest. Different users could select different areas of interest and be watching different portions of a particular event, such a football game.

Figure 13:
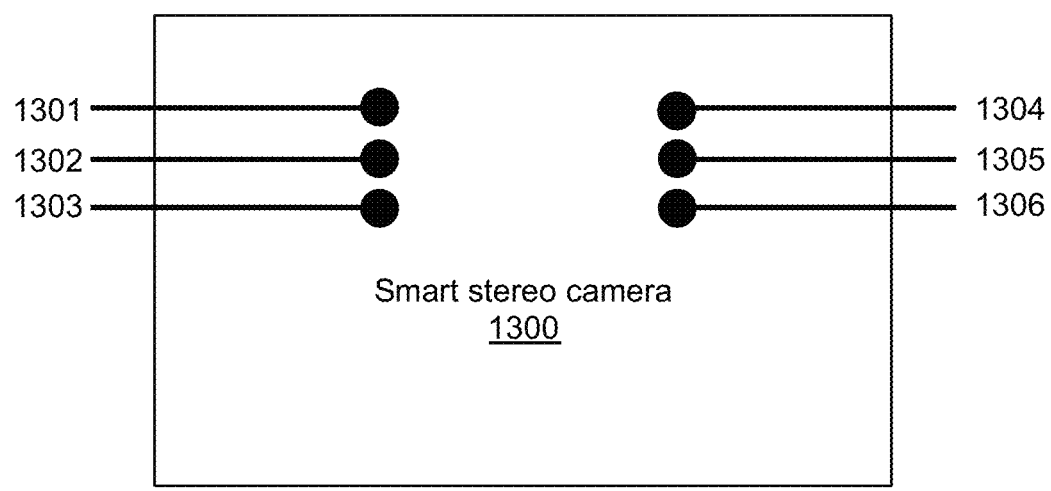
FIG. 13 illustrates an example stereoscopic camera configuration for a smart stereo camera.

FIG. 13 illustrates an example stereoscopic camera configuration for a smart stereo camera. 1301 illustrates a right view of a first stereoscopic camera pair, which is optimized for short ranges. 1302 illustrates a right view of a first stereoscopic camera pair, which is optimized for short ranges. 1303 illustrates a right view of a first stereoscopic camera pair, which is optimized for medium ranges. 1304 illustrates a right view of a first stereoscopic camera pair, which is optimized for medium ranges. 1305 illustrates a right view of a first stereoscopic camera pair, which is optimized for farther ranges. 1306 illustrates a right view of a first stereoscopic camera pair, which is optimized for farther ranges. Note different cant angles can be used for the different stereo camera pairs. Zoom lenses with variable focal length (e.g., 70-200 mm, 10-18 mm, etc.) or prime lenses (e.g. 17 mm and 85 mm) could be used. For example, the 70-200 zoom range would have approximately a 3:1 ratio so it is described as a 3× zoom. For example, with a zoom lens, an image can be performed with a zoomed out image (e.g., 10 mm), but as zooming in occurs (e.g., 18 mm), then angle of view is narrowed and the item within the image appears to come in closer. For example, with a prime lens of 85 mm, one would have to physically move the camera inward towards the image to change the angle of view and make the item appear closer. Note that the prime lens of 85 mm has a focal length of 85 mm. Generally, lenses with longer focal lengths will be longer and lenses with shorter focal lengths will be shorter. For a full frame camera (no crop factor), a 50 mm lens is approximately equal to the human eye. Cannon's full frame sensor measures 24×36 mm in size. If a zoom setting is less than 50 mm, such as 24 mm, then this will appear as a wide angle zoom. If, on the other hand, the lens setting is longer, such as 70 mm, then this will appear as a narrow angle telephoto sensor. For a lens with a crop factor of 1.6, a 32 mm lens would be equal to the human eye. A wide angle lens is great for filming (or taking photos of) landscapes, large groups of people or for creation of a strong perspective. Long angle telephoto settings are good for shooting wildlife. The aperture is the opening that lets light into the camera. For example, the f stop is the size of the opening with larger numbers corresponding to smaller openings. All lenses have a maximum f stop. How big the aperture is determines how much light gets through the lens. This affects the shutter speed and exposure. The f stop is a ratio of the opening to the focal length of the lens you are using. For example, assume the aperture is 1 in and the lens is a 50 mm lens (approximately 2 inches), then the F stop would be F/2. The F stop also determines the depth of field or range of things that are focus in the field of view. For example, the iPhone 12 has two cameras including an ultra wide and wide angle whereas the iPhone 12 Pro has an ultra wide, wide and telephoto lens.

Figure 14A:
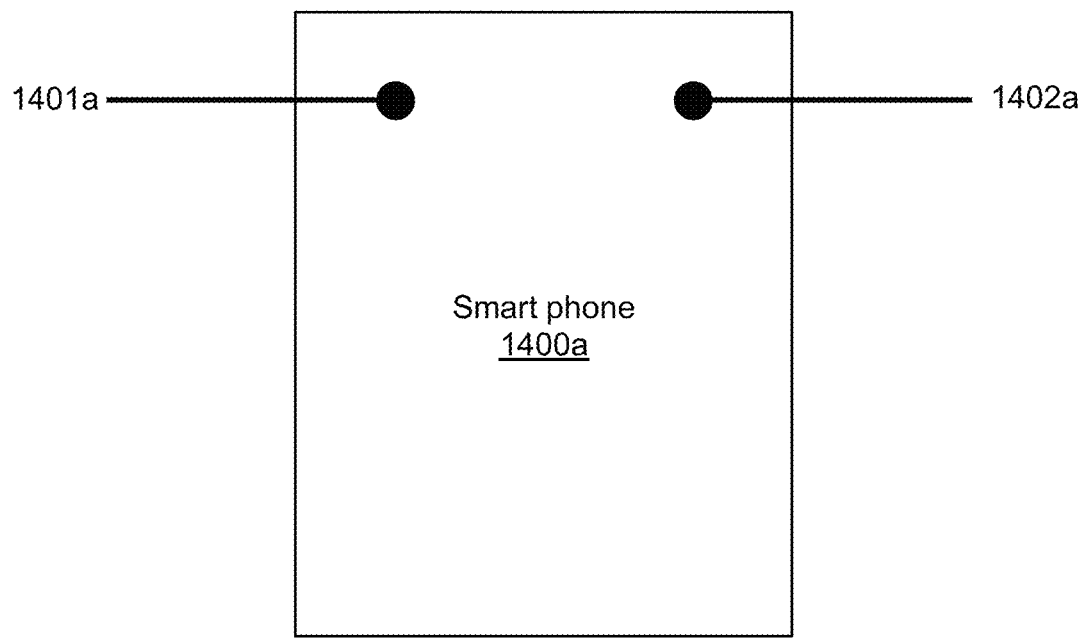
FIG. 14A illustrates example stereoscopic camera configuration for a smart phone at a first time point.

FIG. 14A illustrates example stereoscopic camera configuration for a smart phone at a first time point. 1400a illustrates the smart phone. 1401a illustrates the first position of the right-sided stereoscopic camera on the smart phone 1400a. 1402a illustrates the first position of the left-sided stereoscopic camera on the smart phone 1400a. Note that in some embodiments, the right-sided stereoscopic camera 1401a and the left-sided stereoscopic camera 1402a would have a first cant angle and first stereo separation.

Figure 14B:
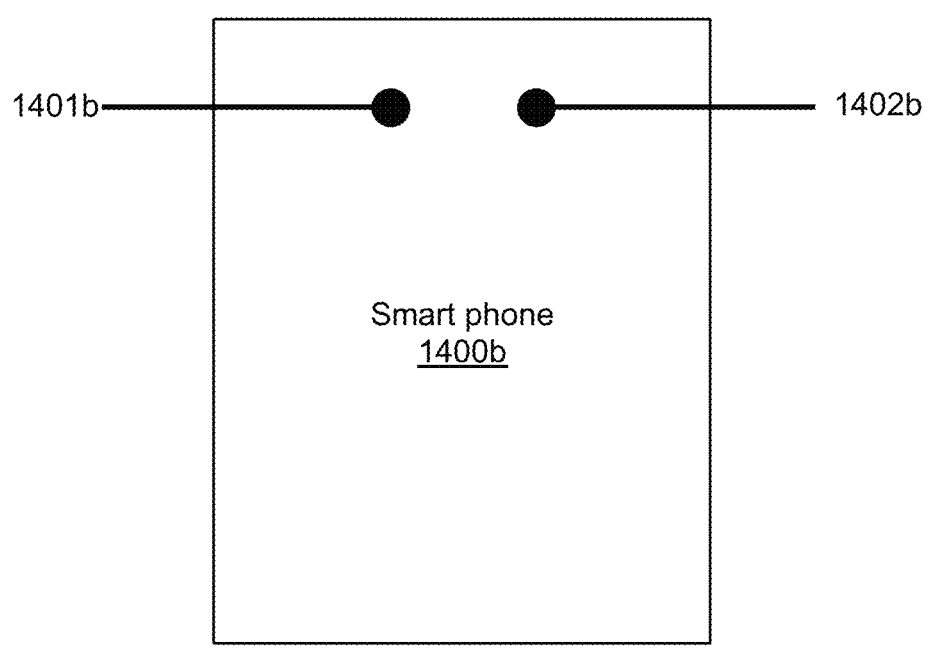
FIG. 14B illustrates example stereoscopic camera configuration for a smart phone at a second time point.

FIG. 14B illustrates example stereoscopic camera configuration for a smart phone at a first time point. 1400b illustrates the smart phone. 1401b illustrates the second position of the right-sided stereoscopic camera on the smart phone 1400b. 1402b illustrates the second position of the left-sided stereoscopic camera on the smart phone 1400. Note that in some embodiments, the right-sided stereoscopic camera 1401b and the left-sided stereoscopic camera 1402a would have a second cant angle and second stereo separation. The second cant angle would be different from the first cant angle. The second stereo separation would be different from the first stereo separation. A narrow stereo separation (less than 1 cm) with appropriate cant angle could be utilized to gain stereoscopic imagery of very small structures (e.g., an insect such as an ant). This could be viewed on a HDU.

FIG. 15A illustrates a top down view with the left camera and right camera both having a first cant angle for a first convergence point. 1500a illustrates a first convergence point. 1501a illustrates a left camera with a first cant angle, which is approximately α=0°. 1502a illustrates a right camera with a first cant angle, which is approximately α=0°.

FIG. 15B illustrates a top down view with the left camera and right camera both having a second cant angle for a second convergence point. 1500b illustrates a second convergence point, which is closer to the left camera 1501b and right camera 1502b as compared to the configuration in FIG. 15A. 1501b illustrates a left camera with a second cant angle, which is approximately α=+20°. 1502b illustrates a right camera with a second cant angle, which is approximately α=−20°. Note that the cant angle is steeper as compared to FIG. 15A. Note that the cant angle is steeper when the convergence point is closer (compare with FIG. 15A).

FIG. 16A illustrates a top down view with the left camera and right camera both having a first stereo separation for a first convergence point. 1600a illustrates a first convergence point. 1601a illustrates a left camera and 1602a illustrates a right camera. Note the first stereo separation 1603a.

FIG. 16B illustrates a top down view with the left camera and right camera both having a first stereo separation for a second convergence point. 1600b illustrates a second convergence point. 1601b illustrates a left camera and 1602b illustrates a right camera. Note the second stereo separation 1603b, which is more closely spaced as compared to FIG. 16A.

FIG. 17A illustrates a top down view with the left camera and right camera having a first stereo separation and first cant angle for a first convergence point. 1700a illustrates a first convergence point. 1701a illustrates a left camera with a first cant angle, which is approximately α=0°. 1702a illustrates a right camera with a first cant angle, which is approximately α=0°. 1703a illustrates a first stereo separation.

FIG. 17B illustrates a top down view with the left camera and right camera having a second stereo separation and second cant angle for a second convergence point. 1700b illustrates a second convergence point, which is closer to the left camera 1701b and right camera 1702b as compared to the configuration in FIG. 17A. 1701b illustrates a left camera with a second cant angle, which is approximately α=+20°. 1702b illustrates a right camera with a second cant angle, which is approximately α=−20°. Note that the cant angle is steeper as compared to FIG. 17A. Note that the cant angle is steeper when the convergence point is closer (compare with FIG. 15A). Also, note that the stereo separation 1703a is decreased as compared to FIG. 17A. This combination results in a physiologically accurate imagery.

Figure 18A:
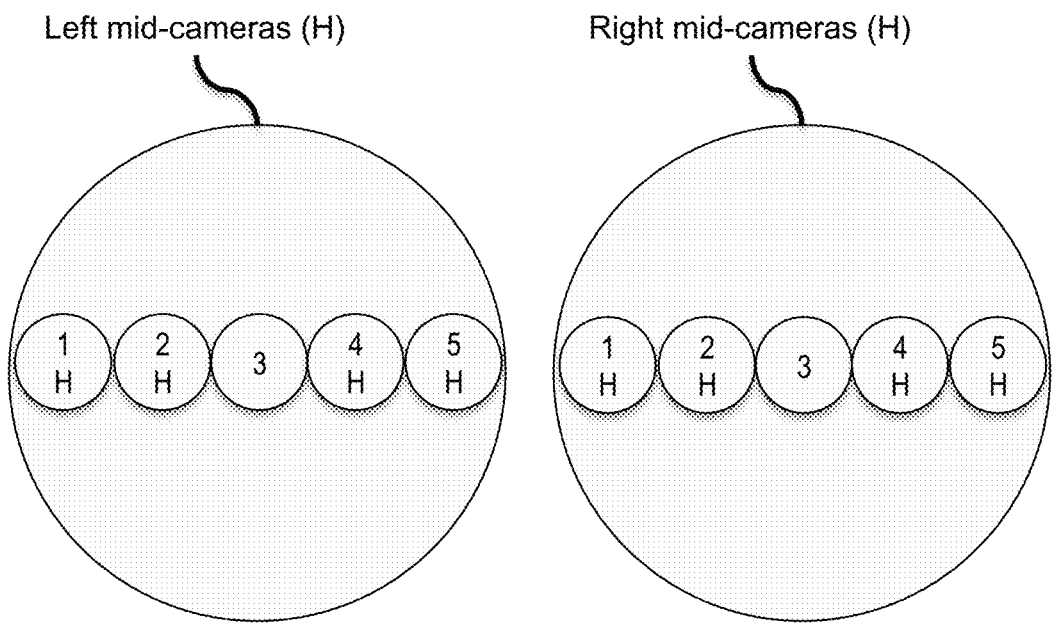
FIG. 18A illustrates an arrangement of some of the horizontal cameras in a set of two (left and right) stereoscopic camera cluster.

FIG. 18A illustrates an arrangement of some of the horizontal cameras in a set of two (left and right) stereoscopic camera cluster. The two camera cluster system (one for the left eye and one for the right eye) provides high resolution images of the surroundings with stereoscopic imagery near real time. For the left sided camera cluster, cameras are labeled (lateral to medial) "1H", "2H", "3", "4H" and "5H". For the right sided camera cluster, cameras are labeled (lateral to medial) "5H", "4H", "3", "2H", and "1H". For example, a user could perform close convergence to a close convergence point by selecting camera 5H from the left camera cluster and 1H from the right camera cluster. For example, a user could perform medium convergence to a medium distance convergence point by selecting camera 4H from the left camera cluster and 2H from the right camera cluster.

Include this table, which corresponds to FIG. 18A, "using a dual camera cluster when walking around". In the table below, "L" means left, "R" means right, "H" means horizontal", and the numerical number means the camera selected.

| Look angle | Left eye camera selection | Right eye camera selection |
|---|---|---|
| Straight ahead without convergence | L3 | R3 |
| Medium convergence | L4H | R2H |
| Close convergence | L5H | R1H |
| Look left without convergence | L2H | R2H |
| Looking far left without convergence | L1H | R1H |
| Looking right without convergence | L4H | R4H |
| Looking far right without convergence | L5H | R5H |

Figure 18B:
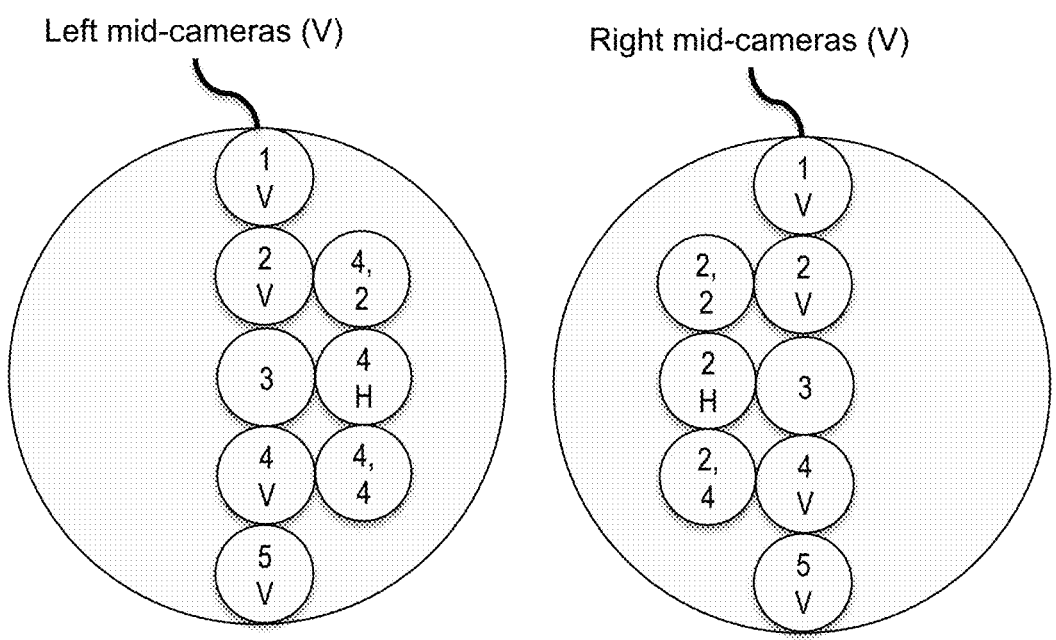
FIG. 18B illustrates an arrangement of some of the horizontal cameras in a set of two (left and right) stereoscopic camera cluster.

FIG. 18B illustrates an arrangement of some of the horizontal cameras in a set of two (left and right) stereoscopic camera cluster. The two camera cluster system (one for the left eye and one for the right eye) provides high resolution images of the surroundings with stereoscopic imagery near real time. For the left sided camera cluster, two vertical columns are illustrated. For the lateral column of the left sided camera cluster, cameras are labeled (from top to bottom) "1V", "2V", "3", "4V" and "5V". For the medial column of the left sided camera cluster, cameras are labeled (from top to bottom) "4,2", "4H", and "4,4". For the right-sided camera cluster, two vertical columns are illustrated. For the lateral column of the right sided camera cluster, cameras are labeled (from top to bottom) "1V", "2V", "3", "4V" and "5V". For the medial column of the right-sided camera cluster, cameras are labeled (from top to bottom) "2,2", "4H", and "4,4".

Include this table, which corresponds to FIG. 18B, "using a dual camera cluster when walking around". In the table below, "L" means left, "R" means right, "V" means vertical", and the numerical number means the camera selected.

| Look angle | Left eye camera selection | Right eye camera selection |
|---|---|---|
| Straight ahead without convergence | L3 | R3 |
| Looking up without convergence | L2V | R2V |
| Looking high up without convergence | L1V | R1V |
| Looking down without convergence | L4V | R4V |
| Looking steep down without convergence | L5V | R5V |
| Looking up with medium convergence | L4,2 | R2,2 |
| Looking down with medium convergence | L4,4 | R2,4 |

The cameras shown are meant to be illustrative and various other camera selections can add to a more complex camera cluster.

For example, assume that a son is traveling through the Sistine chapel. Assume that the son is wearing a HDU with 2 camera clusters (1 pair). Assume that the mother is not present, but wants to join in on this epic tour. The mother can control the pair of camera clusters and see what she wants to see. Assume that the pair of camera clusters is located at the front of the user's HDU. Assume that the mother sees a pretty painting off to the right side. She can look over to the right side using the above mentioned cameras within camera cluster and can see and appreciate the painting. As she looks at different spots (via saccades eye movements), her HDU will switch the field of view to new locations. In some embodiments as shown in FIG. 19, she would be able to switch to a different pair of camera clusters to better see the painting on the right side.

Figure 19A:
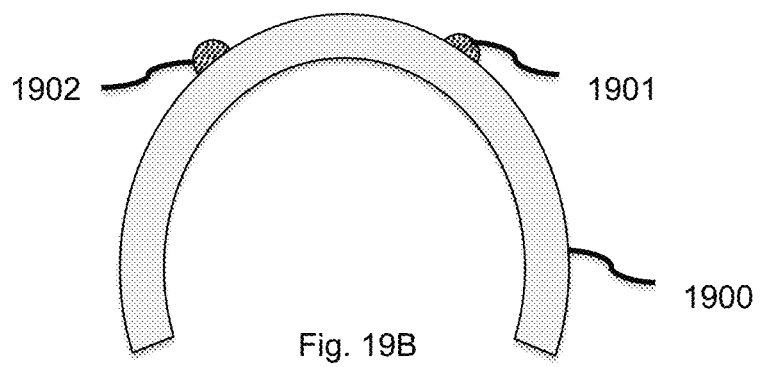
FIG. 19A illustrates a top down view of a first head display unit with two stereoscopic camera clusters providing stereoscopic viewing in the forward direction.

FIG. 19A illustrates a top down view of a first head display unit with two stereoscopic camera clusters providing stereoscopic viewing in the forward direction. 1900 illustrates the first head display unit. 1901 illustrates a first camera cluster, which would be for a user's left eye. 1902 illustrates a second camera cluster, which would be for a user's right eye. A user wearing a HDU could view the imagery from this pair of stereoscopic camera clusters and therefore view 3D imagery with depth perception.

Figure 19B:
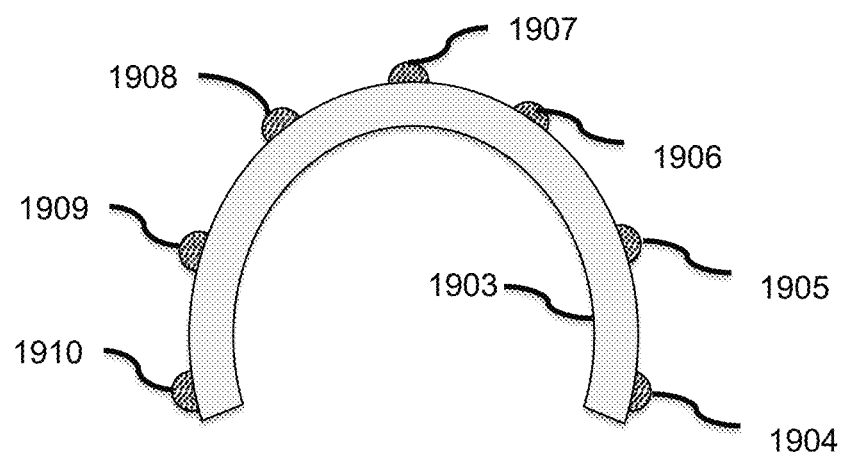
FIG. 19B illustrates a top down view of a second head display unit with seven camera clusters, which would provide stereoscopic viewing for nearly a 180° horizontal field of view.

FIG. 19B illustrates a top down view of a second head display unit with seven camera clusters, which would provide stereoscopic viewing for nearly a 180° horizontal field of view. 1903 illustrates the second head display unit. 1904 illustrates a first camera cluster. 1905 illustrates a second camera cluster. 1906 illustrates a third camera cluster. 1907 illustrates a fourth camera cluster. 1908 illustrates a fifth camera cluster. 1909 illustrates a sixth camera cluster. 1910 illustrates a seventh camera cluster. Different pairs of camera clusters could be utilized to provide stereoscopic imagery from different angles. For example, stereoscopic imagery could be performed on the right side of the HDU by selecting the first camera cluster 1904 and the second camera cluster 1905. In addition, such a configuration would be able to also provide stereoscopic imagery at longer ranges by larger stereo distances such as selecting the first camera cluster 1904 and the third camera cluster 1906. In addition, stereoscopic imagery could be performed at very long ranges if imagery were collected via two HDUs separated at distances apart from one another. Extensions (e.g., members extending from HDU) could also be used to increase stereo separation.

Figure 19C:
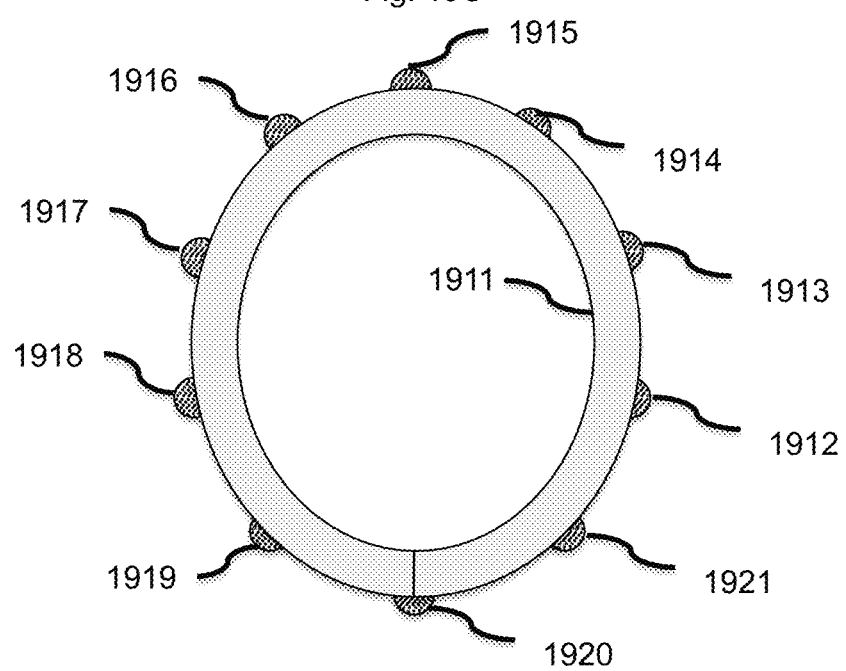
FIG. 19C illustrates a top down view of a head display unit with ten stereoscopic camera clusters spaced such that 360° stereoscopic viewing can be achieved.

FIG. 19C illustrates a top down view of a head display unit with ten stereoscopic camera clusters spaced such that 360° stereoscopic viewing can be achieved. 1911 illustrates the HDU. 1912 illustrates a first camera cluster. 1913 illustrates a second camera cluster. 1914 illustrates a third camera cluster. 1915 illustrates a fourth camera cluster. 1916 illustrates a fifth camera cluster. 1917 illustrates a sixth camera cluster. 1918 illustrates a seventh camera cluster. 1919 illustrates a eighth camera cluster. 1920 illustrates a ninth camera cluster. 1921 illustrates a tenth camera cluster. Tracking eye movement and head movement of a user who is geographically separated from a camera and wherein the camera is equipped with variable zoom capability. For example, assume that a son is standing in the center of an art gallery and the mother selected to view a statue behind the son at a far distance. She could select the eighth camera cluster 1919 and the tenth camera cluster 1921 and view the statue in 3D with depth perception on her HDU.

FIG. 20A illustrates a side view of a hemispherical high resolution camera cluster.

FIG. 20B illustrates a bottom view of a hemispherical high resolution camera cluster.

FIG. 20A illustrates a side view of a hemispherical high resolution camera cluster. As illustrated, multiple cameras (shown as the black circles) are positioned at various locations along the hemisphere (large gray circle). The cameras could be of the same or different camera properties (e.g., focal length, f stop, aperture, etc.). Any two cameras could be used for stereo pairs. Additionally, the selected stereo pairs could change over time. For example, the side of the hemisphere-shaped high resolution camera cluster could be engineered such that stereoscopic imagery could be obtained at 50 yards away. Given that a human's eyes are typically located at 2.5 inches away from one another and good stereoscopic imagery is obtained out to approximately 20 feet and stereoscopic imagery is desired at 50 yards, a separation distance of two cameras on the hemisphere-shaped high resolution camera cluster could be 18.75 inches apart. For example, in a first scenario, if a first football play was performed at the 10 yard line of the home team, then a stereo pair set pointed towards the 10 yard line of the home team could be used. Alternatively, if a second football play was performed at the 50 yard line, then a stereo pair set pointed towards the 50 yard line could be used. A second scenario has the quarterback at the 30 yard line throwing a pass to a receiver located in the end zone. A viewer could view images from a first set of cameras at a first time epoch to focus on the quarterback and then view images from a second set of cameras at a second time epoch to view the action in the end zone. The structure upon which the cameras are mounted could be of different sizes and shapes (i.e., various curved surfaces).

FIG. 20B illustrates a bottom view of a hemispherical high resolution camera cluster. As illustrated, multiple cameras (shown as the black circles) are positioned at various locations along the hemisphere (large gray circle).

FIG. 21A illustrates a bottom view of a convex surface containing two high resolution camera clusters at first positions. 2100a illustrates a convex surface. Note that the surface is the preferred embodiment; however, other methods include placing the cameras on robotic arms to achieve the desired stereo separation, desired positions and desired cant angles. 2101a illustrates a first camera (or first camera cluster) at a first position. 2102a illustrates a second camera (or second camera cluster) at a first position. Note this system could be on a movable object, which could include a device with wheels, a flying drone, a wire above a football field, or a head display unit.

FIG. 21B illustrates a bottom view of a convex surface containing two high resolution camera clusters at second positions. A key improvement of this invention is the ability to move in position to achieve a dynamic stereo separation, a dynamic cant angle, a dynamic position. These could be controlled automatically or by a user's input. 2100b illustrates a convex surface. Note that the surface is the preferred embodiment; however, other methods include placing the cameras on robotic arms to achieve the desired stereo separation, desired positions and desired cant angles. 2101b illustrates a first camera (or first camera cluster) at a second position. 2102b illustrates a second camera (or second camera cluster) at a second position.

FIG. 22A illustrates a top down view of a user's eyes, which shows that a user's eye are in a straight forward position. 2200a is the user's left eye, which is in a straight forward position. 2201b is the user's right eye, which is in a straight forward position.

FIG. 22B illustrates a top down view of two cameras on a convex surface, which shows that the cameras are in a straight forward position. 2202a illustrates the convex surface, which in this example is a sphere. 2203a is a camera that corresponds to the user's left eye, which is in a straight forward position. 2204a is a camera that corresponds to the user's right eye, which is in a straight forward position.

FIG. 22C illustrates a top down view of a user's eyes, which shows that a user's eye are in a looking right position. 2200b is the user's left eye, which is now in a looking right position. 2201b is the user's right eye, which is now in a looking right position.

FIG. 22D illustrates a top down view of two cameras on a convex surface, which shows that the cameras are in a straight forward position. 2202b illustrates the convex surface, which in this example is a sphere. 2203b is a camera that corresponds to the user's left eye, which is now in a looking right position. 2204b is a camera that corresponds to the user's right eye, which is now in a looking right position. Thus, in some embodiments, the cameras location is determined by a user's head position (which is determined a head tracking system, e.g., inertial measurement unit (IMU) on a HDU) and the cameras orientation is determined by a user's eye look angle (which is determined by an eye tracking system on a HDU).

Figure 23:
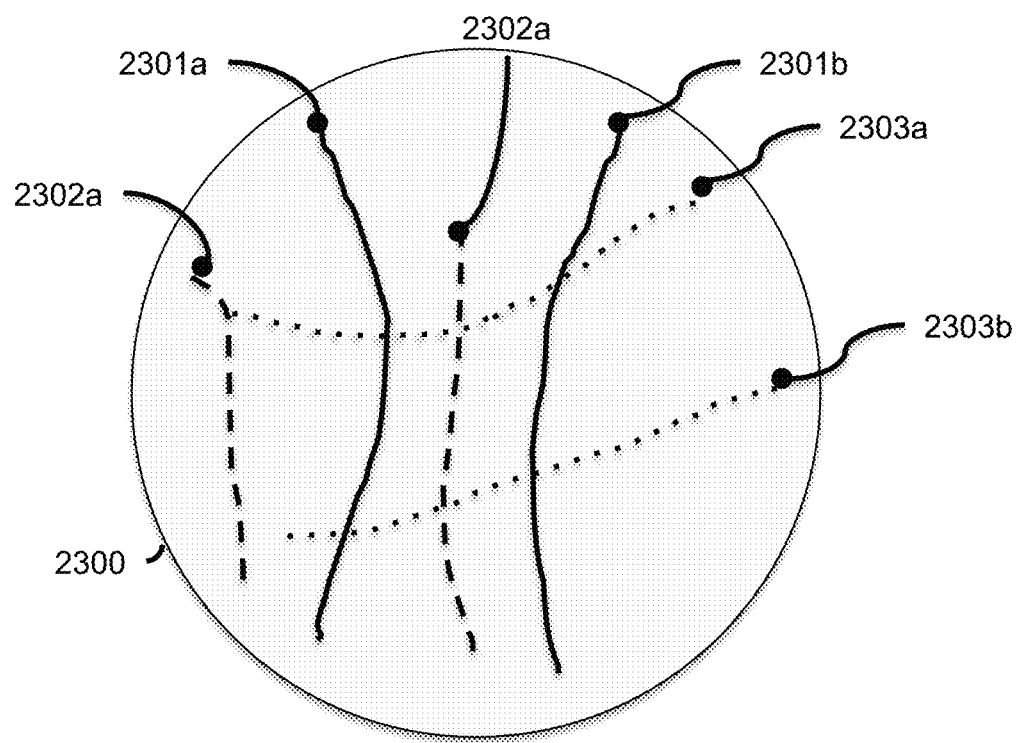
FIG. 23 illustrates a bottom view of a large convex surface containing three stereo camera pairs (or camera cluster pairs), which are shown to be moving over time.

FIG. 23 illustrates a bottom view of a large convex surface containing three stereo camera pairs (or camera cluster pairs), which are shown to be moving over time. 2300 illustrates a convex surface. In this embodiment, the convex surface is positioned over the 50 yard line of a football field. 2301a illustrates a camera (or camera cluster) for the first stereo pair, which moves along the dashed line over time. 2301b illustrates a camera (or camera cluster) for the first stereo pair, which moves along the dashed line over time. This first stereo pair could represent the camera positions for tracking a player running down the center of the field over time. 2302a illustrates a camera (or camera cluster) for the second stereo pair, which moves along the dotted line over time. 2302b illustrates a camera (or camera cluster) for the second stereo pair, which moves along the dotted line over time. This second stereo pair could represent the camera positions for tracking a player running down the side of the field over time. 2303a illustrates a camera (or camera cluster) for the third stereo pair, which moves along the solid line over time. 2303b illustrates a camera (or camera cluster) for the third stereo pair, which moves along the solid line over time. This third stereo pair could represent the camera positions for tracking a player across the center of the field over time. The lenses could be wide angle or telephoto, as desired. A telephoto lens has a narrow FOV and therefore would need to rotate its pointing direction to target. This could be used without requiring electronic zooming. A wide angle lens has a wide FOV and therefore would not need to rotate to target. This could be used in conjunction with electronic zooming.

Figure 24:
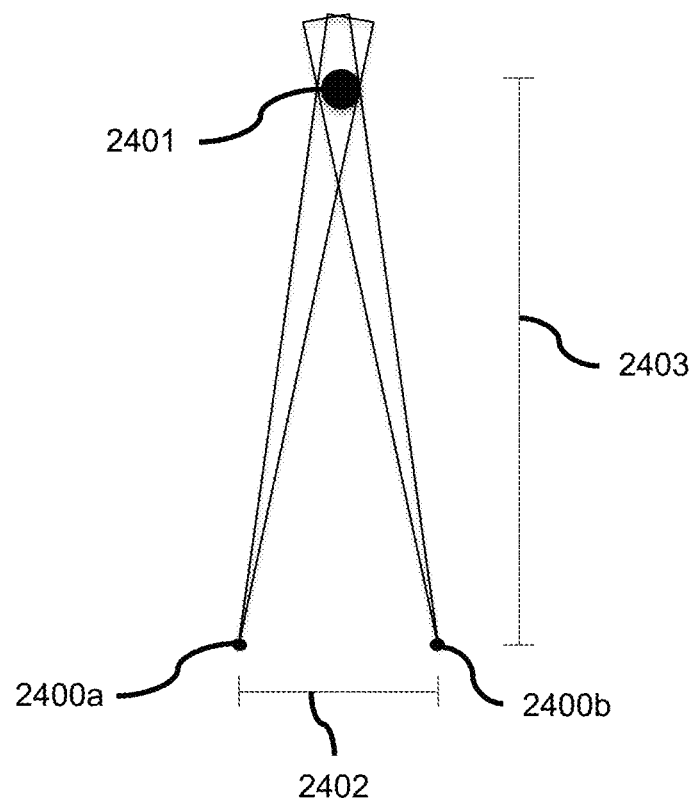
FIG. 24 illustrates a rotatable, stereoscopic telephoto lens system.

FIG. 24 illustrates a rotatable, stereoscopic telephoto lens system to achieve long range stereoscopic imagery. In some embodiments, stereoscopic imagery can be performed of an object 2401 at a range of approximately 2 miles when using two camera (or camera cluster) with telephoto capabilities separated by approximately 100 feet. Note that the cameras would be mounted on a rotatable device, such that the cameras can be pointed in a precise fashion to generate the appropriate stereoscopic overlap. Additionally, note that the cameras could be positioned on robotic arms to achieve the desired stereo effect for the range to the target. Note that this could be performed on the wings of an airplane for stereoscopic imagery of an object (e.g., damage assessment after a hurricane). This can also be used in conjunction with target tracking software to improve search and rescue operations (e.g., after a hurricane).

Figure 25:
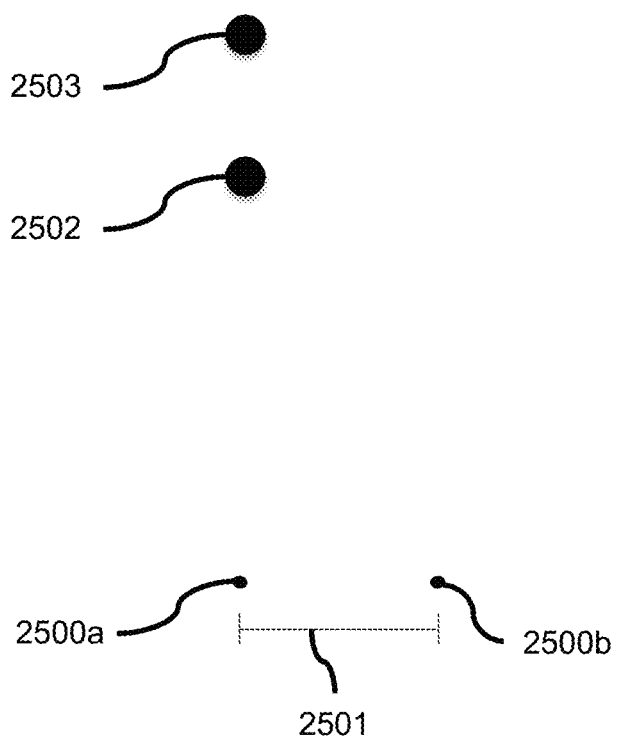
FIG. 25 illustrates a top down view of a stereoscopic LIDAR system.

FIG. 25 illustrates a top down view of a stereoscopic LIDAR system. 2500a illustrates a first LIDAR device. 2500b illustrates a second LIDAR device. Note that the first LIDAR device 2500a is separated from the second LIDAR device 2500b by a distance. 2502 illustrates a first object in an area. 2503 illustrates a second object in an area. Note that the second object 2503 would be hidden behind the first object 2502 from the perspective of the first lidar device 2500a.

Note that the second object 2503 would be seen from the perspective of the second lidar device 2500b. In some embodiments, the first LIDAR device 2500a and the second LIDAR device 2500b work together to generate a stereoscopic imagery for a user. Note that a first 3D volume could be generated by the first LIDAR device 2500a. Note that a second 3D volume could be generated by the second LIDAR device 2500b. Note that a HDU could display the first 3D volume generated by the first LIDAR device 2500a in the first eye display (left eye display). Note that a HDU could display the 3D volume generated by the second LIDAR device 2500b in the second eye display (right eye display). This would improve over the existing art because it would be able to show structures that are hidden from a first view point. Statistical analysis and artificial intelligence analysis can be performed using the stereoscopic LIDAR system. Additional features include: placement of the LIDAR systems on a rotatable platform; and, placement of the LIDAR systems on a device, which can adjust the stereo separation to enhance viewing. For example, short, medium or long range stereoscopic LIDAR can be performed, using principles taught elsewhere in this patent. In some embodiments, the first LIDAR device 2500a is different from the second LIDAR device 2500b; for example, they could have different frequency or different timing. In some embodiments, the lidar has a vertical scanning pattern and/or horizontal scanning pattern. In some embodiments, the stereoscopic LIDAR system is mounted on a head display unit. In some embodiments, a left-sided LIDAR system is mounted in proximity to the left eye of a user and the right-sided LIDAR system is mounted in proximity to the right eye of a user.

FIG. 26A illustrates a user viewing imagery collected by a camera in FIG. 26B.

FIG. 26B illustrates the position of two mobile cameras on a convex surface, which corresponds to the HDU orientation in FIG. 26A.

FIG. 26C illustrates a user viewing imagery collected by a camera in FIG. 26D.

FIG. 26D illustrates the position of two mobile cameras on a convex surface, which corresponds to the HDU orientation in FIG. 26C.

FIG. 26A illustrates a user viewing imagery collected by a camera in FIG. 26B. Note that the user's head is in a horizontal orientation.

FIG. 26B illustrates the position of two mobile cameras on a convex surface, which corresponds to the HDU orientation in FIG. 26A. 2600a illustrates the camera position that corresponds to the user's right eye. 2601a illustrates the camera position that corresponds to the user's left eye.

FIG. 26C illustrates a user viewing imagery collected by a camera in FIG. 26D. Note that the user's head is in a tilted orientation. Note that the tilted position of the user's head causes the camera system in FIG. 26D to move.

FIG. 26D illustrates the position of two mobile cameras on a convex surface, which corresponds to the HDU orientation in FIG. 26C. 2600b illustrates the camera position that corresponds to the user's right eye. 2601b illustrates the camera position that corresponds to the user's left eye. In this figure, the user is tilting his/her head. Note that the user could also turn his head to the left/right or rotate his head up/down as well and a corresponding set of processes would occur for the camera movements. In addition, the movement to a camera position could be based on a user's interocular distance or could be deliberately make wider for enhanced stereoscopic viewing at long ranges. In addition, the cameras could be more narrowly spaced and canted inward for stereoscopic viewing at close ranges.

FIG. 27A illustrates a user viewing imagery collected by a camera in FIG. 27B. Note that the user's head is in a horizontal orientation.

FIG. 27B illustrates two cameras on a convex surface which are selected corresponds to the HDU orientation in FIG. 27A. 2700*a* illustrates that the cameras selected corresponds to the user's right eye (see user's head position in FIG. 27A). 2701*a* illustrates that the cameras selected corresponds to the user's left eye (see user's head position in FIG. 27A).

FIG. 27C illustrates a user viewing imagery collected by a camera in FIG. 27D. Note that the user's head is in a tilted orientation. Note that the tilted position of the user's head causes a different selection of cameras from the camera system in FIG. 27D.

FIG. 27D illustrates the position cameras on a convex surface, which corresponds to the HDU orientation in FIG. 27C. 2700*b* illustrates that the cameras selected corresponds to the user's right eye (see user's head position is now tilted in FIG. 27C). 2701*b* illustrates that the cameras selected corresponds to the user's left eye (see user's head position is now tilted in FIG. 27B). In this figure, the user is tilting his/her head. Note that the user could also turn his head to the left/right or rotate his head up/down as well and a corresponding set of processes would occur for the camera system selection. In addition, the selection of cameras could be based on a user's interocular distance or could be deliberately make wider for enhanced stereoscopic viewing at long ranges. In addition, the cameras could be more narrowly spaced and canted inward (if so desired) for stereoscopic viewing at close ranges.

FIG. 28 illustrates a grid system used to generate the corresponding left eye view with the left eye camera and used to generate the right eye view with the right eye camera. At the initialization, the cameras are at the center point of the grid equip-spaced around the center point of the grid at t=0 when the system is initialized. The cameras would subsequently move in a corresponding fashion to the left eye grid and right eye grid. The left eye grid would locate For example, the user could look up to 10° and the cameras could move the an equip-spaced location around grid location (0,5); thus, the coordinate of the eye can be used to guide the location and pointing direction of the camera. In addition to look angle, eye tracking of a user could be performed to generate the corresponding convergence. This system could be, for example, placed on a chair instead of a person during a doctor's appointment via a virtual doctor scenario.

Figure 29A:
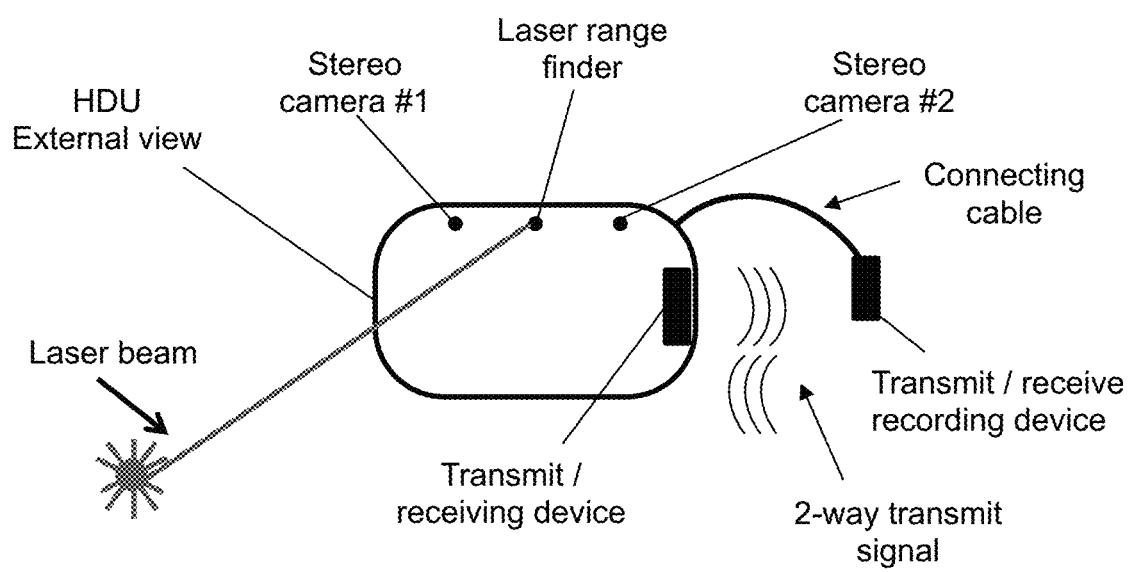
FIG. 29A illustrates an external view of a head display unit with stereoscopic cameras.

FIG. 29A illustrates an external view of a head display unit with stereoscopic cameras. In addition to stereoscopic cameras, this configuration also included an eye-safe laser range finder (LRF). The LRF could provide a single pulse, which would provide the range from the wearer of the HDU to a selected object or surface. Alternatively, the LRF could be a scanning laser. Stereo camera #1 and stereo camera #2 would be separated by a distance, preferably the average adult interocular distance. Some embodiments comprise a transmit/receive recording device, which may be connected to the HDU via a connecting cable. Alternatively, the HDU could house the transmit/receive recording device. A 2-way transmit signal as part of the HDU is also illustrated.

Figure 29B:
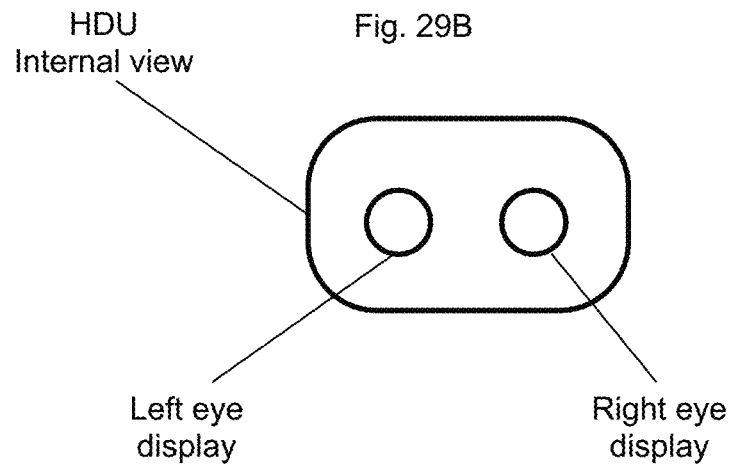
FIG. 29B illustrates an inside view (if looking into) a head display unit with stereoscopic cameras.

FIG. 29B illustrates an inside view (if looking into) a head display unit with stereoscopic cameras. The internal view with the left eye display and the right eye display are shown.

Figure 30A:
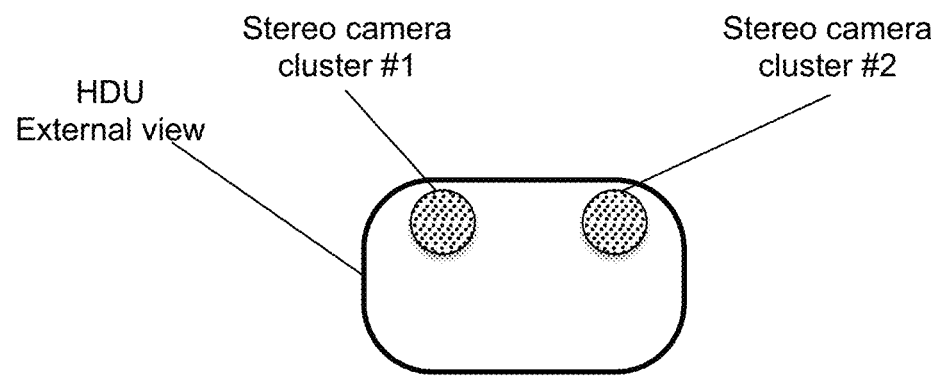
FIG. 30A illustrates a head display unit with two stereoscopic camera clusters.

FIG. 30A illustrates a head display unit with two stereoscopic camera clusters. This embodiment of the invention is to have a high-resolution camera cluster—one for each eye.

Figure 30B:
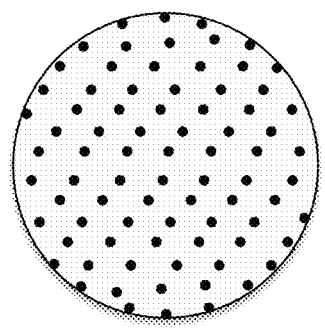
FIG. 30B illustrates a camera cluster.

FIG. 30B illustrates a camera cluster. The cluster could be of low density (e.g., 5 cameras horizontally each with a 42° instantaneous field of view), which could cover 210 degrees field of regard. Or, the cluster could be of higher density (e.g., 30 cameras horizontally each with a 7° instantaneous field of view), which could cover 210 degrees field of regard. A similar camera setup for vertical field of view would be included in the cluster. These clusters could operate in conjunction with the eye tracker such that wherever the eye would focus within the field of regard, there would be high or very high-resolution imagery available. Alternatively, all cameras could be on at all times collecting large amounts of data. This imagery could be recorded. At any future time the entire data set would be available for review.

Figure 31:
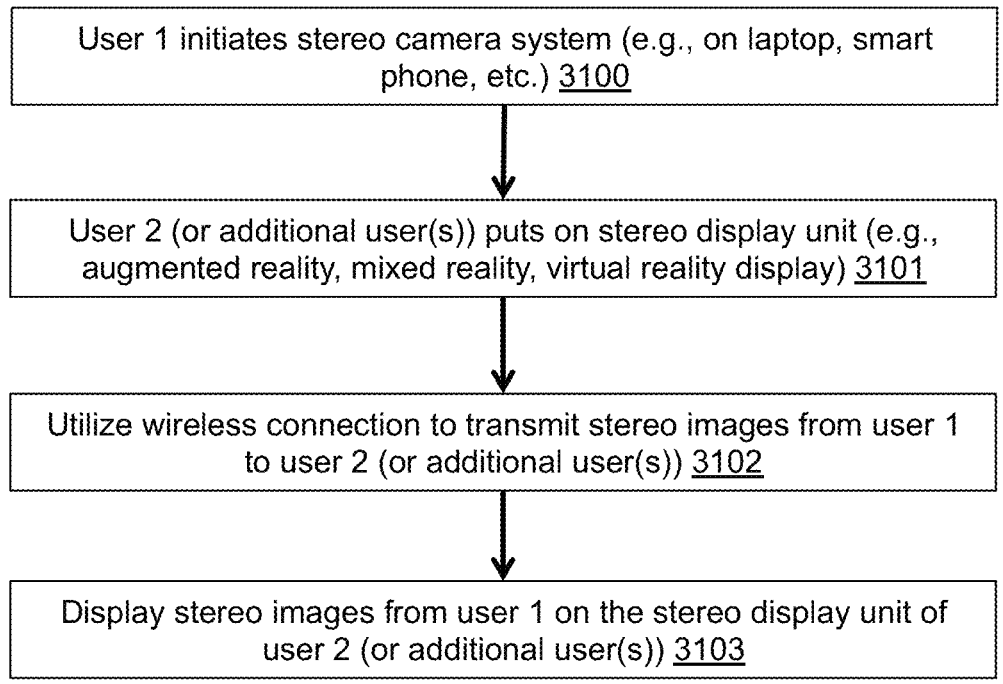
FIG. 31 illustrates an example 1-way stereoscopic interaction between two or more users.

FIG. 31 illustrates an example 1-way stereoscopic interaction between two or more users. 3100 illustrates a step where a user 1 initiates stereo camera system (e.g., on laptop, smart phone, etc.). 3101 illustrates wherein user 2 (or additional user(s)) puts on a stereo display unit (e.g., augmented reality, mixed reality, virtual reality display). 3102 illustrates utilizing a wireless connection to transmit stereo images from user 1 to user 2 (or additional user(s)). 3103 illustrates displaying stereo images from user 1 on the stereo display unit of user 2 (or additional user(s)). Note that the images could be enhanced (e.g., image stabilization and other features as discussed in this patent).

Figure 32:
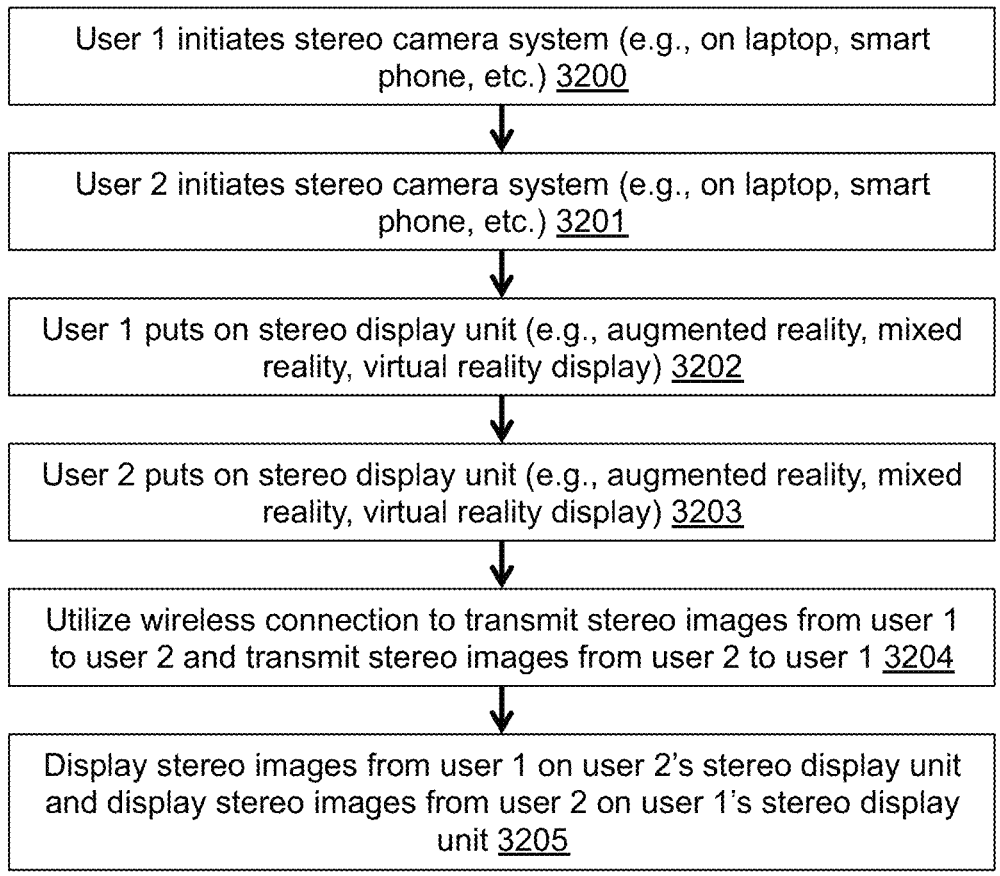
FIG. 32 illustrates an example 2-way stereoscopic interaction between 2 or more users.

FIG. 32 illustrates an example 2-way stereoscopic interaction between 2 or more users. 3200 illustrates wherein user 1 initiates stereo camera system (e.g., on laptop, smart phone, etc.). 3201 illustrates wherein user 2 initiates stereo camera system (e.g., on laptop, smart phone, etc.). 3202 illustrates wherein user 1 puts on stereo display unit (e.g., augmented reality, mixed reality, virtual reality display). 3203 illustrates wherein user 2 puts on stereo display unit (e.g., augmented reality, mixed reality, virtual reality display). 3204 illustrates wherein a wireless connection is utilized to transmit stereo images from user 1 to user 2 and transmit stereo images from user 2 to user 1. 3205 illustrates wherein stereo images from user 1 are displayed on user 2's stereo display unit and display stereo images from user 2 on user 1's stereo display unit.

FIG. 33A illustrates stereoscopic communications between a first user wearing a HDU with stereoscopic display working on a laptop with stereo cameras and a second user wearing a HDU with stereoscopic display and working on a laptop with stereo cameras. 3300*a* illustrates a wireless connection, which in this case is the internet. 3302*a* illustrates a first user who is wearing a HDU 3302*a* and is working on a laptop computer with stereoscopic camera system 3303*a*. 3304*a* illustrates a second user who is wearing a HDU 3305*a* and is working on a laptop computer with stereoscopic camera system 3306*a*. The first user 3301*a* wearing the stereoscopic HDU 3302*a* can see the second user 3304*a* via the imagery from the second user's stereoscopic camera on the laptop 3306*a*. The second user 3304*a* wearing the stereoscopic HDU 3305*a* can see the first user 3301*a* via the stereoscopic imagery from the first user's stereoscopic camera system on the laptop 3303*a*.

FIG. 33B illustrates stereoscopic communications between a first user with a laptop with stereo cameras and a second user wearing a HDU with stereoscopic display. 3300*b* illustrates a wireless connection, which in this case is the internet. 3302*b* illustrates a first user and is working on a laptop computer with stereoscopic camera system 3303*b*. 3304*a* illustrates a second user who is wearing a HDU 3305*a*. The first user 3301*b* wearing can not see the second user 3304*a*. However, if the second user's headset 3304*a* incorporates cameras (as taught in this patent), then the first user 3301a could see the imagery of the second user's 3304b surroundings. The second user 3304b wearing the stereoscopic HDU 3305b can see the first user 3302b via stereoscopic imagery from the first user's stereoscopic camera system on the laptop 3303b.

FIG. 33C illustrates stereoscopic communications between a first user with a laptop and a second user wearing a HDU and holding a phone with stereo cameras. 3300c illustrates a wireless connection, which in this case is the internet. 3302c illustrates a first user who is working on a laptop computer with stereoscopic camera system 3303c. 3304c illustrates a second user who is wearing a HDU 3305c and is holding a phone with stereoscopic camera system 3306a. The first user 3301a wearing the stereoscopic HDU 3302a can see the second user 3304a via the second user's stereoscopic camera system on the laptop 3306c. The second user 3304c wearing the stereoscopic HDU 3305c can see the first user 3302c via the imagery from the first user's stereoscopic camera system on the laptop 3303c. The first user 3302c cannot see the second user 3304c in stereoscopic imagery.

FIG. 33D illustrates stereoscopic communications between a first user wearing a HDU with stereoscopic display working on a laptop with stereo cameras and a second user wearing a HDU with stereoscopic display working on a phone with stereo cameras. 3300d illustrates a wireless connection, which in this case is the internet. 3302d illustrates a first user who is wearing a HDU 3304d working on a laptop computer with stereoscopic camera system 3303d. 3304d illustrates a second user who is wearing a HDU 3305d and is holding a phone with stereoscopic camera system 3306d. The first user 3302d wearing the stereoscopic HDU 3304d can see the second user 3304a via the imagery from the second user's stereoscopic camera system on the phone 3306d. The second user 3304d wearing the stereoscopic HDU 3305d can see the first user 3302d via the imagery from the first user's stereoscopic camera system on the laptop 3303d.

Figure 34A:
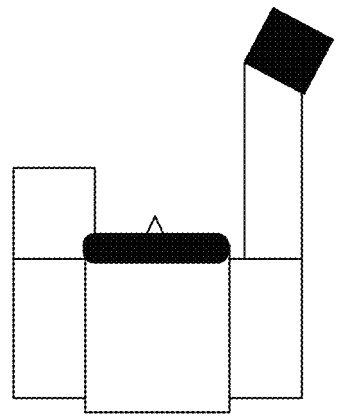
FIG. 34A illustrates a user wearing a HDU holding a smart phone with stereoscopic cameras in a first position.

FIG. 34A illustrates a user wearing a HDU holding a smart phone with stereoscopic cameras in a first position. The user is holding the smart phone in his right hand and point it at his face. The user's head display unit displays stereoscopic imagery from the user's face in near real time. For example, the left camera acquires left viewing perspective imagery of the face at a first time point and the right camera also acquires right viewing perspective imagery of the face at the first time point. The left viewing perspective imagery and the right viewing perspective imagery comprise stereoscopic imagery. The smart phone is configured to send said stereoscopic imagery from said smart phone via a wireless connection to a head display unit (HDU). The HDU is configured to display said stereoscopic imagery from said smart device. The HDU may be a virtual reality display, an augmented reality display or a mixed reality display. The HDU comprises a left eye display and a right eye display and displays said stereoscopic imagery to said user at a second time point. The second time point is within five seconds of said first time point. So, this occurs in near-real time. The left viewing perspective imagery is displayed on the left eye display, and the right eye viewing perspective is displayed on said right eye display.

Figure 34B:
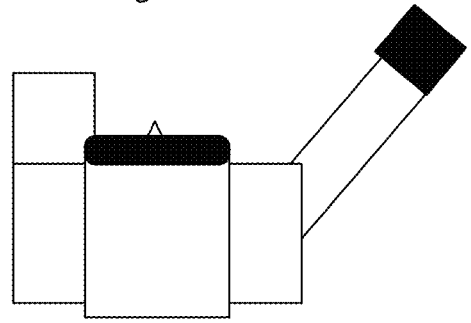
FIG. 34B illustrates a user wearing a HDU holding a smart phone with stereoscopic cameras in a second position.

FIG. 34B illustrates a user wearing a HDU holding a smart phone with stereoscopic cameras in a second position, which is oblique. This would allow the user to seen his face from an oblique angle.

Figure 34C:
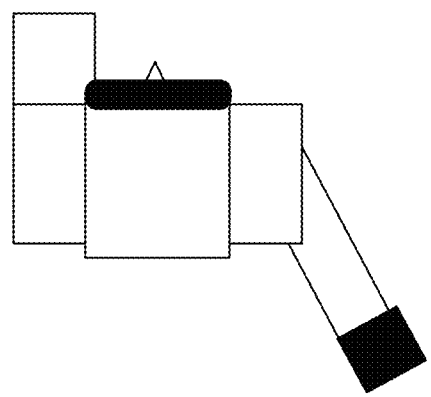
FIG. 34C illustrates a user wearing a HDU holding a smart phone with stereoscopic cameras in a third position.

FIG. 34C illustrates a user wearing a HDU holding a smart phone with stereoscopic cameras in a third position, which is at the back of the user's head. This would allow the user to see the back of his head. Note that various zoomed in positions could be performed by moving the phone closer to or farther away from one's face. Also, the user could be able to converge or change look angles via eye movements.

Figure 35A:
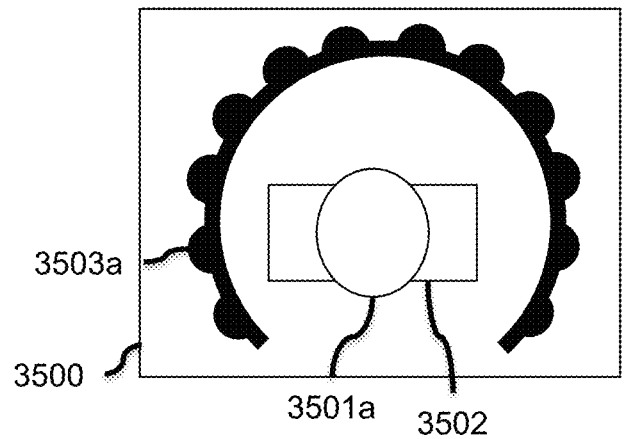
FIG. 35A illustrates a top down view looking at a camera man with a camera cluster on wheels.

FIG. 35A illustrates a top down view looking at a camera man with a camera cluster on wheels.

3500 illustrates a platform for a videographer. The videographer's head 3501a and shoulder 3502 are shown. The videographer is on a platform containing a large camera cluster, which provides nearly 270° horizontal field of view. A camera 3503a is illustrated.

Figure 35B:
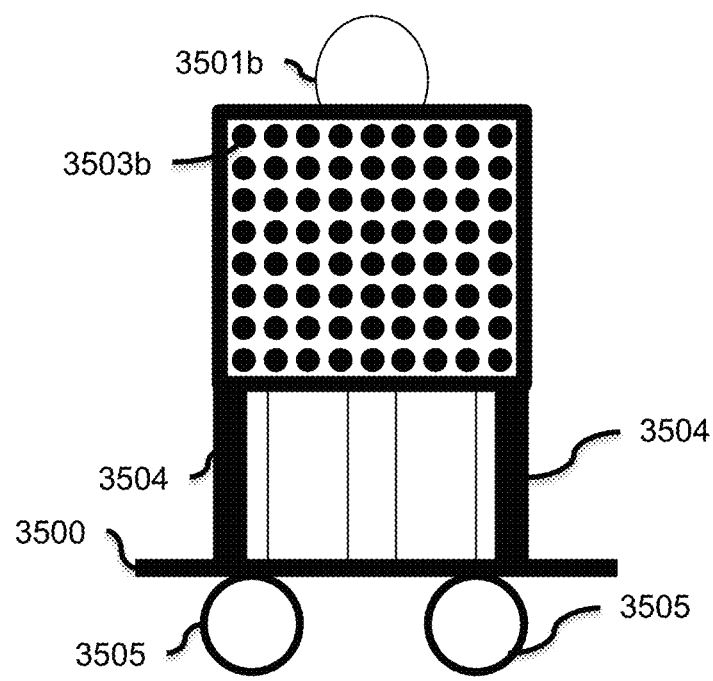
FIG. 35B illustrates a front view looking at a camera man on the camera cluster on wheels.

FIG. 35B illustrates a front view looking at a camera man on the camera cluster on wheels. The videographer's head 3501b is shown above the camera cluster. A camera 3503b is shown. The platform 3500 is shown with legs 3504 connecting the platform 3500 to the camera cluster framing. In some embodiments, some of the cameras have automatic target tracking (e.g., of a football player). In some embodiments, the videographer controls a subset of the cameras and the remaining cameras are controlled automatically. In some embodiments, some of the cameras are fixed (e.g., prime lenses) to capture the rest of the data.

FIG. 36A illustrates a top down view of a football field showing placement of multiple camera clusters. 3601 illustrates the football field. Camera clusters 3600a and 3600b are located at the 50 yard line and 25 yard line, respectively. Camera clusters 3600c and 3600d are located just past the end zones. Camera cluster 3600e is located above the field on a wire, which can travel along the field to acquire the best possible imagery of the game. For more detail on an example set of camera clusters, see U.S. Pat. No. 10,317,218.

FIG. 36B illustrates a side view of a football field showing placement of multiple camera clusters. 3601 illustrates the football field. Camera clusters 3600a and 3600b are located at the 50 yard line and 25 yard line, respectively. Camera clusters 3600c and 3600d are located just past the end zones. Camera cluster 3600e is located above the field on a wire, which can travel along the field to acquire the best possible imagery of the game. The fields of view of the camera clusters could be pre-determined. For example, the sideline cameras 3600a and 3600b could have a field of view of at least 270° horizontal and 90° degrees vertical.

FIG. 37A illustrates a stereoscopic camera cluster with different sets of lenses. 3700 illustrates the housing for the camera cluster. 3701 illustrates a first camera in the camera cluster for a right eye, which is optimized for long range viewing. In this example, long range includes distances of more than 20 feet.

3702 illustrates a second camera in the camera cluster for a right eye, which is optimized for medium range viewing. In this example, medium range includes distances of 10-20 feet. 3703 illustrates a third camera in the camera cluster for a right eye, which is optimized for close range viewing. In this example, close range includes distances of less than 10 feet. Note that the stereo distance from a first camera pair could differ from the stereo distance from a second camera pair. 3704 illustrates a first camera in the camera cluster for a left eye, which is optimized for long range viewing. 3705 illustrates a second camera in the camera cluster for a left eye, which is optimized for medium range viewing. 3706 illustrates a third camera in the camera cluster for a left eye, which is optimized for close range viewing. Cross section A is shown cutting through the first camera in the camera cluster for a right eye 3701 and the first camera in the camera cluster for a left eye 3704. Cross section B is shown cutting through the second camera in the camera cluster for a right eye 3702 and the second camera in the camera cluster for a left eye 3705. Cross section C is shown cutting through the third camera in the camera cluster for a right eye 3703 and the third camera in the camera cluster for a left eye 3706. It should be noted that the camera clusters can have various specifications (e.g., zoom lens, prime lens). A zoom lenses with variable focal length (e.g., 70-200 mm, 10-18 mm, etc.) could be used. For example, the 70-200 zoom range would have approximately a 3:1 ratio so it is described as a 3× zoom. For example, with a zoom lens, an image can be performed with a zoomed out image (e.g., 10 mm), but as zooming in occurs (e.g., 18 mm), then angle of view is narrowed and the item within the image appears to come in closer. A prime lens (e.g. 17 mm and 85 mm) could also be used. For example, with a prime lens of 85 mm (focal length of 85 mm), one would have to physically move the camera closer towards an object to change the angle of view and make the item appear closer. Generally, lenses with longer focal lengths will be longer and lenses with shorter focal lengths will be shorter. For a full frame camera (no crop factor), a 50 mm lens is approximately equal to the human eye. Cannon's full frame sensor measures 24×36 mm in size. If a zoom setting is less than 50 mm, such as 24 mm, then this will appear as a wide angle zoom. If, on the other hand, the lens setting is longer, such as 70 mm, then this will appear as a narrow angle telephoto sensor. For a lens with a crop factor of 1.6, a 32 mm lens would be equal to the human eye. A wide angle lens is great for filming (or taking photos of) landscapes, large groups of people or for creation of a strong perspective. Long angle telephoto settings are good for shooting wildlife. The aperture is the opening that lets light into the camera. For example, the f stop is the size of the opening with larger numbers corresponding to smaller openings. All lenses have a maximum f stop. The size of the aperture is determines how much light gets through the lens. This affects the shutter speed and exposure. The f stop is a ratio of the opening to the focal length of the lens you are using. For example, assume the aperture is 1 in and the lens is a 50 mm lens (approximately 2 inches), then the F stop would be F/2. The F stop also determines the depth of field or range of things that are focus in the field of view. For example, the iPhone 12 has two cameras including an ultra wide and wide angle whereas the iPhone 12 Pro has an ultra wide, wide and telephoto lens. In this patent, a stereoscopic camera cluster is introduced. Another novel feature is the inward canting of a stereoscopic camera pair within the camera cluster. Three pairs are illustrated in FIG. 37A. As shown in FIGS. 37B-37D, these will be variably canted.

FIG. 37B illustrates a top down view of cross section A from FIG. 37A. 3707 illustrates a dashed line coming from camera 3704 (the first camera in the camera cluster for a left eye, which is optimized for long range viewing). Note that 3707 illustrates the pointing direction of camera 3704. 3708 illustrates a dashed lined coming from camera 3701 (the first camera in the camera cluster for the right eye, which is optimized for long range viewing). Note that 3708 illustrates the pointing direction of camera 3701. Note that pointing direction 3707 of camera 3704 and pointing direction 3708 of camera 3701 are parallel.

FIG. 37C illustrates a top down view of cross section B from FIG. 37A. 3709 illustrates a dashed line coming from camera 3705 (the second camera in the camera cluster for the left eye, which is optimized for medium range viewing). Note that 3709 illustrates the pointing direction of camera 3705. 3710 illustrates a dashed line coming from camera 3702 (second camera in the camera cluster for the right eye, which is optimized for medium range viewing). Note that 3710 illustrates the pointing direction of camera 3702. Note that pointing direction 3709 of camera 3705 and pointing direction 3710 of camera 3702 are slightly converging.

FIG. 37D illustrates a top down view of cross section C from FIG. 37A. 3711 illustrates a dashed line coming from camera 3706 (the third camera in the camera cluster for the left eye, which is optimized for close range viewing). Note that 3711 illustrates the pointing direction of camera 3706. 3712 illustrates a dashed line coming from camera 3703 (third camera in the camera cluster for a right eye, which is optimized for close range viewing). Note that 3712 illustrates the pointing direction of camera 3703. Note that pointing direction 3711 of camera 3706 and pointing direction 3703 of camera 3712 are converging more than pointing direction 3709 of camera 3705 and pointing direction 3710 of camera 3702 for the medium range. In other words, the cameras are canted inwards the most.

Figure 38:
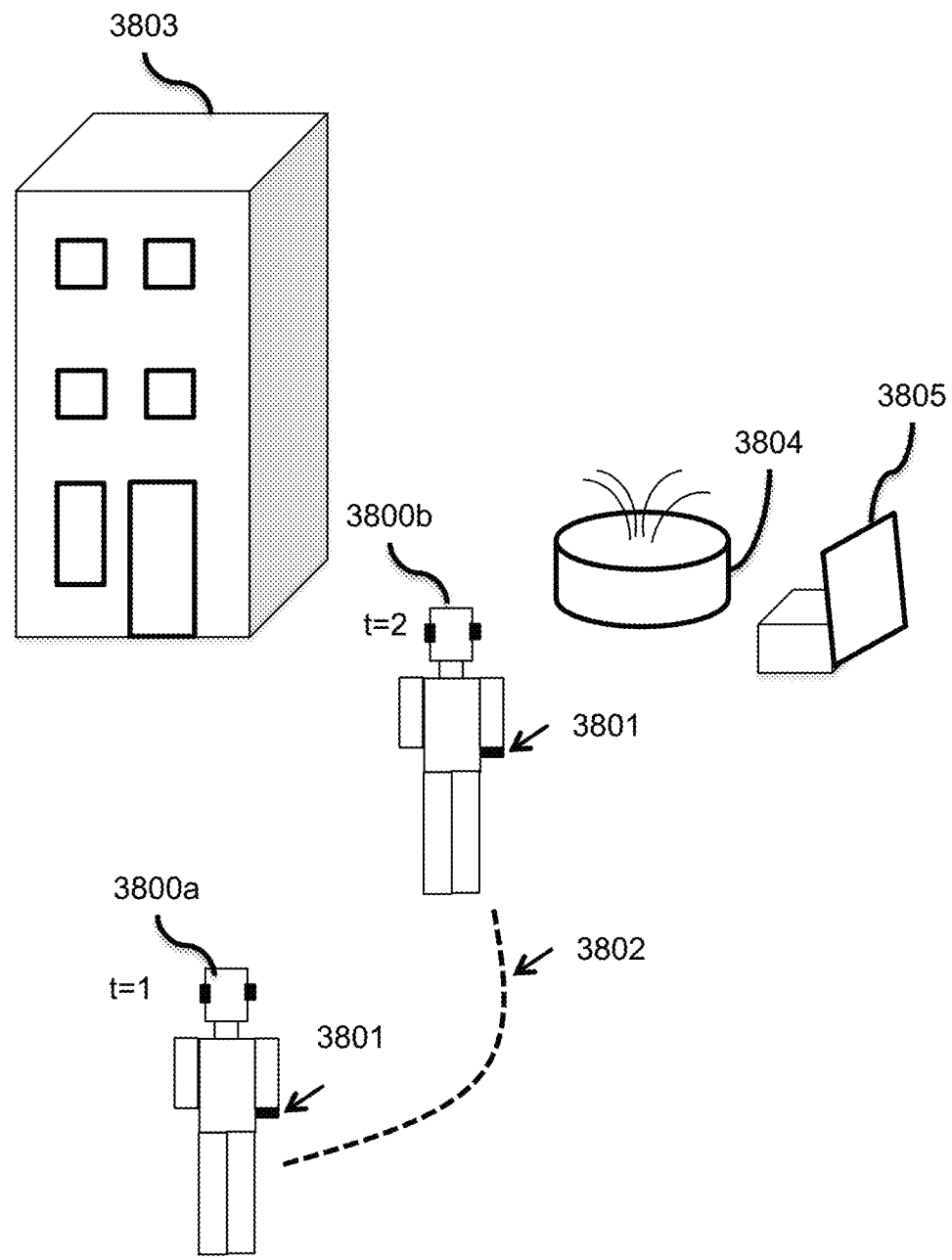
FIG. 38 illustrates a user walking through town and recording stereoscopic imagery.

FIG. 38 illustrates a user walking through town and recording stereoscopic imagery. Note that it is the intent of this patent to integrate GPS into the acquisition of imagery. This would enable spatially accurate stereoscopic recording of a scene. The user at different time intervals walking through a city (or scenic area) observing the area wearing the HDU and recording stereoscopic imagery of the scenery and items of interest. The person 3800a is walking through scenic area at time point one (t=1). He/she proceeds along a path depicted by the dashed line 3802 in the scenic area and the person 3800b is again shown at time point two (t=2) he/she is at the upper location in the figure. The person is equipped with a recording device 380. Shown in this figure are limited examples of what might be observed during the walk through the scenic area: building(s) of architectural interest 3803; fountains 3804; and park benches 3805 where interesting people might be seated. An audio capability could be added to the recording device for commentary along the path. This walk could be done during day or at night with only minimal lighting. Tourists would be able to have a 3D recording of where they went and what they saw. Travel agents could provide a preview of different locations to excite potential travelers.

FIG. 39A illustrates a top down view of a stereoscopic camera cluster on a head display unit. 3900 illustrates the head display unit. 3901 illustrates the right-sided camera cluster. 3902 illustrates the left-sided camera cluster. 3903 illustrates the field of view from which stereoscopic imagery is available. Note that the total field of view would also contain some areas where stereoscopic viewing was not available. As show, the horizontal field of view with stereoscopic imagery is approximately 120°. Note that this region would acquire high resolution imagery in stereoscopic fashion in an area much larger than a human can appreciate. Note previous discussion. Therefore, retrospective viewing of select regions using a stereoscopic display could be performed. The user of camera clusters spaced with stereo distances improves over the prior art because other large FOV devices (FOV) would cause fish eye artifact. Camera clusters used in stereoscopic fashion, as taught in this patent, improves over the prior art because it provides wide field of view without artifact.

FIG. 39B illustrates a side view of a stereoscopic camera cluster on a head display unit. 3900 illustrates the HDU. 3904 illustrates the vertical field of view, which is also approximately 120°.

FIG. 40A illustrates a top down view of the instantaneous field of view (FOV) of the stereoscopic camera system. As previously discussed, the y-axis is defined as the direction where the video camera is facing, which in this figure is shown with an arrow and has an α=0°. The film crew stands behind the camera, in between the α=−135° and α=+135°. 4000a illustrates the horizontal field of view.

FIG. 40B illustrates a top down view of the instantaneous field of view (FOV) of the stereoscopic camera system. The film crew stands behind the camera, in between the β=−90° and β=+45°. Note that with this β coverage, any air activity could be simultaneously filmed in conjunction with what is going on with the ground activity. A number of cameras, such as, but not limited to 30 cameras, could be mounted on a convex surface that can be controlled by the film crew. 4000b illustrates the vertical field of view.

FIG. 41A illustrates a left view of an image of a user and the user's natural background scene. A first user 4101a is shown. The background scene includes a wall with a diploma 4100 displayed on the wall. Note that this scene including both the user and the background would be acquired using the stereoscopic cameras taught in this patent and viewed using the stereoscopic HDU taught in this patent, which would be worn by a second user.

FIG. 41B illustrates a left view of an image of a user and implementation of a simulated, stereoscopic background scene of a user. A first user 4101b is shown. The background scene now includes a mountain 4102 and a cloud 4103. Note that the imagery of the user would be acquired using the stereoscopic cameras taught in this patent. Note that the stereoscopic background scene could be display of imagery of real world scene (e.g., stereoscopic imagery of Mount Everest acquired using long range stereoscopic telephoto lenses). In this example, the first user 4101b would be in displayed in near real time to the second user wearing the head display unit. The stereoscopic background scene would also be displayed to the second user wearing the head display unit. The nearby objects (e.g., user 4101b) would be superimposed on top of the more distant objects. In other words, a composite stereoscopic image is generated with some portions of the composite stereoscopic image being from the near-real time video of the first user and other portions of the composite stereoscopic image being from a fixed stereoscopic image. Note that in this embodiment, the stereoscopic background scene could be fixed. A dataset of simulated stereoscopic background scenes could be established, which include, but are not limited to the following: office; library; mountain scene; garage; gym; living room; and oval office.

FIG. 42A illustrates a left view of an image of a user and implementation of a dynamic simulated, stereoscopic background scene of a user. A first user 4200a is shown. The background scene now includes a mountain 4201 and a cloud 4202a. Note that the cloud 4202a is light gray. Note that two birds 4203a are flying and are shown at the right side of the first user 4200a. Note that the imagery of the user would be acquired using the stereoscopic cameras taught in this patent. In some embodiments, the stereoscopic video imagery could be from live stereoscopic cameras. In other embodiments, the stereoscopic video imagery could be from recorded and replayed stereoscopic imagery (e.g., recorded one month prior to being displayed). Note that the stereoscopic background scene could be a display of imagery of real world scene (e.g., stereoscopic imagery of Mount Everest acquired using long range stereoscopic telephoto lenses). In this example, the first user 4200a would be in displayed in near real time to the second user wearing the head display unit. The dynamic, stereoscopic background scene would also be displayed to the second user wearing the head display unit. The nearby objects (e.g., user 4200a) would be superimposed on top of the more distant objects. In other words, a composite stereoscopic image is generated with some portions of the composite stereoscopic image being from the near-real time video of the first user and other portions of the composite stereoscopic image being from a dynamic stereoscopic image. Note that the image in FIG. 42A is at time point 1. Note that in this embodiment, the stereoscopic background scene could be dynamic.

FIG. 42B illustrates a left view of an image of a user and implementation of a dynamic simulated, stereoscopic background scene of a user. Note that the image in FIG. 42B is at time point 2. A first user 4200b is shown. The background scene now includes the mountain 4201 and a cloud 4202b. Note that the cloud 4202b is now dark and has rain coming from it. Note that the first user 4200b's facial expression has changed. Note that three birds 4203b are now shown at the left side of the first user 4200b. Note that in this embodiment, the stereoscopic background scene could is dynamic. A dataset of dynamic, simulated stereoscopic background scenes could be established, which include, but are not limited to the following: mountain scene; beach scene; basketball game; waterfall; shopping mall; etc. Additionally, a set of cameras positioned throughout the world (or even Mars) could be placed and viewed in near-real time as dynamic, simulated background scenes for the second user. Note that in some embodiments, a user may just choose to watch the dynamic, simulated stereoscopic scene.

FIG. 43A illustrates a left view of a stereoscopic image of a first user. 4300a illustrates the first user, whose face is white. 4301a illustrates a pimple on the face of the first user 4300a. When the first user sees himself using his smart device's camera system, he decides to cover up the pimple before he goes to the meeting over the internet (e.g., a stereoscopic video meeting). He therefore selects to have it digitally removed through image processing techniques prior to being delivered to the group of users in the Zoom meeting. Additionally, he would like a tan. Thus, image processing is performed on the stereoscopic images.

FIG. 43B illustrates a left view of a stereoscopic image of a first user. 4300b illustrates the first user, whose face is now tan. 4301a illustrates that a region of skin on the first user's 4301a face void of the existing pimple on the face. Additionally, the face of the first user 4300b is now tan. The improved stereoscopic imagery is sent to the meeting over the internet (e.g., a stereoscopic video meeting). A range of image edits can be performed, which include but are not limited to the following: applying make up; hair color; slimming effects; hair style; changing eye color; and, others.

FIG. 44A illustrates a left viewing perspective of a stereoscopic image set of a user of with the actual dress appearance. 4300a illustrates the first user with the actual dress appearance.

FIG. 44B illustrates a left viewing perspective of a stereoscopic image set of a user with the simulated dress appearance. 4300b illustrates the first user with the simulated (realistic type preferred over cartoon type) dress appearance, which is enhance by adding a 3D model of a tie 4301, which is registered to the user and displayed in a left eye image and a right eye image of a second user viewing the first user in a HDU. A range of image simulated dress appearances can be implemented, which include but are not limited to the following: shirts; jackets; ties; jewelry; dresses; etc.

FIG. 45A illustrates placing a stereoscopic camera system with a wide field of view at a scene with an ongoing event. 4500 illustrates the stereoscopic camera system on a convex surface on a tripod, which is acquiring stereoscopic imagery of a burning building 4501 and an emergency vehicle 4502.

FIG. 45B illustrates placing a first user viewing a first field of view within the scene on a stereoscopic HDU. The first user is watching the building with a zoomed in view of the top windows. The lower portion of the building and the emergency vehicle is not in the first user's field of view.

FIG. 45C illustrates placing a second user viewing a second field of view within the scene on a stereoscopic HDU. The second user is watching the emergency vehicle and tilts his head to see to see a slightly different perspective. This, a new method of delivering the nightly news is provided.

FIG. 46 illustrates a text box showing gestures or actions that a user can do to modify the stereoscopic imagery. Some embodiments in the patent allow for a user to control (modify the camera settings). Other embodiments in the patent include a non-modifiable set of camera settings, but do allow a user to select which field of view are acquired from the camera settings (recall various camera selection discussion in FIG. 19C). This chart outlines various gestures and actions of a user to modify the presented stereoscopic imagery. Example ways to modify the presented stereoscopic imagery include, but are not limited to: zooming; converging; changing orientation; and changing the brightness/color scheme. A user can perform gestures or use a control device to achieve these modifications to the presented stereoscopic imagery. Example gestures, include, but are not limited to the following: squinting (via facial recognition analysis); moving forward/leaning forward (via head tracking); head turning (via head tracking); changing look angle to a different spot (via eye tracking); finger/hand/arm gestures determined by camera system (e.g., finger/hand/arm positions, e.g., hand motion such as a clap); and voice commands determined by a microphone (e.g., stating the word "zoom"). Additionally, a variety of control devices can be used to perform the modifications to the presented stereoscopic imagery, which include, but are not limited to the following: standard TV controller; joystick; keyboard; and mouse (e.g., roller ball).

Figure 47:
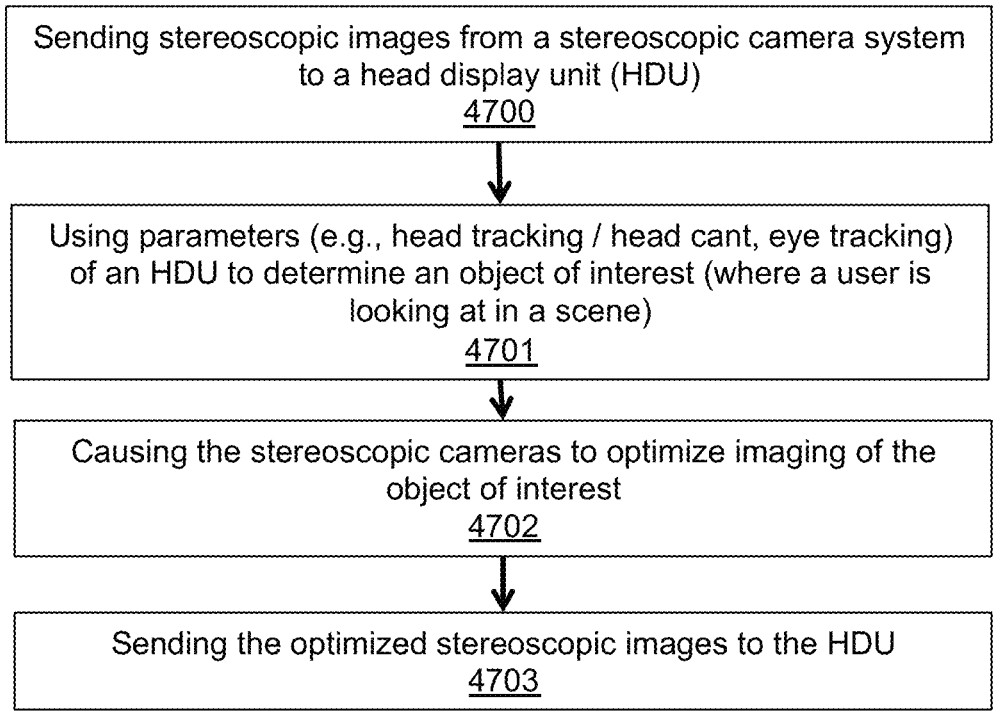
FIG. 47 illustrates a flow diagram for integrating stereoscopic cameras with a HDU.

FIG. 47 illustrates a flow diagram for integrating stereoscopic cameras with a HDU. 4700 illustrates sending stereoscopic images from a stereoscopic camera system to a head display unit. 4701 illustrates using parameters (e.g., head tracking/head cant, eye tracking) of an HDU to determine an object of interest (where a user is looking at in a scene). 4702 illustrates causing the stereoscopic cameras to optimize imaging of the object of interest. 4703 illustrates sending the optimized stereoscopic images to the HDU.

Figure 48:
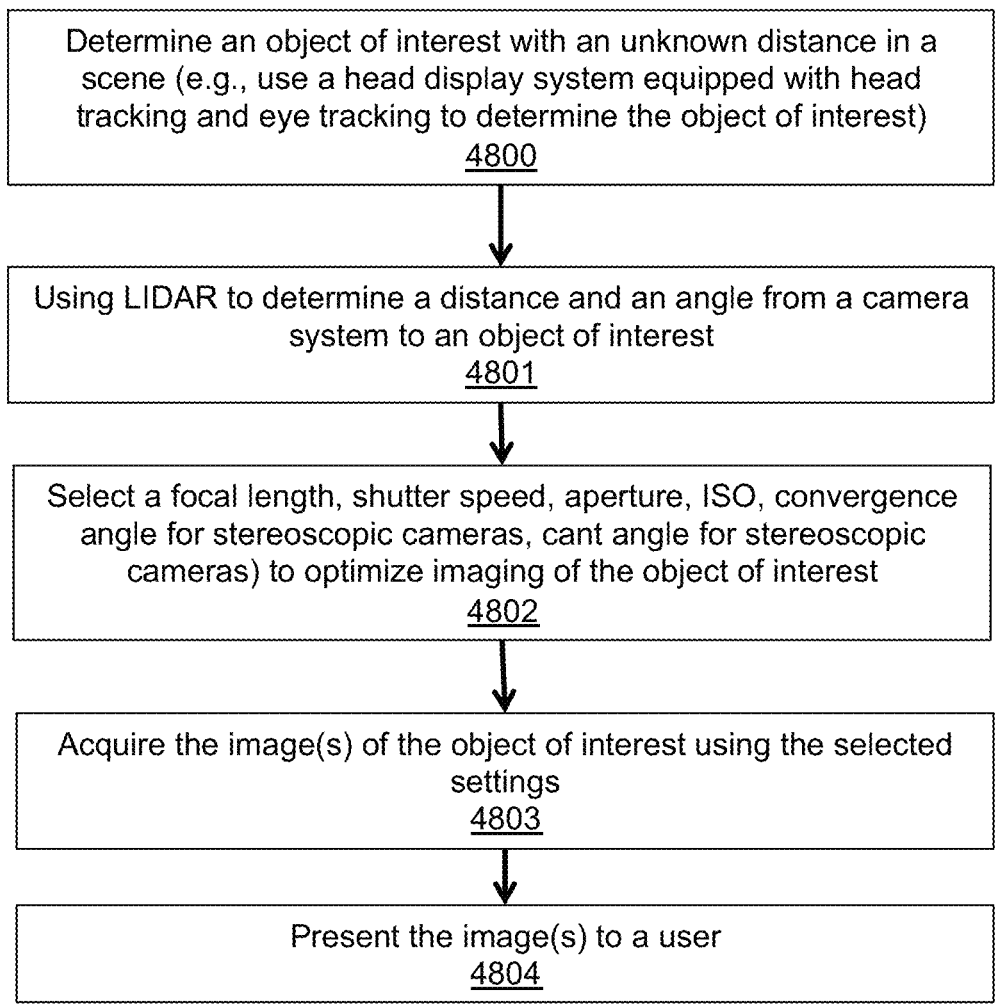
FIG. 48 illustrates using LIDAR to optimize image acquisition on a stereoscopic camera.

FIG. 48 illustrates using LIDAR to optimize image acquisition on a stereoscopic camera. 4800 illustrates determining an object of interest with an unknown distance in a scene (e.g., use a head display system equipped with head tracking and eye tracking to determine the object of interest). 4801 illustrates using LIDAR to determine a distance and an angle from a camera system to an object of interest. 4802 illustrates selecting a focal length, shutter speed, aperture, ISO, convergence angle for stereoscopic cameras, cant angle for stereoscopic cameras) to optimize imaging of the object of interest. 4803 illustrates acquiring the image(s) of the object of interest using the selected settings. 4304 illustrates presenting the image(s) to a user.

Figure 49:
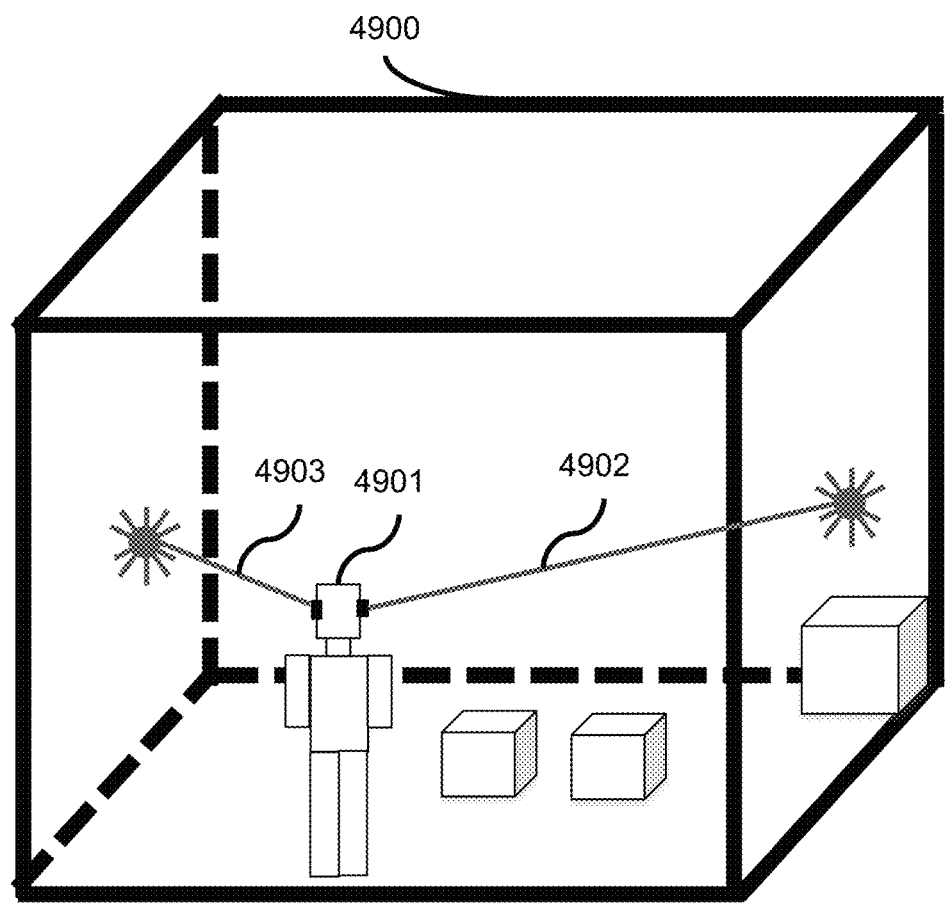
FIG. 49 illustrates a stereoscopic LIDAR system on a HDU.

FIG. 49 illustrates a stereoscopic LIDAR system on a HDU. A room 4900 is shown. A person 4901 is shown standing at the entrance to the room 4900 wearing a HDU. A left-sided LIDAR (left laser beam shown as 4903) device scans an area and generates a first 3D volume. The first 3D volume is presented on a user's left eye display in near real time. A right-sided LIDAR device (spaced by an interocular distance; right laser beam shown as 4902) scans the area and generates a second 3D volume. Note that the LIDAR devices are eye safe in the preferred embodiment. The second 3D volume is presented on a user's right eye display in near real time. It should be noted that the first 3D volume and the second 3D volume demonstrate at least some overlap. In some embodiments, a HDU contains both a stereoscopic camera system and a stereoscopic LIDAR system. This would enable a more spatially accurate analysis of an area. Imagery can be acquired during head turns, walking and other body movements. Additionally, stereoscopic FLIR can also be incorporated. Composite images can be generated. In conjunction with employing the LRF, the L3TV cameras would be running and providing stereoscopic imagery to complement the LRF range data. There are two modes of operation of the LRF: single pulse for measurement of range to an object; and scanning an area or volume. The single pulse can be of use in a variety of situations: first and foremost, determining distance to any hazards and displaying the distance on the HDU. Other uses include but are not limited to virtual home decoration wherein a set of virtual objects are inserted and how well do they fit given the measured size by LRF. Similarly for architects, what layout of virtual objects (e.g., windows, lighting, workspace, etc.) makes efficient use of available space. In the scanning mode, the entire room volume can be mapped through turning of the head and scanning of the laser. Surrounding each of the range points a voxel can be created and from these voxels the volume of the room and objects therein can be replicated. All of these measurements can be recorded together with the stereoscopic imagery for future playback. This would have significant utility for the real estate industry—an immersive effect of being able to 'walk through a virtual re-creation of a property—seeing it in 3D with actual sizes available. In an outdoor context, a surveyor with global position system (GPS) could measure distances to all key features and, from these measurements, geo-locate these features. A hiker could find the distance to key terrain features.

Figure 50A:
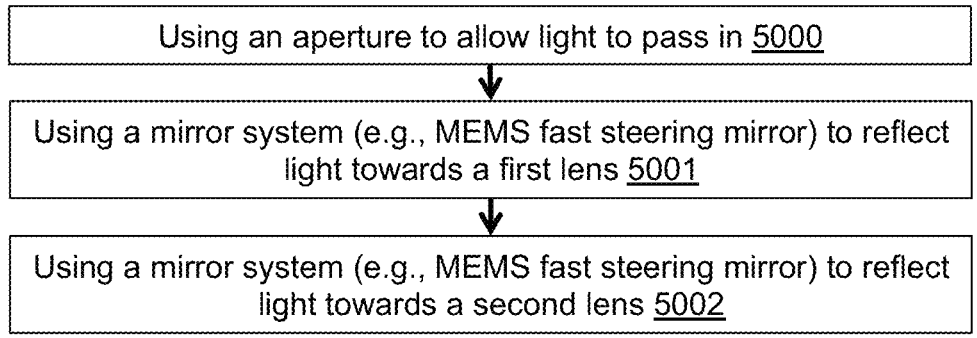
FIG. 50A illustrates using a common aperture for multiple lenses to overcome an unpleasant "image shift" to the user during camera switching.

FIG. 50A illustrates using a common aperture for multiple lenses to overcome an unpleasant "image shift" to the user during camera switching. 5000 teaches using an aperture to allow light to pass into the multiple (at least two) camera system. 5001 teaches using a mirror system (e.g., MEMS fast steering mirror) to reflect light towards a first lens. 5002 teaches using the mirror system (e.g., MEMS fast steering mirror) to reflect light towards a second lens.

Figure 50B:
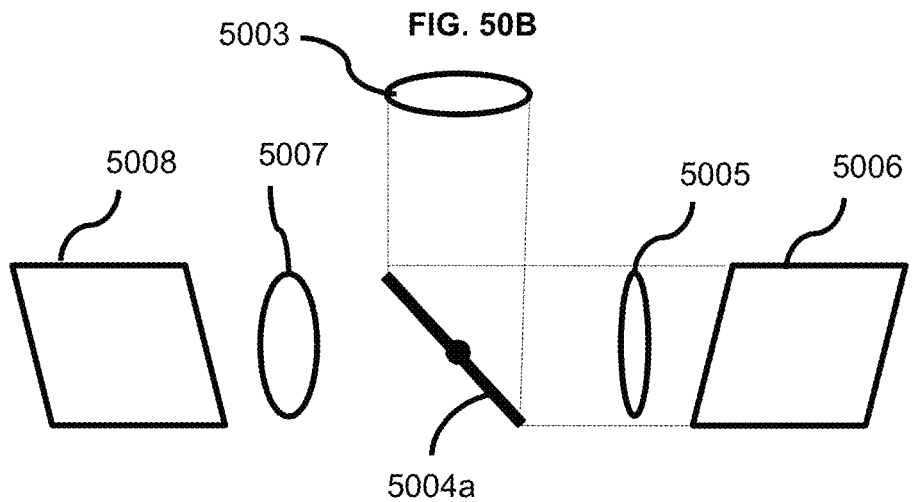
FIG. 50B illustrates using a common aperture system with a mirror at a first position.

FIG. 50B illustrates using a common aperture system with a fast scanning mirror at a first position. 5003 illustrates an aperture. 5004a illustrates a MEMS fast steering mirror, which is in a first position. 5005 illustrates a first lens. 5006 illustrates a first detector. 5007 illustrates a second lens. 5008 illustrates a second detector. Note that the dashed lines illustrate the light rays that pass from the aperture 5003 to the MEMS fast steering mirror 5004a (in a first position) through the first lens 5005 and onto the first detector 5006.

Figure 50C:
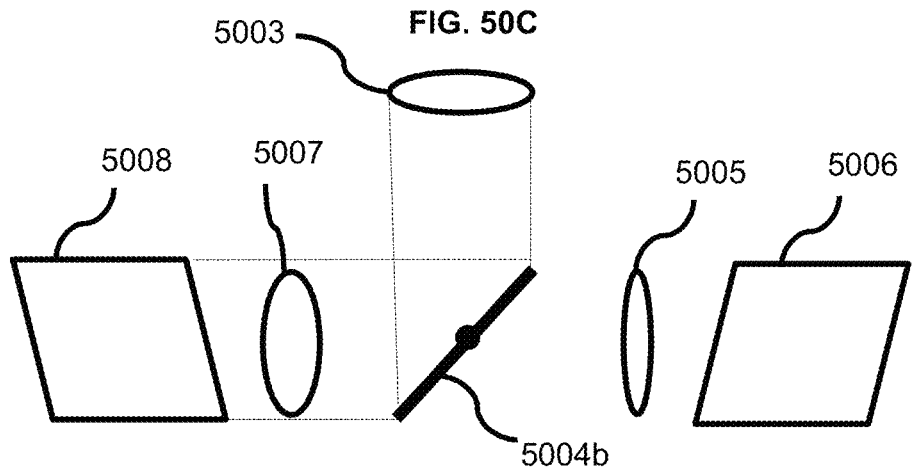
FIG. 50C illustrates using a common aperture system with a mirror at a second position.

FIG. 50C illustrates using a common aperture system with a fast scanning mirror at a first position. 5003 illustrates an aperture. 5004b illustrates a MEMS fast steering mirror, which is in a first position. 5005 illustrates a first lens. 5006 illustrates a first detector. 5007 illustrates a second lens. 5008 illustrates a second detector. Note that the dashed lines illustrate the light rays that pass from the aperture 5003 to the MEMS fast steering mirror 5004*b* (in a second position) through the second lens 5007 and onto the second detector 5008. The common and inventive aspect is the use of a single aperture for multiple lenses. The arrangement of the lenses and mirrors can vary in geometric orientation. In addition, some designs can be performed with a single detector with the proper arrangement of the mirror(s)/lens (as) setup. In some embodiments, a feature of the user's viewing (e.g., look angle, convergence point, etc.) determines the position of the mirror.

What is claimed is:

1. A method comprising:
   acquiring imagery from a smart device
      wherein said smart device comprises at least one of the group consisting of:
         a laptop computer;
         a phone; and
         a tablet,
      wherein said smart device is equipped with a left camera and a right camera,
      wherein said left camera and said right camera are separated by a stereo distance,
      wherein said left camera acquires left viewing perspective imagery of an area at a first time point,
      wherein said right camera acquires right viewing perspective imagery of said area at said first time point, and
      wherein said left viewing perspective imagery and said right viewing perspective imagery comprise stereoscopic imagery; and
   sending said stereoscopic imagery from said smart device via a wireless connection to a head display unit (HDU); and
   displaying said stereoscopic imagery from said displaying the stereoscopic imagery onto said head display unit (HDU)
      wherein said HDU comprises at least one of the group consisting of:
         a virtual reality display;
         an augmented reality display; and
         a mixed reality display;
      wherein said HDU comprises a left eye display and a right eye display,
      wherein said HDU is worn by a first user,
      wherein said HDU displays said stereoscopic imagery to said first user at a second time point,
      wherein said second time point is within five seconds of said first time point,
      wherein said left viewing perspective imagery is displayed on said left eye display, and
      wherein said right eye viewing perspective is displayed on said right eye display.

2. The method of claim 1, further comprising:
   using a microphone in proximity to said smart device;
   recording sound at said smart device; and
   playing said sound on a speaker in proximity to said HDU
      wherein said playing said sound occurs in synchrony with said stereoscopic imagery.

3. The method of claim 1, further comprising at least one of the group consisting of:
   wherein said smart device is moved farther from an object within said area and wherein said object appears on said HDU to be moved away from said first user; and
   wherein said smart device is moved closer to an object within said area and wherein said object appears on said HDU to be closer to said first user.

4. The method of claim 1, further comprising:
   wherein, at an initial time point, a direction a sensor corresponding to said left camera is facing and a direction a sensor corresponding to said right camera is facing are parallel; and
   wherein, at a subsequent time point, a direction said sensor corresponding to said left camera is facing and a direction said sensor corresponding to said right camera is facing are converging.

5. The method of claim 1, further comprising wherein said left eye camera comprises a camera cluster and said right eye camera comprises a camera cluster.

6. The method of claim 1, further comprising at least one of the group consisting of:
   wherein said stereoscopic imagery is of said first user and wherein said user wearing said HDU views oneself; and
   wherein said stereoscopic imagery is of a second user and wherein said first user wearing said HDU views said second user.

7. The method of claim 1, further comprising wherein said smart device has at least two pairs of stereoscopic cameras.

8. The method of claim 1, further comprising:
   wherein said HDU worn by said first user has an inertial measurement unit (IMU) for head tracking, and
   wherein a field of view of said stereoscopic imagery displayed on said HDU worn by said first user changes in accordance with a head turn by said first user.

9. The method of claim 1, further comprising:
   wherein said HDU worn by said first user has an inertial measurement unit (IMU) for head tracking, and
   wherein a convergence of said stereoscopic imagery displayed on said HDU worn by said first user changes in accordance with said first user's convergence.

10. The method of claim 1, further comprising:
    wherein said HDU worn by said first user has an eye-tracking system, and
    wherein a field of view displayed on said HDU worn by said first user changes in accordance with said first user's look angle.

11. The method of claim 1, further comprising wherein said smart device comprises at least one of the group consisting of:
    a HDU;
    a TV; and
    a monitor.

12. The method of claim 1, further comprising wherein said smart device comprises at least one of the group consisting of:
    a convex surface; and
    a set of robotic arms.

13. The method of claim 1, further comprising:
    wherein said area comprises a second user and an actual background,
    wherein said actual background is replaced by a simulated background,
    wherein said simulated background is presented on said HDU worn by said first user.

14. The method of claim 13, further comprising wherein said simulated background dynamically changes over time.

15. The method of claim 1, further comprising:
    wherein said area comprises a second user and an actual clothing item worn by said second user,
    wherein said actual clothing item is replaced by a simulated clothing item,
    wherein said simulated clothing item is presented on said HDU worn by said first user.

16. The method of claim 1, further comprising:
wherein a field of view of said smart device is larger than a field of view of said HDU,
wherein a portion of said field of view of said smart device is selected for display on said HDU, and
wherein said selection for display on said HDU is determined by a look angle of a left eye and a right eye of said first user.

17. The method of claim 1, further comprising:
wherein a field of view of said smart device is larger than a field of view of said HDU,
wherein a portion of said field of view of said smart device is selected for display on said HDU, and
wherein said selection for display on said HDU is determined by a head turn angle of said first user.

18. The method of claim 1, further comprising:
wherein a field of view of said smart device is larger than a field of view of said HDU,
wherein a portion of said field of view of said smart device is selected for display on said HDU, and
wherein said selection for display on said HDU is determined by a vergence of said first user.

19. An apparatus comprising:
a smart device,
  wherein said smart device comprises at least one of the group consisting of:
    a laptop computer;
    a phone; and
    a tablet,
  wherein said smart device is equipped with a left camera and a right camera,
  wherein said left camera and said right camera are separated by a stereo distance,
  wherein said left camera acquires viewing perspective imagery of an area at a first time point,
  wherein said right camera acquires right viewing perspective imagery of said area at said first time point, and
  wherein said left viewing perspective imagery and said right viewing perspective imagery comprise stereoscopic imagery,
  wherein said smart device is configured to send said stereoscopic imagery from said smart device via a wireless connection to a head display unit (HDU),
  wherein said HDU is configured to display said stereoscopic imagery from said smart device,
  wherein said HDU comprises at least one of the group consisting of:
    a virtual reality display;
    an augmented reality display; and
    a mixed reality display;
  wherein said HDU comprises a left eye display and a right eye display,
  wherein said HDU is worn by a user,
  wherein said HDU displays said stereoscopic imagery to said user at a second time point,
  wherein said second time point is within five seconds of said first time point,
  wherein said left viewing perspective imagery is displayed on said left eye display, and
  wherein said right eye viewing perspective is displayed on said right eye display.

20. A non-transitory computer readable medium having computer readable code thereon, the medium comprising:
instructions for a smart device to send imagery,
  wherein said smart device comprises at least one of the group consisting of:
    a laptop computer;
    a phone; and
    a tablet,
  wherein said smart device is equipped with a left camera and a right camera,
  wherein said left camera and said right camera are separated by a stereo distance,
  wherein said left camera acquires left viewing perspective imagery of an area at a first time point,
  wherein said right camera acquires right viewing perspective imagery of said area at said first time point, and
  wherein said left viewing perspective imagery and said right viewing perspective imagery comprise stereoscopic imagery,
  wherein said smart device is configured to send said stereoscopic imagery from said smart device via a wireless connection to a head display unit (HDU),
  wherein said HDU is configured to display said stereoscopic imagery from said smart device,
  wherein said HDU comprises at least one of the group consisting of:
    a virtual reality display;
    an augmented reality display; and
    a mixed reality display;
wherein said HDU comprises a left eye display and a right eye display,
  wherein said HDU is worn by a user,
  wherein said HDU displays said stereoscopic imagery to said user at a second time point,
  wherein said second time point is within five seconds of said first time point,
  wherein said left viewing perspective imagery is displayed on said left eye display, and
  wherein said right eye viewing perspective is displayed on said right eye display.

* * * * *